United States Patent
Iwami et al.

(10) Patent No.: US 11,068,148 B2
(45) Date of Patent: Jul. 20, 2021

(54) INFORMATION PROCESSING DEVICE

(71) Applicant: SONY CORPORATION, Tokyo (JP)

(72) Inventors: Hideki Iwami, Saitama (JP); Tomoya Yamaura, Tokyo (JP); Hideyuki Suzuki, Tokyo (JP); Taketoshi Yamane, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 438 days.

(21) Appl. No.: 15/543,395

(22) PCT Filed: Jan. 5, 2016

(86) PCT No.: PCT/JP2016/050079
§ 371 (c)(1),
(2) Date: Jul. 13, 2017

(87) PCT Pub. No.: WO2016/121412
PCT Pub. Date: Aug. 4, 2016

(65) Prior Publication Data
US 2018/0004383 A1    Jan. 4, 2018

(30) Foreign Application Priority Data

Jan. 30, 2015  (JP) ................................ 2015-016735
Feb. 6, 2015   (JP) ............................ JP2015-022674

(51) Int. Cl.
*G06F 15/16*     (2006.01)
*G06F 3/0487*    (2013.01)
(Continued)

(52) U.S. Cl.
CPC ............ *G06F 3/0487* (2013.01); *G06F 13/00* (2013.01); *H04M 1/00* (2013.01); *H04M 11/00* (2013.01);
(Continued)

(58) Field of Classification Search
CPC ........ G06F 3/0487; G06F 2203/04806; H04N 21/436; H04N 21/442; H04W 92/18; G09B 21/008
(Continued)

(56) References Cited

U.S. PATENT DOCUMENTS 7,818,415 B2 *  10/2010  Jhanji ................... H04L 67/306
                                                           709/223
8,933,967 B2 *   1/2015  Huston ................... H04W 4/80
                                                           345/633
(Continued)

FOREIGN PATENT DOCUMENTS

CN      102749992 A    10/2012
EP       2699985 A2     2/2014
(Continued)

OTHER PUBLICATIONS

Extended European Search Report of EP Application No. 16743016.4, dated Jun. 22, 2018, 11 pages of EESR.
(Continued)

*Primary Examiner* — Anthony Mejia
(74) *Attorney, Agent, or Firm* — Chip Law Group

(57) ABSTRACT

Provided is an information processing device capable of operating in accessibility mode of guaranteeing browsing corresponding to disability or functional degeneration of a body of an operator. A source device checks whether each sink device is in accessibility mode at the time of connection, and determines whether or not metadata for supporting disability (for example, audios, videos, texts, vibration information, or the like) is added to the sink device in the accessibility mode at the time of transmission of original image/audio data. The source device changes a metadata transmission method in accordance with whether the accessibility mode of each sink device is turned on or off.

18 Claims, 32 Drawing Sheets

(51) Int. Cl.

| | | |
|---|---|---|
| *H04W 92/18* | (2009.01) | |
| *H04M 1/00* | (2006.01) | |
| *H04M 11/00* | (2006.01) | |
| *G06F 13/00* | (2006.01) | |
| *H04N 21/4363* | (2011.01) | |
| *H04N 21/442* | (2011.01) | |
| *H04N 21/6437* | (2011.01) | |
| *H04N 21/436* | (2011.01) | |
| *H04N 21/462* | (2011.01) | |
| *H04N 21/81* | (2011.01) | |
| *G09B 21/00* | (2006.01) | |

(52) U.S. Cl.
CPC ..... *H04N 21/436* (2013.01); *H04N 21/43615* (2013.01); *H04N 21/43637* (2013.01); *H04N 21/442* (2013.01); *H04N 21/44227* (2013.01); *H04N 21/4622* (2013.01); *H04N 21/6437* (2013.01); *H04N 21/8133* (2013.01); *H04W 92/18* (2013.01); *G06F 2203/04806* (2013.01); *G09B 21/008* (2013.01)

(58) Field of Classification Search
USPC .......................................................... 709/227
See application file for complete search history.

(56) References Cited

U.S. PATENT DOCUMENTS

| | | | | |
|---|---|---|---|---|
| 9,118,723 | B1* | 8/2015 | Su | H04L 67/22 |
| 9,832,787 | B2* | 11/2017 | Broomhall | G06Q 30/00 |
| 2003/0006903 | A1* | 1/2003 | Naegely | G08B 1/08 |
| | | | | 340/4.12 |
| 2005/0114761 | A1* | 5/2005 | Celik | G06F 16/958 |
| | | | | 715/201 |
| 2009/0016230 | A1* | 1/2009 | Choi | H04L 41/12 |
| | | | | 370/252 |
| 2012/0331568 | A1* | 12/2012 | Weinstein | H04L 12/185 |
| | | | | 726/29 |
| 2013/0066963 | A1* | 3/2013 | Odio | H04L 65/403 |
| | | | | 709/204 |
| 2013/0139210 | A1 | 5/2013 | Huang et al. | |
| 2013/0144674 | A1* | 6/2013 | Kim | G06Q 30/0207 |
| | | | | 705/7.19 |
| 2013/0212494 | A1* | 8/2013 | Heiferman | H04L 51/00 |
| | | | | 715/753 |
| 2013/0298028 | A1 | 11/2013 | Porat et al. | |
| 2014/0009394 | A1* | 1/2014 | Lee | H04N 5/4403 |
| | | | | 345/157 |
| 2014/0344839 | A1 | 11/2014 | Woods et al. | |
| 2014/0347433 | A1* | 11/2014 | Kafle | H04L 65/1069 |
| | | | | 348/14.02 |
| 2014/0372620 | A1 | 12/2014 | Vedula et al. | |
| 2014/0379798 | A1* | 12/2014 | Bunner | H04L 67/24 |
| | | | | 709/204 |
| 2015/0170045 | A1* | 6/2015 | Kirkham | G06Q 10/06 |
| | | | | 706/11 |
| 2015/0222580 | A1* | 8/2015 | Grue | H04L 67/1095 |
| | | | | 709/206 |
| 2015/0324826 | A1* | 11/2015 | Mizushima | G06Q 30/0214 |
| | | | | 705/14.16 |
| 2016/0188799 | A1* | 6/2016 | Borras | G16H 40/20 |
| | | | | 705/3 |
| 2016/0191653 | A1* | 6/2016 | Aluotto | H04L 51/34 |
| | | | | 709/205 |
| 2016/0253833 | A1* | 9/2016 | Lew | H04N 1/00196 |
| | | | | 715/202 |
| 2016/0269675 | A1* | 9/2016 | Tsujimoto | G11B 27/3009 |
| 2016/0320935 | A1* | 11/2016 | Shin | H04W 4/80 |
| 2017/0011611 | A1* | 1/2017 | Ulfsparre | H04L 67/10 |
| 2017/0024091 | A1* | 1/2017 | Hosier, Jr. | H04M 1/72522 |
| 2017/0109009 | A1* | 4/2017 | Meredith | H04L 67/16 |
| 2017/0149699 | A1* | 5/2017 | Hinson, Jr. | H04L 51/02 |
| 2017/0221095 | A1* | 8/2017 | Gauglitz | G06Q 10/10 |
| 2018/0013861 | A1* | 1/2018 | Howard | H04L 67/306 |
| 2018/0191831 | A1* | 7/2018 | Wadley | G06K 9/00671 |
| 2018/0351895 | A1* | 12/2018 | Rathod | G06F 9/54 |

FOREIGN PATENT DOCUMENTS

| | | |
|---|---|---|
| JP | 2012-226754 A | 11/2012 |
| JP | 2013-132078 A | 7/2013 |
| JP | 2014-171192 A | 9/2014 |
| JP | 2015-019197 A | 1/2015 |
| WO | 2012/145057 A2 | 10/2012 |
| WO | 2014/125547 A1 | 8/2014 |

OTHER PUBLICATIONS

International Search Report and Written Opinion of PCT Application No. PCT/JP2016/050079, dated Apr. 14, 2015, 04 pages of English Translation and 03 pages of ISRWO.

* cited by examiner

FIG. 9

| Bit | | |
|---|---|---|
| 0 | MODE CHECKING | 0b0 : ACCESSIBILITY MODE On<br>0b1 : ACCESSIBILITY MODE Off |
| 4:1 | ACCESSIBILITY TYPE | 0b0000 : VISUAL DISABILITY<br>0b0001 : HEARING DISABILITY<br>0b0010 : VISUAL DISABILITY<br>0b0100 : HEARING DISABILITY |
| 14:5 | ACCESSIBILITY SUPPORT REQUEST | 0b0000000001 : OPERABLE WITHOUT SIGHT<br>0b0000000010 : OPERABLE IN COLOR WEAKNESS AND COLOR BLINDNESS<br>0b0000000100 : OPERABLE IN AMBLYOPIA AND HEARING LOSS<br>0b0000001000 : OPERABLE WITHOUT HEARING<br>0b0000010000 : OPERABLE WITHOUT SPEECH<br>0b0000100000 : OPERABLE WITH LIMITED COGNITIVE ABILITY<br>0b0001000000 : OPERABLE ALTHOUGH IT TAKES TIME<br>0b0010000000 : OPERABLE WITH DISABLED FINGERS<br>0b0100000000 : OPERABLE WITH LIMITED MOVABLE RANGE OR FORCE<br>0b1000000000 : OPERABLE WITH BRACE |

FIG. 10A

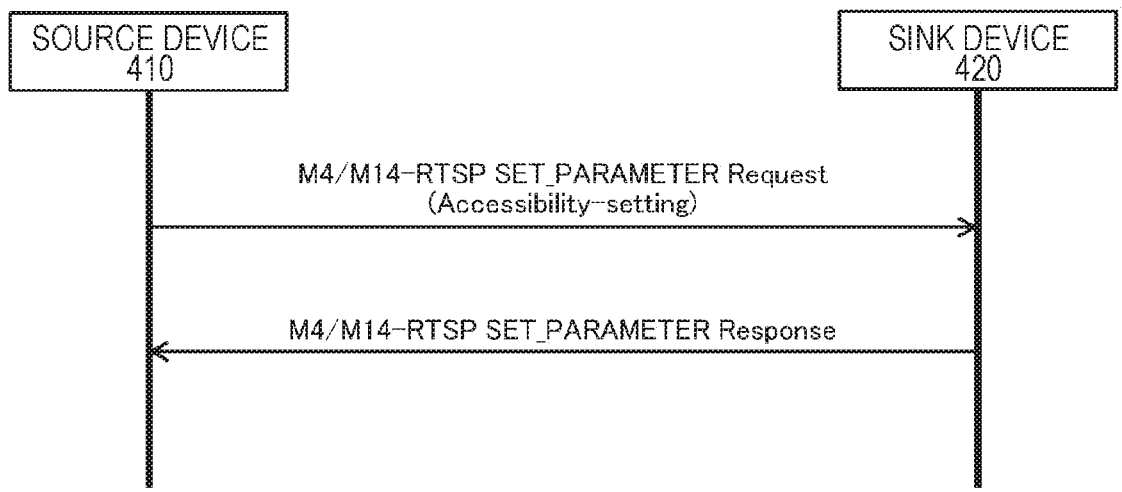

FIG. 12

| ACCESSIBILITY | | | MEDIA DATA | ACCESSIBILITY DATA | SUPPORT IN ACCESSIBILITY MODE | SUPPORT IN NORMAL MODE |
|---|---|---|---|---|---|---|
| SIGHT SUPPORT | HEARING SUPPORT | OPERATION DIFFICULTY SUPPORT | COGNITION SUPPORT | | | | |
|  | ○ |  |  | VIDEO | OPERATION IMAGE | DISPLAY OPERATION IMAGE AS MAIN IMAGE | GIVE PRIORITY TO MEDIA VIDEO |
| ○ |  | AT TIME OF OPERATION DIFFICULTY |  | AUDIO | OPERATION SOUND | MUTE MEDIA SOUND AND OUTPUT OPERATION SOUND AS MAIN SOUND | GIVE PRIORITY TO MEDIA SOUND |
|  | ○ |  | ○ (CHANGE CHARACTER SIZE) | TEXT | OPERATION TEXT | GIVE PRIORITY TO OPERATION TEXT | GIVE PRIORITY TO MEDIA TEXT |

| Field | Size(Octed) |
|---|---|
| WebSocket Type ID | 1 |
| Length | 2 |
| Cescribe | Varuable |

FIG. 15C

| STILL IMAGE | 0 |
|---|---|
| MOVING IMAGE | 1 |
| COMMAND | 2 |
| DISPLAY DEVICE | 3 |
| Reserve | 4 |

FIG. 26

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length filed is variable and set to 4 plus the total length of WFD subelements. |
| OUI | 3 | 50-6F-9A | WFA Specific OUI |
| OUI Type | 1 | OA | Identifying the type or version of the WFD IE. Setting to 0X0A indicates WFA WFD v1.0. |
| WFD subelements | Variable | | One or more WFD Subelements appear in theWFD IE. |

FIG. 27

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | | Length of the following fields in the subelements. |
| Subelements body field | Variable | | Subelement specific information fields |

FIG. 28

| Subelement ID (Decimal) | Description |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11 | New Device Information |
| 12-255 | Reserved |

FIG. 29

| Field | Size (octets) | Value (Hexadecimal) | Description |
|---|---|---|---|
| Subelement ID | 1 | 11 | |
| Length | 1 | Variable | Length of the following fields in the subelements. |
| New Device Information | 3 | | |

FIG. 30

| Field | Size (octets) | Value | Description |
|---|---|---|---|
| 1:0 | 3 | Infra CONNECTION | [0] WIRELESS USE (1:Connected 0:Non-use)<br>[1] WIRED USE (1:Connected 0:Non-use) |
| 5:2 | | WIRELESS CONNECTION CAPABILITY | [5] TIME DIVISION CONNECTION OF SAME FREQUENCY CHANNEL (1:OK 0:NG)<br>[4] TIME DIVISION CONNECTION OF DIFFERENT FREQUENCY CHANNELS (1:OK 0:NG)<br>[3] SIMULTANEOUS CONNECTION OF SAME FREQUENCY CHANNEL (1:OK 0:NG)<br>[2] SIMULTANEOUS CONNECTION OF DIFFERENT FREQUENCY CHANNELS (1:OK 0:NG) |
| 10:8 | | Source Capability | 10: Infra USE (1:OK 0:Non-Available)<br>9: P2P USE (1:OK 0:Non-Available)<br>8: TLDS USE (1:OK 0:Non-Available) |
| 13:11 | | Sink Capability | 13: Infra USE (1:OK 0:Non-Available)<br>12: P2P USE (1:OK 0:Non-Available)<br>11: TLDS USE (1:OK 0:Non-Available) |
| 23:14 | | Frequency Channel | WRITE Channel NUMBER WHEN WIRELESS USE IS Connected BY [1:0] |

FIG. 31

| Field | Size (octets) | Value | Description |
|---|---|---|---|
| 1:0 | 3 | Infra CONNECTION | [0] WIRELESS USE (1 : Connected 0 : Non-use)<br>[1] WIRED USE (1 : Connected 0 : Non-use) |
| 5:2 | | WIRELESS CONNECTION CAPABILITY | [5] TIME DIVISION CONNECTION OF SAME FREQUENCY CHANNEL (1:OK 0:NG)<br>[4] TIME DIVISION CONNECTION OF DIFFERENT FREQUENCY CHANNELS (1:OK 0:NG)<br>[3] SIMULTANEOUS CONNECTION OF SAME FREQUENCY CHANNEL (1:OK 0:NG)<br>[2] SIMULTANEOUS CONNECTION OF DIFFERENT FREQUENCY CHANNELS (1:OK 0:NG) |
| 10:8 | | Source Capability | 10 : Infra USE (1 : OK 0 : Non-Available)<br>9 : P2P USE (1 : OK 0 : Non-Available)<br>8 : TLDS USE (1 : OK 0 : Non-Available) |
| 13:11 | | Sink Capability | 13 : Infra USE (1 : OK 0 : Non-Available)<br>12 : P2P USE (1 : OK 0 : Non-Available)<br>11 : TLDS USE (1 : OK 0 : Non-Available) |
| 23:14 | | Frequency Channel | WRITE Channel NUMBER WHEN WIRELESS USE IS Connected BY [1:0] |

INFORMATION PROCESSING DEVICE

CROSS REFERENCE TO RELATED APPLICATIONS

This application is a U.S. National Phase of International Patent Application No. PCT/JP2016/050079 filed on Jan. 5, 2016, which claims priority benefit of Japanese Patent Application No. JP 2015-016735 filed in the Japan Patent Office on Jan. 30, 2015, and also claims priority benefit of Japanese Patent Application No. JP 2015-022674 filed in the Japan Patent Office on Feb. 6, 2015. Each of the above-referenced applications is hereby incorporated herein by reference in its entirety.

TECHNICAL FIELD

The technology disclosed in this specification relates to an information processing device capable of operating in an accessibility mode of guaranteeing browsing corresponding to disabilities or functional degeneration of a body of an operator and an information processing device capable of performing transmission and reception of data with a counterpart terminal in the accessibility mode.

BACKGROUND ART

Information processing devices in which operability of operators who have limited vision or hearing or are not dexterous in cooperation of eyes and hands or fingers such as persons with disabilities or senior citizens is considered are under review. For example, in information devices such as smartphones or tablet terminals, there are models capable of selecting a user interface for normal persons and a user interface for persons with disabilities (for example, see Patent Document 1).

However, in various communication schemes of transmitting videos from information devices such as smart phones, tablet terminals, and laptop PCs, currently, transmission methods of only display and operations for normal persons are specified, and accessibility of persons with disabilities is not considered. Recently, in wireless network communication and peer to peer (P2P) direct communication, use cases in which a plurality of terminals are grouped to perform wireless video transmission are increasing (for example, see Patent Document 2), but currently, there is no protocol of supporting operations for persons with disabilities.

On the other hand, although a communication scheme in which exchanges between a transmitting device and a receiving device can be transmitted is decided, when a plurality of terminals are grouped to implement a common service, a new problem arises in a multi-sink topology environment or a multi-source topology environment.

For example, when a connection form in the multi-sink topology environment is considered, it is desirable that a transmitting device having content or data establishes a connection with all sink devices and transmits optimal data to receiving devices. However, in an environment in which normal persons and persons with disabilities are mixed, there arises a new problem about how to control a connection between the source device and the sink device to secure consistency in the mixed environment.

Furthermore, when a connection form in the multi-source topology environment is considered, since it is a platform in which one sink device is provided, it is desirable that data received from the source devices have the same format, but it is necessary to check a set value before transmission. It is necessary to provide an effective management method to the sink device.

Further, the user interface for normal persons is completely different from the user interface for persons with disabilities, but when terminals connected via a P2P manner establish a connection in a mode for normal persons (hereinafter, referred to as a "normal mode") and a mode for persons with disabilities (hereinafter, referred to as an "accessibility mode"), sufficient consideration has not been made at the time of filing the present application.

Further, in communication according to a wireless video transmission standard of a related art (for example, Miracast), when it is desired to transmit data for the accessibility mode using a content/media transmission line, a control method is unique, and there is no compatibility between terminals. For example, in supporting persons with visual disability, a case in which wireless video transmission is performed while performing sight support is considered. When content/media is a video, it is necessary for a transmitting device or a receiving device to perform, for example, conversion into an information provision method based on voice or touch. Furthermore, when there is a voice in content/media, audio data for operations may be necessary. However, at the time of filing the present application, an implementation method is based on unique implementation, and it is difficult to perform transmission in view of a type of accessibility. Transmission control in which exchange between the transmitting device and the receiving device can be performed is necessary.

In addition, although a type of disability is the same, a support method of supporting disability differs depending on a degree of disability of an operator. For example, there are various support methods as the sight support for persons with visual disability such as "operable without sight," "operable in color weakness and color blindness," and "operable in amblyopia and hearing loss."

CITATION LIST

Patent Document

Patent Document 1: Japanese Patent Application Laid-Open No. 2012-226754

Patent Document 2: US Patent Publication No. 20130139210

SUMMARY OF THE INVENTION

Problems to be Solved by the Invention

It is an object of the technology disclosed in this specification to provide an excellent information processing device capable of suitably operating in an accessibility mode in a topology environment in which terminals in a normal mode and terminals in the accessibility mode are mixed.

It is another object of the technology disclosed in this specification to provide an excellent information processing device capable of suitably performing transmission and reception of data with a counterpart terminal in the accessibility mode.

Solutions to Problems

The technology disclosed in this specification is made in consideration of the above object, and a first aspect thereof is an information processing device, including:

a wireless communication unit that wirelessly communicates with a plurality of sink devices as a source device; and a control unit that controls a connection with the sink devices and transmission of content or data to the sink devices, in which each of the plurality of sink devices is operable in one of a normal mode and one or more types of accessibility modes of guaranteeing browsing corresponding to disability or functional degeneration of a body of an operator, and the control unit manages the types of the accessibility mode of the plurality of sink devices.

According to a second aspect of technology disclosed in this specification, the control unit of the information processing device according to the first aspect arbitrates the accessibility modes of the plurality of sink devices and then starts the transmission of the content or the data.

According to a third aspect of technology disclosed in this specification, the control unit of the information processing device according to the second aspect causes a sink device that is changed to the accessibility mode to display a pop-up of causing the operator to check whether or not the change is not a problem.

According to a fourth aspect of technology disclosed in this specification, the control unit of the information processing device according to the first aspect detects a connection with the sink device in the accessibility mode and causes transmission of necessary accessibility mode metadata to be transmitted on the basis of a result of obtaining a logical sum of accessibility mode types to be connected therefrom.

According to a fifth aspect of technology disclosed in this specification, the control unit of the information processing device according to the fourth aspect causes the accessibility mode metadata to be transmitted through one of a multicast packet and a unicast packet.

According to a sixth aspect of technology disclosed in this specification, the control unit of the information processing device according to the first aspect groups the plurality of sink devices according to the same accessibility mode type and transmits the accessibility mode metadata corresponding to each group.

According to a seventh aspect of technology disclosed in this specification, the control unit of the information processing device according to the sixth aspect causes the accessibility mode metadata to be transmitted through one of a multicast packet and a unicast packet.

Further, an eighth aspect of technology disclosed in this specification is an information processing device, including:

a wireless communication unit that wirelessly communicates with a source device as a sink device; and a control unit that controls a connection with the source device and transmission of content or data from the source device, in which the control unit extracts only reproducible metadata among a plurality of pieces of accessibility mode metadata received from the source device and reproduces the extracted metadata.

Further, a ninth aspect of technology disclosed in this specification is an information processing device, including:

a wireless communication unit that wirelessly communicates to the same sink device together with another source device as a source device; and a control unit that controls a connection with the sink device and transmission of content or data to the sink device, in which the sink device is operable in one of a normal mode and one or more types of accessibility modes of guaranteeing browsing corresponding to disability or functional degeneration of a body of an operator, and the control unit gives a notification indicating a connection in the accessibility mode to the sink device.

Further, a tenth aspect of technology disclosed in this specification is an information processing device, including:

a wireless communication unit that wirelessly communicates with a plurality of source devices as a sink device;

a control unit that controls a connection with the source devices and transmission of content or data from the source devices; and a user interface unit that selects one of an accessibility operation and a normal operation.

Further, an eleventh aspect of technology disclosed in this specification is an information processing device, including:

a wireless communication unit that wirelessly communicates with a plurality of source devices as a sink device; and a control unit that controls a connection with the source devices and transmission of content or data from the source devices, in which each of the plurality of source devices is operable in one of a normal mode and one or more types of accessibility modes of guaranteeing browsing corresponding to disability or functional degeneration of a body of an operator, and the control unit causes UIBC data to be transmitted to the plurality of source devices.

According to a twelfth aspect of technology disclosed in this specification, the control unit of the information processing device according to the eleventh aspect converts the UIBC data to be suitable for the mode of each of the source devices and then transmits the converted UIBC data.

According to a thirteenth aspect of technology disclosed in this specification, the control unit of the information processing device according to the eleventh aspect causes the UIBC data to be transmitted regardless of the mode of the source device.

According to a fourteenth aspect of technology disclosed in this specification, the control unit of the information processing device according to the eleventh aspect performs switching to a common mode to which all devices are switchable and then causes the UIBC data to be transmitted.

Further, a fifteenth aspect of technology disclosed in this specification is an information processing device, including:

a wireless communication unit that wirelessly communicates with the same sink device together with another source device as a source device; and a control unit that controls a connection with the sink device and transmission of content or data to the sink device, in which the sink device is operable in one of a normal mode and one or more types of accessibility modes of guaranteeing browsing corresponding to disability or functional degeneration of a body of an operator, and in a case where the operator changes the mode of the sink device during the connection, the control unit transmits a mode exchange message signal for performing switching between the normal mode and the accessibility mode in midstream.

Further, a sixteenth aspect of technology disclosed in this specification is an information processing device, including:

a wireless communication unit that wirelessly communicates with a plurality of source devices as a sink device;

a control unit that controls a connection with the source devices and transmission of content or data from the source devices; and in which each of the plurality of source devices is operable in one of a normal mode and one or more types of accessibility modes of guaranteeing browsing corresponding to disability or functional degeneration of a body of an operator, and the control unit requests the source devices so that the accessibility modes of the plurality of source devices coincide.

Further, a seventeenth aspect of technology disclosed in this specification is an information processing device, including:

a wireless communication unit that wirelessly communicates with a sink device as a source device, the sink device being operable in one of a normal mode and one or more types of accessibility modes of guaranteeing browsing corresponding to disability or functional degeneration of a body of an operator;

a content transmitting unit that transmits content or data to the sink device through the wireless communication unit; and a metadata transmitting unit that transmits metadata that is operable by the operator of the sink device to the sink device operating in the accessibility mode through the wireless communication unit.

According to an eighteenth aspect of technology disclosed in this specification, the metadata transmitting unit of the information processing device according to the seventeenth aspect transmits metadata using a channel for metadata transmission.

Further, a nineteenth aspect of technology disclosed in this specification is an information processing device, including:

a wireless communication unit that wirelessly communicates with a sink device as a source device, the sink device being operable in one of a normal mode and one or more types of accessibility modes of guaranteeing browsing corresponding to disability or functional degeneration of a body of an operator;

a content transmitting unit that transmits content or data to the sink device through the wireless communication unit;

a mode checking unit that checks an operation mode of the sink device through the wireless communication unit; and a metadata transmitting unit that transmits metadata that is operable by the operator of the sink device to the sink device operating in the accessibility mode through the wireless communication unit.

According to a twentieth aspect of technology disclosed in this specification, the mode checking unit of the information processing device according to the nineteenth aspect checks an accessibility mode type supported by the sink device using at least one process of a Capability Negotiation, a Device Discovery, and a Service Discovery in a Miracast protocol.

According to a twenty-first aspect of technology disclosed in this specification, the information processing device according to the nineteenth or twentieth aspect further includes a metadata converting unit that converts metadata in accordance with an accessibility mode type supported by the sink device.

According to a twenty-second aspect of technology disclosed in this specification, the information processing device according to any of the nineteenth to twenty-first aspect further includes a notifying unit that gives a notification indicating that it is necessary to generate metadata to the operator of the information processing device in a case where the sink device is in the accessibility mode.

According to a twenty-third aspect of technology disclosed in this specification, the notifying unit of the information processing device according to the twenty-second aspect displays a media type of the metadata to be transmitted to the sink device and urges the operator to check whether or not the metadata is converted.

According to a twenty-fourth aspect of technology disclosed in this specification, the information processing device according to any of the nineteenth to twenty-third aspect further includes a mode control unit that causes a mode to coincide with the mode of the sink device in a case where the type of the accessibility mode is different from the type of the accessibility mode of the sink device.

According to a twenty-fifth aspect of technology disclosed in this specification, the information processing device according to any of the nineteenth to twenty-fourth aspect further includes a message transmitting unit that transmits, in a case where the operator changes the mode during the connection with the sink device, a mode exchange message signal for performing switching between the normal mode and the accessibility mode in midstream in the middle of transmission of the content by the content transmitting unit.

Effects of the Invention

According to the technology disclosed in this specification, it is possible to provide an excellent information processing device capable of suitably operating in an accessibility mode in a topology environment in which terminals in a normal mode and terminals in the accessibility mode are mixed.

Further, according to the technology disclosed in this specification, it is possible to provide an excellent information processing device capable of suitably performing transmission and reception of data with a counterpart terminal in the accessibility mode.

Further, the effects described in this specification are merely examples, and the effects of the present invention are not limited thereto. Further, the present invention may further have additional effects in addition to the above effects.

Still other objects, features, and advantages of the technology disclosed in this specification will be apparent from a detailed description based on embodiments to be described later and the attached drawings.

BRIEF DESCRIPTION OF DRAWINGS

FIG. 9 is a diagram illustrating a bit assignment of an accessibility support request.

FIG. 10A is a diagram illustrating an exemplary sequence in which a Capability Negotiation communication process is performed between a source device and a sink device (a communication example of requesting an accessibility function from a source device).

FIG. 12 is a diagram illustrating operation examples of a sink device in accessibility mode types.

FIG. 15C is a diagram illustrating an example of a frame format of WebSocket exchanged between a source device 410 and a sink device 420.

FIG. 26 is a diagram illustrating a format example of a WFD IE.

FIG. 27 is a diagram illustrating an example of a general format of a WFD Subelement.

FIG. 28 is a diagram illustrating an example of a WFD Subelement ID Definition.

FIG. 29 is a diagram illustrating an example of a New Device Subelement.

FIG. 30 is a diagram illustrating an example of a New Device Information Field.

FIG. 31 is a diagram illustrating an example of a payload of an ASP message.

MODE FOR CARRYING OUT THE INVENTION

Hereinafter, exemplary embodiments of the technology disclosed in this specification will be described in detail with reference to the drawings.

Example 1

First Embodiment

[Configuration of Communication System]

Figure 1:
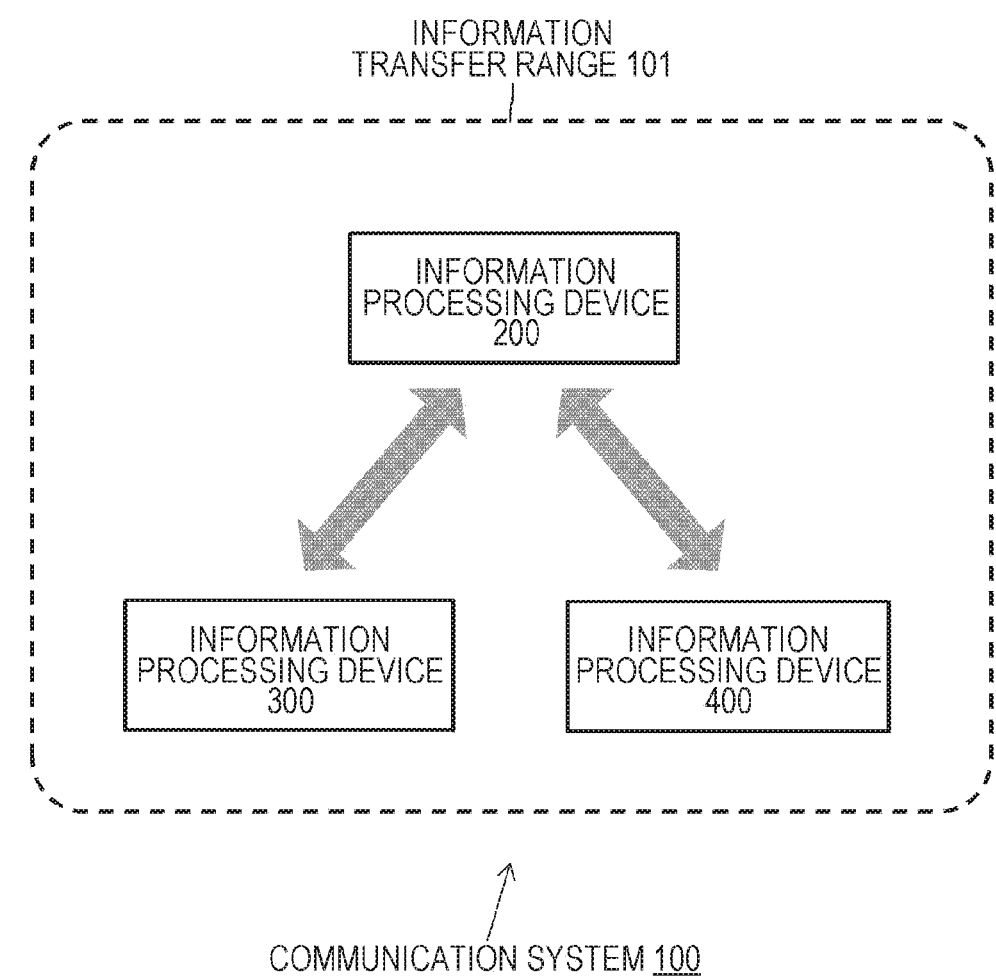
FIG. 1 is a diagram schematically illustrating an exemplary configuration of a communication system 100 according to a first embodiment of the technology disclosed in this specification.

FIG. 1 schematically illustrates an exemplary configuration of a communication system 100 according to a first embodiment of the technology disclosed in this specification. In the illustrated communication system 100, a wireless connection in a multi-sink topology environment using P2P direct communication is assumed to be established. Specifically, the communication system 100 includes three information processing devices 200, 300, and 400, and data (for example, image data or audio data) transmitted from one information processing device 200 serving as a source device is received by two other information processing devices 300 and 400 serving as a sink device. Since a plurality of sink devices exist for one source device, the communication system 100 illustrated in FIG. 1 can be referred to as a multi-sink topology environment.

Each of the information processing devices 200, 300, and 400 constituting the communication system 100 is a communication device having a wireless communication function. For example, each of the information processing devices 200, 300, and 400 is a display device (for example, a personal computer) having a wireless communication function or a mobile information processing device (such as a smartphone or a tablet terminal). Further, each of the information processing devices 200, 300, and 400 is a wireless communication device conforming to institute of electrical and electronics engineers (IEEE) 802.11, IEEE802.15, IEEE802.16, a 3rd generation partnership project (3GPP) standard (for example, wideband code division multiple access (W-CDMA), global system for mobile communications (GSM (registered trademark)), worldwide interoperability for microwave access (WiMAX), WiMAX2, long term evolution (LTE), or LTE-Advanced (LTE-A). Further, each of the information processing devices 200, 300, and 400 is able to exchange various kinds of information using one of the above wireless communication functions.

Here, the information processing device 300 or 400 serving as a sink device is a device having the same functional configuration in a point that it receives data transmitted from the information processing device 200 serving as a source device. Further, an exchange between the information processing device 200 and the information processing device 400 is basically equivalent to an exchange between the information processing device 200 and the information processing device 300. Therefore, in the following description, only a connection method between the information processing device 200 and the information processing device 300 will be described as the first embodiment, and description of a connection method between the information processing device 200 and the information processing device 400 will be omitted. Further, an example in which wireless communication using a wireless local area network (LAN) is performed between the information processing device 200 and the information processing device 300 will be described as an example.

As this wireless LAN, for example, a wireless fidelity (Wi-Fi) direct, tunneled direct link setup (TDLS), an ad hoc network, or a mesh network can be used. Further, for example, Wi-Fi CERTIFIED Miracast (a technical specification title: Wi-Fi Display) can be used as short-range wireless audio visual (AV) transmission communication used in the communication system 100. Further, Wi-Fi CERTIFIED Miracast is a mirroring technique in which a sound or a display image to be reproduced in one terminal is transmitted to another terminal using a technology of Wi-Fi Direct or TDLS, and the sound or image data is similarly output even in another terminal.

Further, in Wi-Fi CERTIFIED Miracast, user input back channel (UIBC) is implemented on transmission control protocol/Internet protocol (TCP/IP). UIBC is a technique of transmitting operation information of an input device such as a mouse or a keyboard from one terminal to another terminal. Further, other remote desktop software (for example, virtual network computing (VNC)) may be applied instead of Wi-Fi CERTIFIED Miracast.

Here, in Wi-Fi CERTIFIED Miracast, it is specified that an image (video) is compressed and developed using, for example, H.264. Further, for example, in Wi-Fi CERTIFIED Miracast, it is possible to adjust H.264 on a transmitting side. Further, in addition to H.264, for example, H.265 (for example, high efficiency video coding (HEVC) or scalable video coding extensions of high efficiency video coding (SHVC)), moving picture experts group (MPEG) 4, or joint photographic experts group (JPEG) 2000 can be supported as well. Further, for example, a line-based codec (for example, a wavelet or a discrete cosine transform (DCT)) that tie one or more lines in a bundle and compresses the line or divides two or more lines into 2×2 or more macroblocks and compresses or develops the lines can be supported as well. Further, for example, a codec that reduces a transmission rate without performing compression such as the DCT or the wavelet by obtaining a difference with a previous code amount region of a specific code amount region (a picture, a bundle of a plurality of lines, a macroblock, or the like) can be supported as well. Further, transmission and reception of images (videos) may be performed between the information processing device 200 and the information processing device 300 without compression.

In the communication system 100 according to the first embodiment, as data to be transmitted from the information processing device 200 to the information processing device 300, for example, image data and audio data generated by an imaging operation, content (for example, content configured with image data and audio data) stored in a storage device such as a hard disk, or the like are assumed. An electronic device including a camera (for example, a personal computer, a game machine, a smartphone, or a tablet terminal) may be used as the information processing device 200 serving as a transmission source of data. Further, another electronic device including a display unit (for example, an imaging device, a game machine, a smartphone, or a tablet terminal) may be used as the information processing device 300 serving as a transmission destination of data. Further, when the information processing device 200 has a tethering function, content stored in an Internet services provider (ISP) may be set as a transmission target to the information processing device 300 via a wireless or wired network.

For example, image data generated by an imaging operation of the information processing device 200 is transmitted to the information processing device 300, and an image based on the received image data is displayed on a display unit on the information processing device 300 side.

Further, in FIG. 1, a range in which the information processing device 200 can perform direct communication through the P2P direct connection using the wireless communication, that is, an information transfer range is indicated by reference numeral 101. The information transfer range 101 is an information transfer range (service range) based on the information processing device 300.

A method of constructing the multi-sink topology will be described before describing an operation between information processing device 200 and information processing device 300 in detail.

Figure 18:
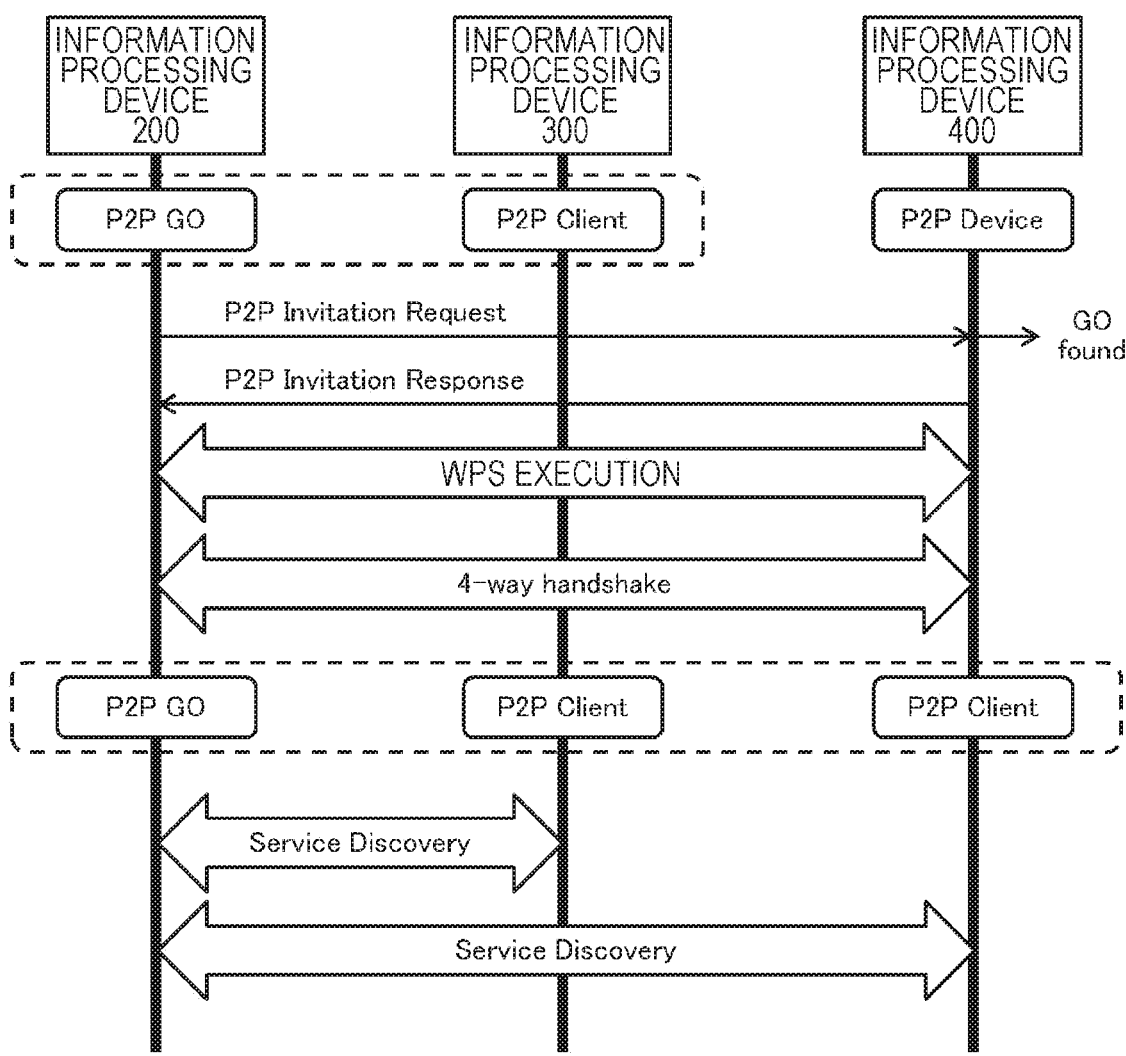
FIG. 18 is a diagram illustrating an exemplary basic sequence until a multi-sink topology environment is constructed from P2P direct connection.

FIG. 18 illustrates an exemplary basic sequence from P2P direct connection to construction of the multi-sink topology environment. In FIG. 18, an exemplary operation in which the information processing device 400 joins a group in an environment in which the information processing device 200 serving as the source device is connected with the information processing device 300 serving as the sink device through the P2P direct communication.

The information processing device 200 is already connected with a P2P client of the information processing device 300 as a group owner (GO). For this reason, an Invitation Request process is performed from the information processing device 200 to the information processing device 400. Alternatively, a Provision Discovery process may be performed from the information processing device 400 to the information processing device 200. When the operation sequence is described using the Invitation Request process as an example, an Invitation Response is transmitted from the information processing device 400 to the information processing device 200.

Through the above processing, the information processing device 200 is connected with the information processing device 400 as a new P2P client. Further, the service discovery is mutually performed, and thus the multi-sink topology is constructed by the information processing device 200 serving as the source device and the information processing devices 300 and 400 serving as the sink device.

After the multi-sink topology is constructed, the content transmitted from the information processing device 200 to the information processing device 300 or the information processing device 400 and displayed may be the same content (image) or different content (images). For example, the image displayed on the information processing device 200 may be transmitted to the information processing device 300 without change, and the content stored in the storage unit of the information processing device 200 may be transmitted to the information processing device 400.

[Configuration of Source Device]

Figure 2:
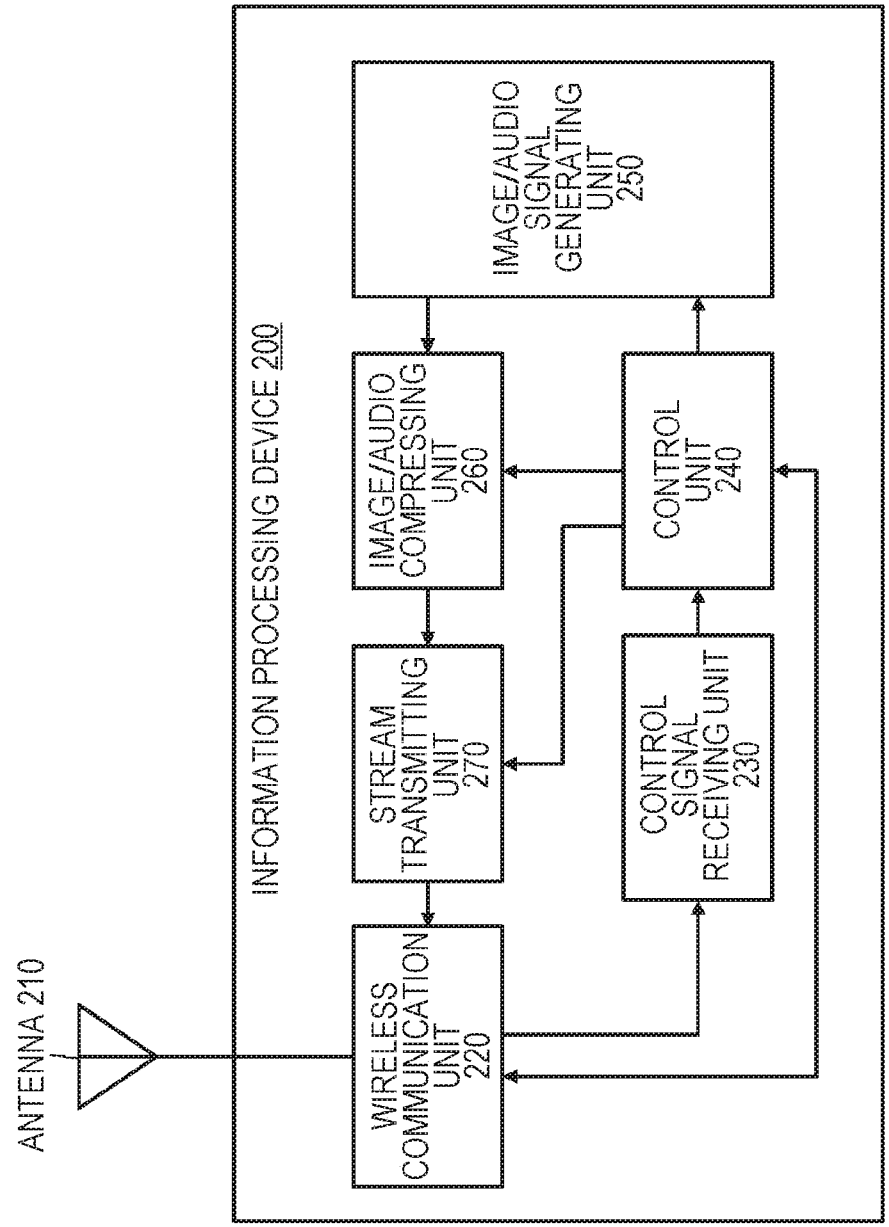
FIG. 2 is a diagram schematically illustrating an exemplary functional configuration of an information processing device 200 operating as a source device.

FIG. 2 schematically illustrates an exemplary functional configuration of the information processing device 200 operating as the source device in the communication system 100 according to the first embodiment.

The information processing device 200 includes an antenna 210, a wireless communication unit 220, a control signal receiving unit 230, a control unit 240, an image/audio signal generating unit 250, an image/audio compressing unit 260, and a stream transmitting unit 270. The respective units will be described below.

The wireless communication unit 220 performs transmission and reception of each piece of information (for example, image data, audio data, and control data) with another information processing device (for example, the sink device such as the information processing device 300) via the antenna 210 using wireless communication on the basis of control of the control unit 240. For example, when a transmission process of image data to another information processing device is performed, the image data generated through the image/audio signal generating unit 250 is compressed through the image/audio compressing unit 260, and the compressed image data (image stream) is transmitted from the antenna 210 through the wireless communication unit 220.

Further, the wireless communication unit 220 is assumed to be able to perform transmission and reception of each piece of information with another information processing device (for example, the information processing device 300) using a plurality of frequency channels. In the first embodiment, an example in which the wireless communication unit 220 has a function capable of transmitting and receiving three frequencies channels of 2.4 GHz, 5 GHz, 60 GHz simultaneously or only a selected frequency will be described. As described above, when the source device has a function capable of transmitting and receiving a plurality of frequency channels, the sink device (for example, the information processing device 300) is able to control a frequency channel to be used for each source device.

The control signal receiving unit 230 acquires a control signal (for example, exchange information with the information processing device 300) transmitted from another information processing device (for example, the information processing device 300) from each piece of information received through the wireless communication unit 220. Then, the control signal receiving unit 230 outputs the acquired control signal to the control unit 240.

The control unit 240 performs control related to each piece of information transmitted from the information processing device 200. For example, the control unit 240 controls the image/audio signal generating unit 250 and the image/audio compressing unit 260 on the basis of the control signal received through the control signal receiving unit 230. Specifically, the control unit 240 performs control such that the resolution of image data to be transmitted and the number of audio channels are changed and performs control such that an image region of image data to be transmitted is changed. In other words, the control unit 240 performs transmission control of a stream to be transmitted on the basis of the control signal received through the control signal receiving unit 230. Examples of the transmission control of the stream include data transmission rate control and scalability transmission rate control.

Further, the control unit 240 may have a function of measuring a radio wave propagation state (a link radio wave propagation state) when transmission and reception of data with the sink device (for example, the information processing device 300) are performed using wireless communication and transmit a measurement result (radio wave propagation measurement information) from the wireless communication unit 220 to the sink device.

Here, the radio wave propagation measurement information is, for example, information used for determining whether or not a line quality with the sink device is a quality in which transmission and reception of image data and audio data can be performed. Further, the radio wave propagation measurement information is used, for example, for transmission control of the stream.

Further, here, the data transmission rate mainly means a rate of occupying a communication path and is assumed to include a meaning of a communication rate and a communication capability. Further, for example, the resolution is defined as an index of an image quality including elements such as a picture frame of image data frame (the number of vertical and horizontal pixels) and a bit rate (compression ratio) of image data. Further, a throughput of a stream can be used as an index of the image quality. Further, the number of audio channels is assumed to have a meaning of an audio recording/reproducing method such as monaural (1.0 ch), stereo (2.0 ch), 5.1 ch, 6.1 ch, 9.1 ch, and a high resolution audio. Further, the number of audio channels is defined as an index of an audio quality including elements such as a bit rate (compression ratio) and the number of channels of audio data. Further, a throughput of a stream can be used as an index of an audio quality.

Further, the control unit 240 performs control such that a state that is unable to be stabilized by the data transmission rate control is improved. For example, the control unit 240 detects system performance information of the sink device by exchanging information with the sink device (for example, the information processing device 300). Here, the system performance information is, for example, performance information of the sink device related to the system. Examples of the system performance information include an available frequency channel, a resolution, and a transmission control protocol (a transmission control protocol (TCP) or user datagram protocol (UDP)). Further, the system performance information is information indicating, for example, support of an encryption method, support of standard definition (SD)/high definition (HD)/4K, and support of a low power consumption mode. For example, the control unit 240 can select a transmission control method of a stream that further improves stability of the entire system of the communication system 100 in accordance with whether or not the sink device supports the low power consumption mode.

Further, the control unit 240 is assumed to receive information indicating whether or not the information processing device 200 is a mobile device during exchange of information with the sink device. For example, capability information related to the information processing device 200 can include information indicating whether the information processing device 200 is a mobile device. On the sink device side such as the information processing device 300, when the information processing device 200 is detected to be a mobile device, it is possible to determine that it is unnecessary to operate the information processing device 200 on the basis of an association with connected other information processing devices. As described above, when the sink device determines that it is unnecessary to operate the information processing device 200, the information processing device 200 receives a transmission stop command from the sink device. Further, when the transmission stop command is detected, the control unit 240 can power off the functions of the image/audio signal generating unit 250, the image/audio compressing unit 260, and the stream transmitting unit 270 for a certain period of time. Further, the control unit 240 can cause the wireless communication unit 220 to transition to intermittent reception (a mode in which the wireless communication unit 220 wakes up periodically so that a command can be received from the sink device, and the remaining components powered off).

On the basis of control of the control unit 240, the image/audio signal generating unit 250 generates data (image data and audio data) of an output target, and outputs the generated data to the image/audio compressing unit 260. For example, the image/audio signal generating unit 250 includes an imaging unit and an audio acquiring unit (which are not illustrated). The imaging unit (for example, a lens, an imaging element, and a signal processing circuit) images a subject and generates image (image data). Further, the audio acquiring unit (for example, a microphone) acquires ambient sound at the time of generating the image data through the imaging unit. The data generated by the image/audio signal generating unit 250 becomes a transmission target to another information processing device (for example, a sink device such as the information processing device 300).

The image/audio compressing unit 260 compresses (encodes) the data (image data and audio data) generated by the image/audio signal generating unit 250 on the basis of the control of the control unit 240. Then, the image/audio compressing unit 260 outputs the compressed data (image data and audio data) to the stream transmitting unit 270. Further, the image/audio compressing unit 260 may be implemented by execution of encoding by software or may be implemented by execution of encoding by hardware. Further, the image/audio compressing unit 260 is assumed to function as a codec and deal with uncompressed image or sound. Furthermore, the image/audio compressing unit 260 is also assumed to function as a scalable codec. Here, the scalable codec means a codec which can be adapted freely according to, for example, the resolution of the information processing device (the sink device) on the receiving side or a network environment.

On the basis of the control of the control unit 240, the stream transmitting unit 270 performs a transmission process of transmitting the data (image data and audio data) compressed through the image/audio compressing unit 260 from the antenna 210 as a stream via the wireless communication unit 220.

Further, the information processing device 200 can include a display unit, an audio output unit, an operation receiving unit, and the like in addition to the above-described components, but these components are not illustrated in FIG. 2 for the sake of simplicity.

The display unit (not illustrated) of the information processing device 200 displays, for example, the image generated through the image/audio signal generating unit 250. Various kinds of display panels can be used as the display unit. For example, organic electro luminescence (EL), crystal light emitting diode (LED) display, or liquid crystal display (LCD) can be used.

Further, the audio output unit (not illustrated) of the information processing device 200 is, for example, a speaker, and outputs an audio generated through the image/audio signal generating unit 250. Further, although the image can be output from both the transmitting device and the receiving device, but it is desirable that a sound output from one of the transmitting device and the receiving device.

Further, examples of the operation receiving unit (not illustrated) of the information processing device 200 include a keyboard, a mouse, a game pad, a touch panel, a camera, and a microphone, and receives operation inputs performed by the operator. Further, the operation receiving unit and the display unit may be integratedly configured using a touch panel that enables the operator to perform operation inputs by bringing a finger into contact with or close to a display surface.

Further, in this specification, an example in which the information processing device 200 generates the image data and the audio data to be transmitted will be described, but the information processing device 200 may acquire the image data and the audio data to be transmitted from an external device. For example, the information processing device 200 may acquire the image data and the audio data to be transmitted from a web camera with a microphone.

Further, the information processing device 200 may set content (for example, content including image data and audio data) stored in a storage device (not illustrated) (for example, a hard disk) as a transmission target. The storage device may be either an internal connection or an external connection of the information processing device 200. In this case, the content stored in the storage device may be assumed to be compressed content. When the compressed content is compressed by an encoding scheme defined in a standard employed in the communication system 100, the compressed content may be transmitted without change without being decoded.

[Configuration of Sink Device]

Figure 3:
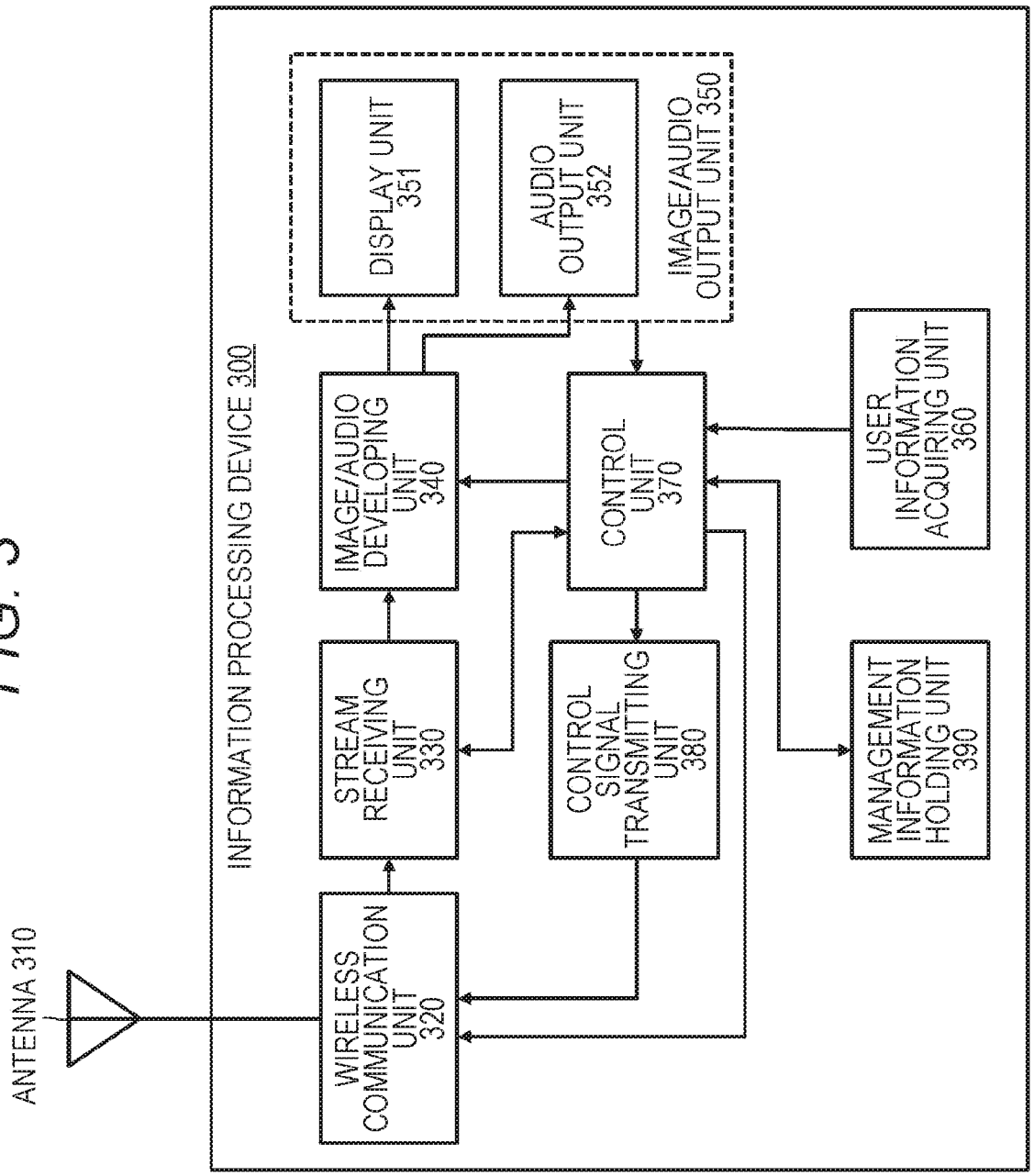
FIG. 3 is a diagram schematically illustrating an exemplary functional configuration of an information processing device 300 operating as a sink device.

FIG. 3 schematically illustrates an exemplary functional configuration of the information processing device 300 operating as a sink device in the communication system 100 according to the first embodiment. It is understood that other information processing devices 400 also have a similar functional configuration.

The information processing device 300 includes an antenna 310, a wireless communication unit 320, a stream receiving unit 330, an image/audio developing unit 340, an image/audio output unit 350, a user information acquiring unit 360, a control unit 370, a control signal transmitting unit 380, and a management information holding unit 390. The image/audio output unit 350 has a display unit 351 and an audio output unit 352. The respective components will be described below.

On the basis of the control of the control unit 370, the wireless communication unit 320 performs wireless communication to perform transmission and reception of each piece of information (for example, image data and audio data) with another information processing device (for example, the source device such as the information processing device 200) via the antenna 310 using the wireless communication. For example, when a process of receiving image data from another information processing device is performed, the image data received by the antenna 310 is developed (decrypted) by the image/audio developing unit 340 via the wireless communication unit 320 and the stream receiving unit 330. Then, the developed image data is supplied to the image/audio output unit 350, and an image corresponding to the developed image data is output from the image/audio output unit 350. In other words, the image corresponding to the developed image data is displayed on the display unit 351. Further, a sound corresponding to the developed audio data is output from the audio output unit 352 in an audio output form.

Further, the wireless communication unit 320 is assumed to be able to perform transmission and reception of each piece of information with another information processing device (for example, the information processing device 200) using a plurality of frequency channels. In the first embodiment, an example in which the wireless communication unit 320 has a function capable of transmitting and receiving three frequency channels of 2.4 GHz, 5 GHz, and 60 GHz simultaneously or only a selected frequency will be described. In other words, the wireless communication unit 320 is assumed to be able to perform communication using a first frequency band and communication using a second frequency band of a data transmission rate higher than the first frequency band. Further, the control unit 370 controls a frequency channel to be used among a plurality of frequency channels for wireless communication with each source device.

Further, in the communication system 100 illustrated in FIG. 1, a link between the information processing device 200 and the information processing device 300 (or between the source device and the sink device) and a link between the information processing device 400 and the information processing device 300 (or the sink devices) may be the same or different in the frequency channel.

Further, in the first embodiment, an example in which the wireless communication unit 320 has a function capable of transmitting and receiving three types of frequency channels of 2.4 GHz, 5 GHz, and 60 GHz will be described, but the frequency channel to be used is not limited thereto. For example, the wireless communication unit 320 may have a function capable of transmitting and receiving other frequency channels or one or two types of frequency channels. Further, the wireless communication unit 320 may have a function capable of transmitting and receiving four or more types of frequency channels.

On the basis of the control of the control unit 370, the stream receiving unit 330 receives information and a stream (for example, an image stream and an audio stream) of exchange with each source device among the information received by the wireless communication unit 320. Then, the stream receiving unit 330 outputs the received information of the exchange to the control unit 370, and outputs the received stream to the image/audio developing unit 340 and the control unit 370.

Here, the information of the exchange with each source device is information transmitted from the source device (for example, the information processing device 200) and includes, for example, an acquisition request for the system performance information of the information processing device 300. For example, the system performance information is information indicating an available frequency channel, a resolution, support of TCP, UDP, and an encryption method, support of SD/HD/4K, and support of the low power consumption mode.

Further, the stream receiving unit 330 has a function of measuring the radio wave propagation state (the link radio wave propagation state) when transmission and reception of data with the source device is performed using wireless communication. Then, the stream receiving unit 330 outputs a measurement result (the radio wave propagation measurement information) to the control unit 370.

On the basis of the control of the control unit 370, the image/audio developing unit 340 develops (decodes) the stream (image data and audio data) transmitted from another information processing device (for example, the information processing device 200). Then, the image/audio developing unit 340 outputs the developed data (image data and audio data) to the image/audio output unit 350. Further, the image/audio developing unit 340 may be implemented by execution of decoding by software or may be implemented by execution of decoding by hardware. Further, the image/audio developing unit 340 is assumed to function as a codec but is assumed to deal with uncompressed image or sound. Further, the image/audio developing unit 340 is assumed to function as a scalable codec as well.

The display unit 351 in the image/audio output unit 350 displays each image based on the image data developed by the image/audio developing unit 340. Further, as the display unit 351, for example, a display panel such as an organic EL panel, a crystal LED display, an LCD panel or the like can be used. Further, as the display unit 351, a touch panel that enables the operator to perform operation inputs by bringing a finger into contact with or close to a display surface.

Further, the audio output unit 352 is configured with, for example, a speaker, and outputs various sounds (such as a sound related to the image displayed on the display unit 351) based on the audio data developed by the image/audio developing unit 340. As an audio output method, for example, a method in which only a sound of the source device to which a central channel (main image) is reproduced from the speaker, and a sound of the source device to which a peripheral channel (sub image) is allocated is not reproduced is not reproduced can be used. Further, as another audio output method, for example, a method of setting a sound volume of the source device to which the central channel is allocated to be main and reducing a sound volume of the source device to which the peripheral channel is allocated and reproducing it. Of course, any other audio output method may be used.

The user information acquiring unit 360 acquires information (user information) related to the operator of the information processing device 300, and outputs the acquired user information to the control unit 370. For example, the user information acquiring unit 360 can acquire the user information by receiving an input from an operation receiving unit by which the operator can directly set a display method (a keyboard, a mouse, a remote controller, a game pad, or a touch panel). Further, the operation receiving unit is, for example, an operation member for designating an arbitrary region in the image displayed on the display unit 351. Further, for example, the user information acquiring unit 360 can acquire the user information by receiving an input from a device capable of detecting an intention of the operator such as a camera, a microphone, various kinds of sensors (for example, a gyro sensor and a sensor of sensing a human body).

For example, the user information acquiring unit 360 acquires user information generated by a user operation by the operator when information based on the stream received from another information processing device (for example, the information processing device 200) is output from the image/audio output unit 350 using wireless communication. The user information is, for example, user information generated by a user action related to the image displayed on the display unit 351. For example, the user information is information generated on the basis of a user operation related to the image displayed on the display unit 351.

Further, the user information acquiring unit 360 can acquire the image data generated by an imaging unit (not illustrated) attached to the display unit and generate the user information. Further, the user information acquiring unit 360 may acquire information (for example, position information and identification information) acquired by an external device (for example, each sensor or a wearable device) and generate the user information.

The control unit 370 causes each piece of information acquired by the stream receiving unit 330 to be held in the management information holding unit 390 and manages the source device on the basis of management information held in the management information holding unit 390. Further, in the multi-source topology environment, the control unit 370 performs stream transmission control for streams transmitted from a plurality of source devices such that the stability of the entire system is improved.

For example, the control unit 370 performs the stream transmission control on the basis of the user information acquired by the user information acquiring unit 360 and the management information held in the management information holding unit 390. Specifically, the control unit 370 generates a control signal for performing the stream transmission control for each source device on the basis of the management information held in the management information holding unit 390. Then, the control unit 370 outputs the generated control signal to the control signal transmitting unit 380. For example, the control unit 370 changes the resolution of the image displayed on the display unit 351 on the basis of the user information and the management information, and generates a control signal for requesting each source device to set a transmission rate equivalent to the resolution. Further, for example, the control unit 370 generates a control signal for deciding a display region of the image in the display unit 351 on the basis of the user information and the management information. Further, for example, the control unit 370 generates a control signal for deciding a size of the image in the display unit 351 on the basis of the user information and the management information.

Further, the control unit 370 performs control for setting the frequency channel and the resolution to be used on the basis of the user information and the management information. For example, the control unit 370 sets the frequency channel to be used for each source device for a plurality of frequency channels of the wireless communication unit 320. Further, when the power consumption mode differs according to each frequency channel, the control unit 370 can detect the respective modes and set a frequency channel in which the power consumption of the mobile device is cared. In other words, the control unit 370 can separately set a first power consumption mode related to the first frequency band and a second power consumption mode related to the second frequency band having a data transmission rate higher than the first frequency band.

The control signal transmitting unit 380 performs a transmission process of transmitting the control signal output from the control unit 370 to another information processing device through the wireless communication unit 320 and the antenna 310.

[Communication Example of Exchange Using Wi-Fi Certified Miracast Specification Command]

Figure 4:
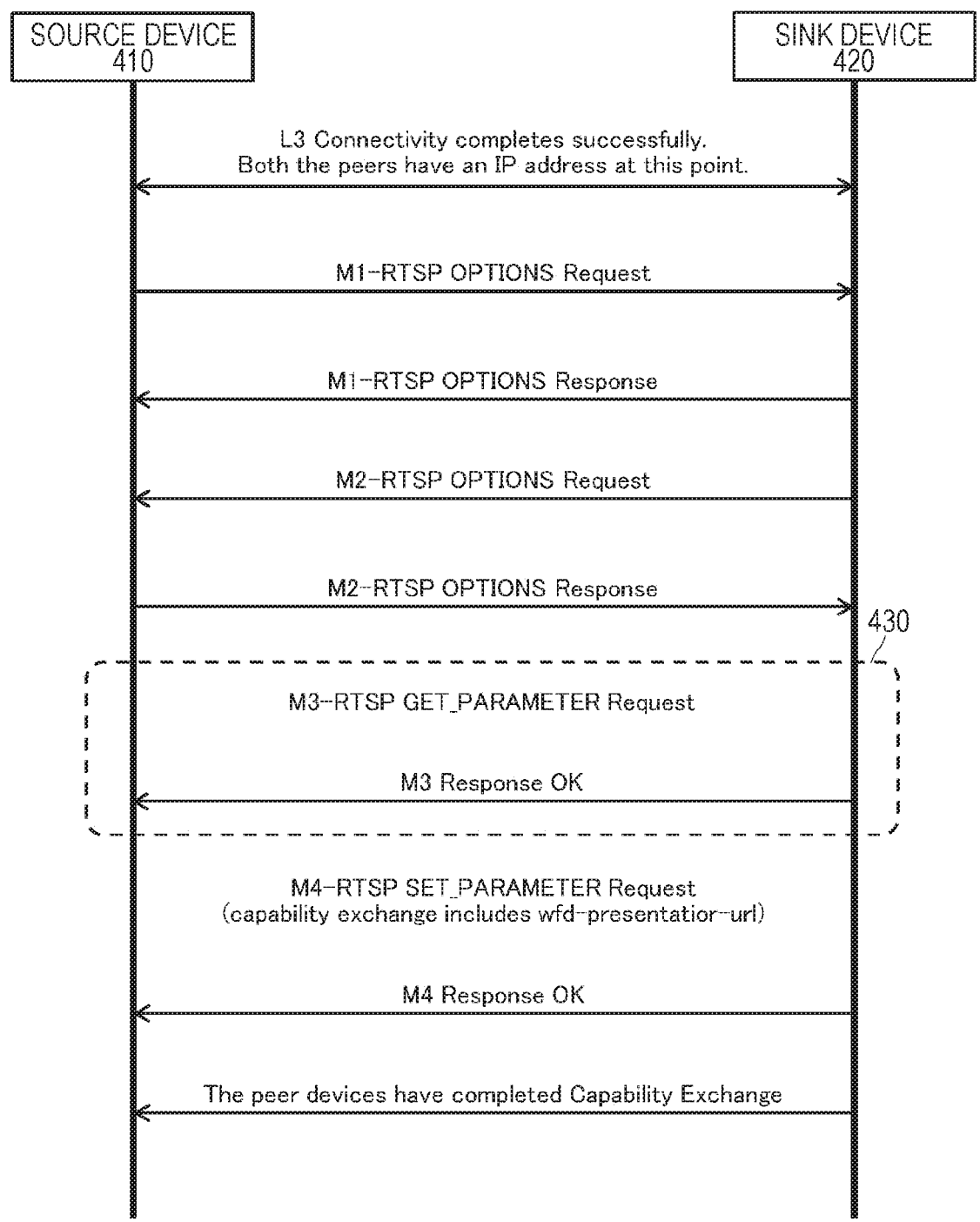
FIG. 4 is a diagram illustrating an exemplary connection sequence between a source device 410 and a sink device 420 according to the first embodiment.

FIG. 4 illustrates an exemplary connection sequence between a source device 410 and a sink device 420 according to the first embodiment. FIG. 4 illustrates an exemplary communication process of exchange (WFD capability negotiation) using a real time streaming protocol (RTSP) protocol. Here, the source device 410 and the sink device 420 are assumed to correspond to the information processing device 200 and the information processing device 300 in the communication system 100 illustrated in FIG. 1, respectively.

First, as illustrated in a dotted rectangle 430 in FIG. 4, an "RTSP M3 Request" (RTSP GET_PARAMETER Request) message transmitted from the source device 410 to the sink device 420 and an "RTSPM3 Response" (RTSP GET_PARAMETER Response) message transmitted from the sink device 420 to the source device 410 can be used.

On the other hand, transmission from the source device 410 to the sink device 420 may be appropriately performed. For example, the exchange of the "RTSP M3 Request" message and the "RTSP M3 Response" message may be omitted, the management information may be included in the message transmitted from the source device 410 to the sink device 420, the management information may be transmitted from the source device 410 to the sink device 420, and the sink device 420 may select information and cause the information to be held in the management information holding unit 390. Further, when a content/protection setting is performed, a link protection setup may be performed after the "RTSP M3 Response" message, and thereafter, communication may be performed while securing the confidentiality related to a message of M4 or higher.

Information on sink device 420 received as the RTSP M3 Response is as follows.

Audio format (s) supported by the WFD Sink.
Video format (s) support by the WFD Sink.
3D formats supported by the WFD Sink.
The HDCP system 2.0/2.1/2.2 support/control port.
Available EDID information of display attached to the WFD Sink.
Coupled WFD Sink information.
RTP port (s) the WFD sink (s) listen on.
Supports I 2 C commands and port number.
UIBC capability supported.
WFD Source uses this parameter to obtain the connector type currently active on the WFD Sink.
Indicate the support for standby and resume control using RTSP.

A connection sequence between the source device 410 and the sink device 420 illustrated in FIG. 4 is applied to the connection sequence between the information processing device 200 and the information processing device 300 in the communication system 100 according to the first embodiment and the connection sequence between the information processing device 200 and the information processing device 400.

[Multi-Sink Topology Environment in which Accessibility Mode is Mixed]

Next, an environment in which the accessibility mode which is a terminal mode for persons with disabilities is mixed in the multi-sink topology environment illustrated in FIG. 1.

Here, the accessibility mode is a mode of supporting browsing guarantee (web accessibility) for persons with physical disabilities or senior citizens suffering functional degeneration of the body. A type of accessibility mode (an operation to be supported in the information processing device) differs according to each disability to be supported such as a "visual disability support" of supporting sight disabilities, a "hearing disability support" of supporting hearing disabilities, and a "body function (operation difficulty) support" of supporting cognitive or physical disabilities. Operations of the information processing device in the respective accessibility mode types will be described below.

(1) Sight Disability Support

The sight support is performed by reading screen content by voice. Specifically, there are terminals in which a function or a tap of reading an application name by voice is changed, selection of an icon is performed by single tapping, and execution of the icon is performed by double tapping. Furthermore, a method of notifying of selection of an icon by vibration can be used, or a braille display can be connected.

It is also possible to enlarge characters on the screen, enlarge or reduce the screen by a zoom function, and reverse colors of the screen.

(2) Hearing Disability Support

Subtitles are displayed at the time of viewing movies or videos.

A sound volume is adjusted.

A notification of incoming signals is given by LED flash.

(3) Body Function Support

A gesture that is unable to do such as a pinch is replaced with another gesture which is independently created to be operated by operators with cognitive or physical disabilities.

A voice operation can be enabled when a gesture such as a pinch is unable to be performed.

Figure 8:
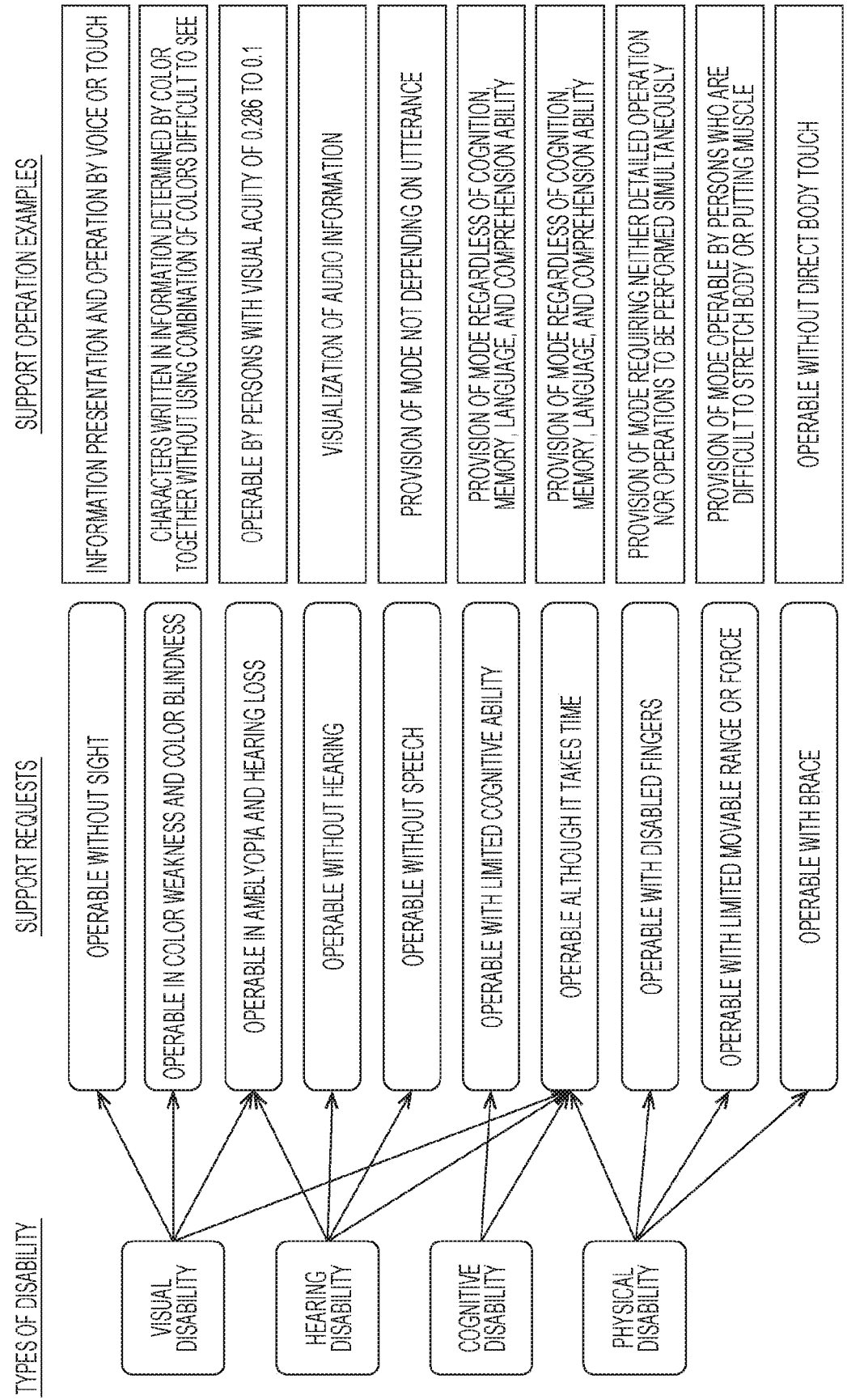
FIG. 8 is a diagram illustrating types of disability, support requests, and support examples.

FIG. 8 illustrates a summary of support requests for the information processing device for each type of disability and operation examples which are actually supported by the information processing device.

As an additional description to FIG. 8, as a specific example of a support operation "information presentation and operation by voice or touch," a text to speech (TTS), a notification sound, a convex point, braille, a display, a voice operation, and the like may be used. Further, as a specific example of a support operation "characters written in information determined by color together without using a combination of colors difficult to see," a combination of red and green may be prohibited, or characters may be written in a color key together. Further, as a specific example of a support operation "operable by persons with visual acuity of 0.286 to 0.1," enlargement of characters or a screen, change of a contrast, or the like may be used. Further, as a specific example of a support operation "visualization of audio information," speech to text, notification light, vibration, a gesture, a sign language, or the like may be used. Further, as a specific example of a support operation "provision of mode not depending on utterance," keyboard support or the like may be used. Further, as a specific example of a support operation "provision of mode regardless of cognition, memory, language, and comprehension ability," a plain text, a TTS, a symbol, or an illustration may be used together. Further, as a specific example of a support operation "provision of mode requiring neither detailed operation nor operations to be performed simultaneously," keyboard shortcut support or the like may be used. Further, as a specific example of a support operation "provision of mode operable by persons who are difficult to stretch body or putting muscle," a touch panel, an external keyboard, a voice operation, or the like may be used. Further, as a specific example of a support operation "operable without direct body touch," a large keyboard, a voice operation, and the like may be used.

Even when the type of disability is the same, the support request for the information processing device differs according to a degree of disability. Further, even when the type of disability is different, the support request for the information processing device or the support operation of the information processing device may be the same or similar, depending on the degree of disability. Here, it is understood that FIG. 8 is merely an example, and other support requests for the type of disability can be considered. Hereinafter, the accessibility mode according to the type of disability is referred to as an "accessibility mode type."

[Assumed Connection Form]

An overview of an operation of the source device in the multi-sink topology environment in which the mode for normal persons (normal mode) and the mode for persons with disabilities mode (accessibility mode) are mixed as modes of a plurality of sink devices will be described.

Figure 5A:
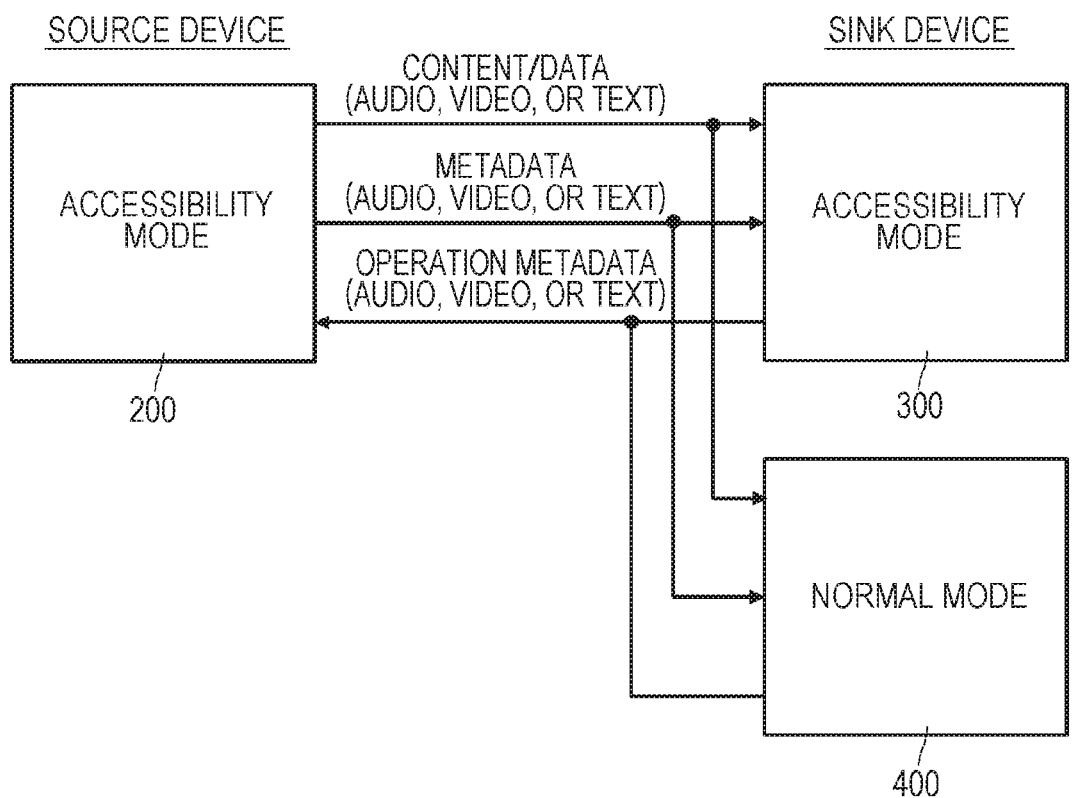
FIG. 5A is a diagram illustrating a connection form in which a source device and a sink device perform exchange in an accessibility mode.

FIG. 5A illustrates an example of a connection form in which both the source device and the sink device perform exchange in the accessibility mode. For example, in the case of the communication system 100 illustrated in FIG. 1, the information processing device 200 and the information processing device 300 operate in the accessibility mode, and the information processing device 400 operates in the normal mode.

Figure 5B:
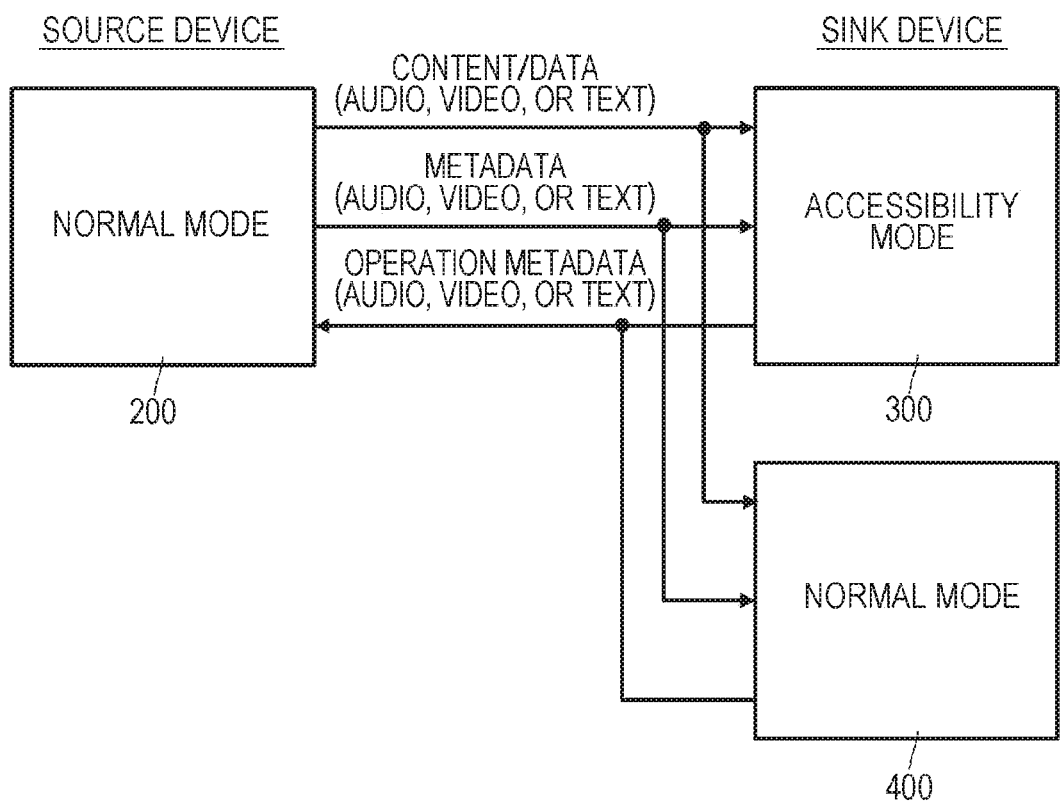
FIG. 5B is a diagram illustrating a connection form in which a source device in a normal mode and a sink device in an accessibility mode perform exchange.

Further, FIG. 5B illustrates an example of a connection form in which the source device in the normal mode and the sink device in the accessibility mode perform exchange. For example, in the communication system 100 illustrated in FIG. 1, the information processing device 200 operates in the normal mode, and at least one of the information processing devices 300 and 400 operates in the accessibility mode.

In the multi-sink topology environment, the sink device in the normal mode and the sink device in the accessibility mode are mixed as illustrated in FIGS. 5A and 5B. The source device checks whether or not the sink device is in the accessibility mode when establishing a connection with each sink device. Further, for the sink device in the accessibility mode, when original image/audio data is transmitted, it is determined whether or not metadata for supporting disabilities (or for guaranteeing browsing of an image to be transmitted) (data necessary for implementing the support operation examples illustrated in FIG. 8, for example, audios, videos, texts, information obtained by visualizing audio information, size information, or the like) is added. The source device changes a metadata transmission method in accordance with whether the accessibility mode of each sink device is turned on or off. Both Multiple Unicast and Multicast can be used as the transmission method.

For example, the source device transmits all metadata which needs to be supported to all connected sink devices. On the other hand, each sink device may determine whether or not metadata suitable for its own accessibility mode type is used.

In the multi-sink topology environment in which the normal mode and the accessibility mode are mixed as illustrated in FIGS. 5A and 5B, the following five approaches (1) to (5) are considered.

(1) In the multi-sink topology environment, the source device performs an arbitration for unifying the modes of the sink devices before starting the image transfer. Specifically, the source device transmits a request (an arbitration for unifying the modes of the sink devices) to each sink device so that the modes of the sink devices are unified and then starts the image transfer.

(2) The source device performs the transmission process in the operation mode of its own terminal without performing the arbitration for unifying the mode of a plurality of sink devices as in (1). Each sink device performs conversion into data which can be dealt with by its own terminal on the basis of the data received from the source device and reproduces it.

(3) In the multi-sink topology environment, the source device detects a connection with the sink device in the accessibility mode and transmits metadata which needs to be supported on the basis of a result of obtaining a logical sum of the accessibility mode types to be connected therefrom. The sink device extracts only the metadata that can be reproduced by its own terminal from a plurality of pieces of received metadata and reproduces it.

(4) In the multi-sink topology environment, the source device detects whether or not there is an accessibility mode terminal among a plurality of sink devices, and when there is an accessibility mode terminal, information of all pieces of metadata selectable as the accessibility mode type is collected through a Capability Negotiation process. The sink device extracts only the metadata that can be reproduced by its own terminal from the received plural metadata and reproduces it.

(5) In the multi-sink topology environment, the source device collects information of the accessibility mode types selected by a plurality of ink devices through the Capability Negotiation process. As a result of collecting the information, the same disability types are grouped, and metadata corresponding to each group is transmitted.

Figure 6:
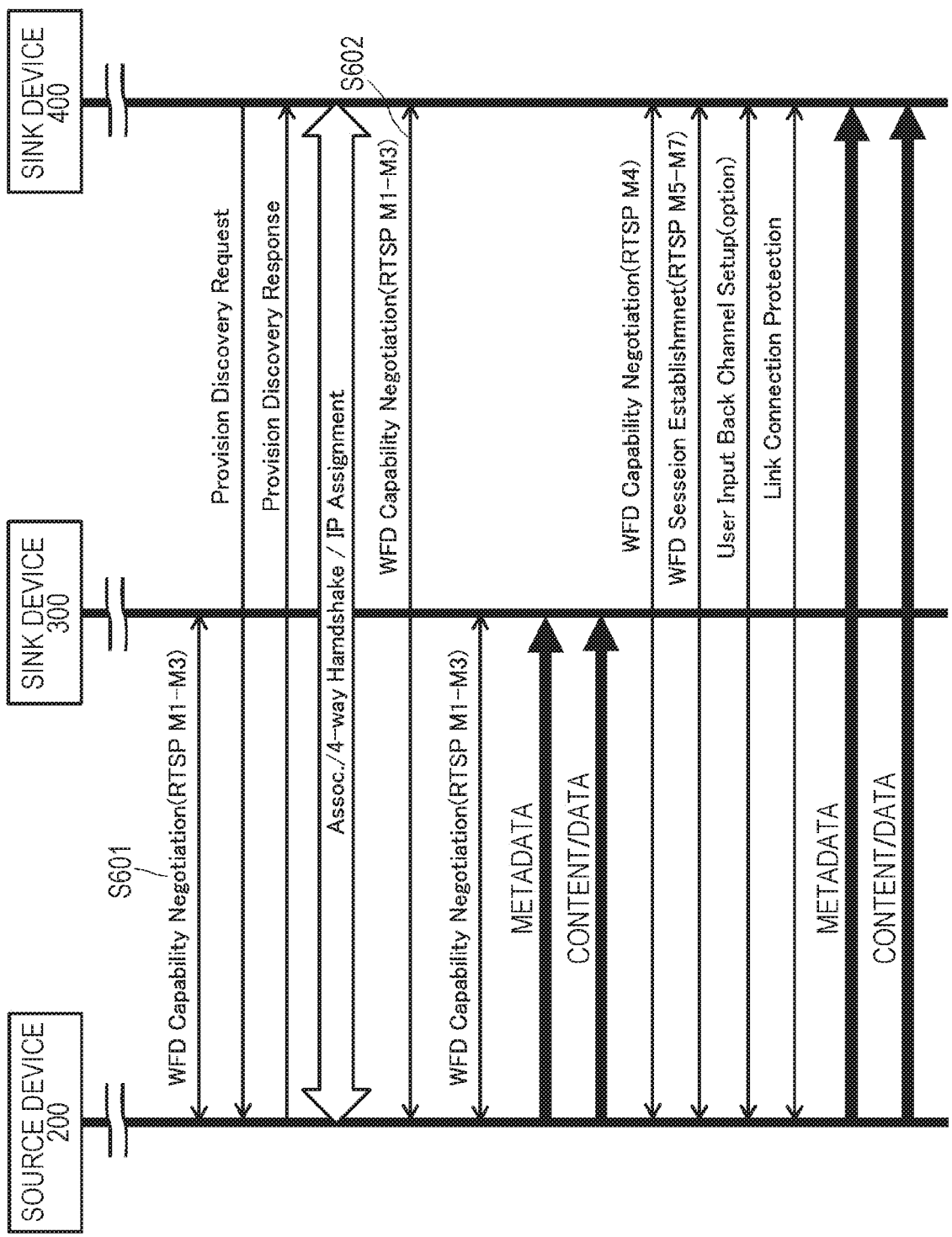
FIG. 6 is a diagram illustrating an exemplary connection sequence between a source device and each sink device in a topology environment illustrated in FIG. 5A.

FIG. 6 illustrates an exemplary connection sequence between the source device and the sink devices in the approach (1) in the topology environment illustrated in FIG. 5A.

When a source device 200 is in the accessibility mode, an approach for determining whether or not a sink device 300 matches up to the accessibility mode type and causing a sink device 400 to switch from the normal mode to the accessibility mode is necessary.

First, a process of the connection sequence of the source device 200 and the sink device 300 on the premise that the accessibility modes of the source device 200 and the sink device 300 coincide with each other in the topology environment illustrated in FIG. 5A will be described.

When a video or an audio is selected by operating the accessibility mode of the source device 200, in addition to transmission of normal content or data (content or data in FIG. 6), one or more pieces of information of the sight support, the hearing support, and the body function (operation difficulty) support are separately transmitted as accessibility mode metadata (metadata in FIG. 6). Here, the transmission procedure of the accessibility mode metadata and the content or data is not limited to a communication procedure illustrated in FIG. 6. The accessibility mode metadata is information that interpolates content or data (to support disabilities), and the accessibility mode metadata and the content or data may be transmitted simultaneously, or either of the accessibility mode metadata and the content or data may be transmitted.

On the other hand, at the same time as when the content or data is received from the source device 200, the sink device 300 receives the accessibility mode metadata, and appropriately displays optimal content in accordance with the control inside the sink device 300.

On the other hand, when the sink device 300 side manipulates the accessibility mode to remotely select a video or an audio of the source device 200, the operation information of the sink device 300 is transmitted from the sink device 300 to the source device 200 separately from the content or data and the metadata as accessibility mode operation information (operation metadata illustrated in FIG. 6). Upon receiving the operation information of the sink device 300 as the accessibility mode operation information of the sink device 300 from the sink device 300, the source device 200 operates according to the received operation information. The operation of the source device 200 based on the accessibility mode operation information has a function equivalent to UIBC of the related art, but the data type of UIBC is assumed to include audio, video, text information, or information obtained by visualizing audio information in view of the browsing guarantee.

Figure 11A:
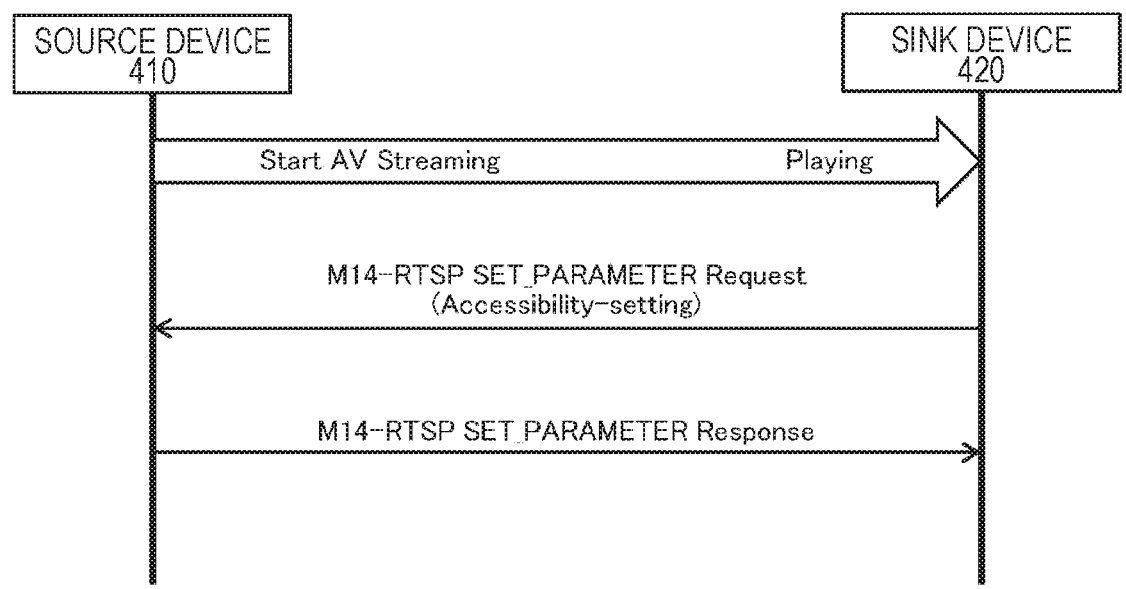
FIG. 11A is a diagram illustrating an exemplary sequence in which a Capability Negotiation communication process is performed between a source device and a sink device (a communication example of requesting an accessibility function from a sink device).
Figure 11B:
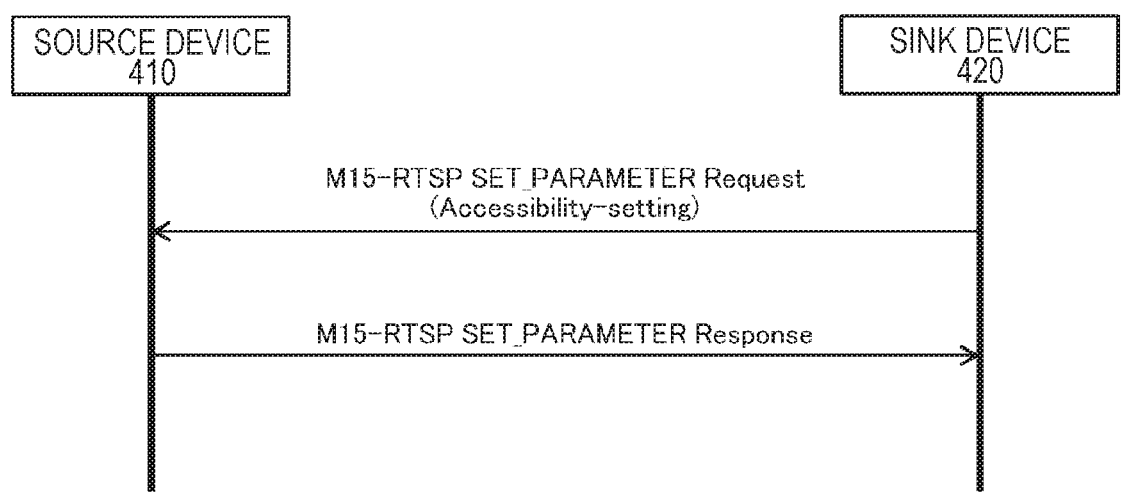
FIG. 11B is a diagram illustrating an exemplary sequence in which a Capability Negotiation communication process is performed between a source device and a sink device (a communication example of requesting connection enable from a sink device).

Here, a mode exchange message signal for performing switching between the normal mode and the accessibility mode in midstream may be prepared for the case in which the operator of the source device 200 or the sink device 300 is changed during the connection. For example, when this message is exchanged between the transmission side and the reception side, it is possible to change the normal mode and the accessibility mode or the type of accessibility mode without disconnecting the wireless video transmission during the currently transmission and reception (an example of an exchange of command is illustrated in FIGS. 11A and 11B (described later)).

Further, before changing the type of accessibility mode, the source device may cause the sink device which is being operated to display a pop-up of causing the operator to check whether or not a change is not a problem.

Next, a process of the connection sequence of the source device 200 and the sink device 300 on the premise that the accessibility modes of the source device 200 and the sink device 300 do not coincide with each other in the topology environment illustrated in FIG. 5A will be described.

When a video or an audio to be transmitted from the source device 200 to the sink device 300 is operated on the source device 200 side, the source device 200 transmits the accessibility mode metadata associated with the video, the audio, or the text created by the operation to the sink device 300 so that the accessibility mode types of the source device 200 and the sink device 300 coincide with each other. At this time, the source device 200 converts the accessibility mode metadata into content/media operable by the sink device 300 and then performs the transmission process. For example, in the case of the accessibility of the hearing support, for movies or video viewing content, the source device 200 transmits text as subtitle data or adjusts the sound volume. Further, the source device 200 performs a process of transmitting control data to the sink device 300 so that incoming signals can be indicated by LED flash on the sink device 300 side.

Further, in the approach (2), when the sink device 400 receives content or data for the accessibility mode or the accessibility mode metadata from the source device 200, the sink device 400 appropriately performs conversion into content and then displays the content.

The source device 200 receives the remote operation information of the source device 200 (converted into the operation information receivable by the source device 200) from the sink device 400 and processes the received operation metadata as the operation data for the accessibility mode without change. A function is equivalent to that of UIBC of the related art, but the audio, the video, the text information, or the information obtained by visualizing the audio information is assumed to be included in the data type of UIBC in view of the browsing guarantee.

Further, the operation for implementing the approach (2) is not limited to the above operation. For example, data conversion suitable for the accessibility mode may be performed on either the source device 200 side or the sink device 400 side. In addition, for example, conversion into the normal mode may be performed on the source device 200 side. Particularly, since the operation data differs in tap handling between the normal mode and the accessibility mode, the conversion operation is necessary in transmission between devices having different modes. For example, in the body function (operation difficulty) support, when the operator of the source device 200 registers his/her own user operation, since the sink devices 300 and 400 are unable to interpret the operation content, it is desirable for the source device 200 to perform detection so that the operation of the accessibility mode of sink device 300 and the operation of the normal mode of the sink device 400 can be detected by the source device 200.

Next, a method in which the source device 410 specifically performs the Capability Negotiation with the sink device 420 using the process in Miracast in the approach (3) will be described with reference to FIG. 7. Through the method of performing the Capability Negotiation, it is possible to check whether or not the source device 410 can determine the selected accessibility mode among the hearing, the sight, and the body function (operation difficulty).

Figure 7:
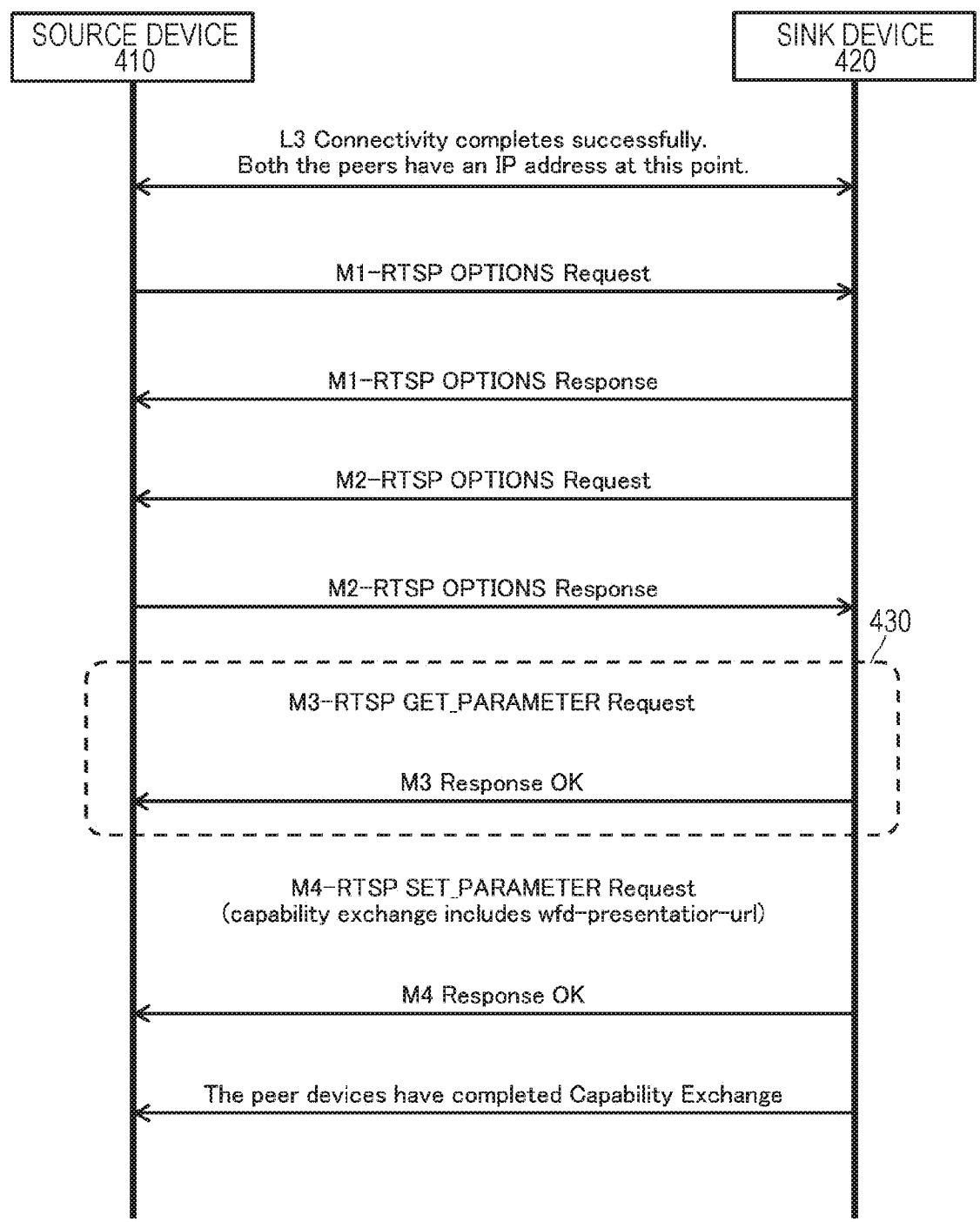
FIG. 7 is a diagram illustrating an exemplary connection sequence between a source device 410 and a sink device 420 according to the first embodiment (an example using a process of Miracast).

As illustrated in a dotted rectangle 430 in FIG. 7, the sink device 420 transmits an accessibility capability set on the sink device 420 side as a GET_PARAMETER Response in response to a RTSP GET_PARAMETER Request from the source device 410. FIG. 7 illustrates an example of response content of the GET_PARAMETER Response.

Further, in the message in which source device 410 exchanges the accessibility capability with the sink device 420, the following message is assumed to be used as an example of a message implemented on the Miracast standard.

device in the communication system 100 according to the first embodiment. FIGS. 10A, 10B, 11A and 11B illustrate a communication example for setting the accessibility mode metadata in the Capability Negotiation (an accessibility mode metadata setting example). The accessibility mode metadata setting method is an example when it adapts to the Wi-Fi CERTIFIED Miracast standard.

When the accessibility mode metadata is set, Wfd-accessibility-capability is exchanged between the source device 410 and the sink device 420 through an M3 message (RTSP GET_PARAMETER). It is the purpose of the exchanging for the source device 410 to check whether or not the sink device 420 has an accessibility mode metadata function therein.

When this purpose is achieved by the approach (3), the source device 200 determines a mode in which the bit assignment of the accessibility support request in FIG. 9 rises at the same time in the messages of the RTSP M3 of the Capability Negotiation in S601 and S602 in the communication sequence illustrated in FIG. 6 as a common accessibility mode which is settable by all the sink devices 300 and 400.

For example, on the premise that a bit 0 is "1" (accessibility mode On), when the Wfd-accessibility-capability Response information [14:5] indicated from one sink device 300 through a message of S601 is 0000000101, and the Wfd-accessibility-capability Response information [14:5] indicated by the sink device 400 through the message of S602 is 0000000100, if all operation contents are bit-ORed, a first bit (corresponding to "operable without sight" in the bit assignment illustrated in FIG. 9) and a third bit (corresponding to "operable in amblyopia and hearing loss" in the bit assignment illustrated in FIG. 9) are "1." For example, according to the support examples for the support requests of the type of the disability illustrated in FIG. 8, the source device 200 determines whether or not one of the following two pieces of information can be generated as the accessibility mode metadata.

A notification sound, data for the braille display, and an operation sound

A font size, a screen enlargement level, and information related to a contrast change Further, when the source device 200 determines that one of the two pieces of accessibility mode metadata can be generated, the source device 200 sets a corresponding accessibility mode as a Wfd-accessibility-setting.

In the Capability Negotiation communication method between the source device 410 and the sink device 420 illustrated in FIG. 10A, when capability information of the sink device 420 is received from the sink device 420, the source device 410 transmits an accessibility mode metadata line setting request to the sink device 420 through the M4

TABLE 1

| wfd-accessibility-capability | Accessibility capability supported. Select Accessibility to be used. | Optional in RTSP M3 request. Mandatory in RTSP M3 response if RTSP M3 request includes it. Optional in RTSP M4 request. Mandatory in RTSP M14 response if RTSP M14 is supported. |
|---|---|---|
| wfd-accessibility-setting | Enable or disable the Accessibility. | Optional in RTSP M4 request. Mandatory in RTSP M15 request if RSTP M15 is supported. |

[Accessibility Mode Setting Example]

FIGS. 10A, 10B, 11A and 11B illustrate an exemplary sequence of performing the Capability Negotiation communication process between the source device and the sink message. Further, instead of transmitting the accessibility mode metadata line setting request through the M4 message, a connection request may be transmitted through the M14 message after the image transmission is started. Further, when the M14 message is transmitted, in addition to the request from source device 410, the accessibility mode metadata line setting request from the sink device 420 to the source device 410 may be transmitted as illustrated in FIG. 11A.

Figure 10B:
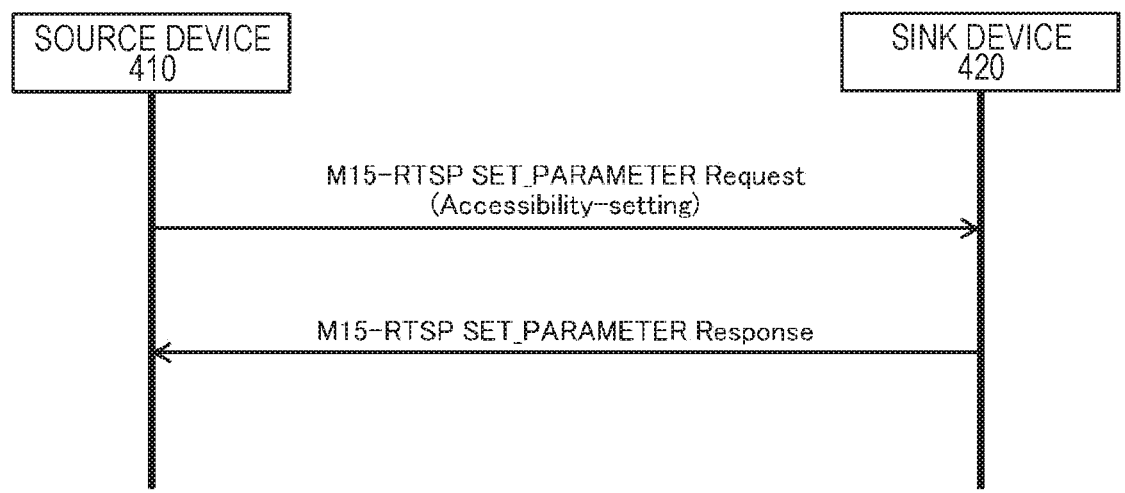
FIG. 10B is a diagram illustrating an exemplary sequence in which a Capability Negotiation communication process is performed between a source device and a sink device (a communication example of requesting connection enable from a source device).

Further, when the wfd-accessibility-setting and the exchange of the wfd-accessibility-setting are performed through the M4, the accessibility mode metadata is enabled, but when the exchange of the M14 message is performed, the accessibility mode metadata is not enabled until an M15 message is received. For this reason, as illustrated in FIGS. 10B and 11B, the source device 410 or the sink device 420 performs the exchange of the M15 message after receiving a response with respect to the accessibility mode metadata line setting request. Accordingly, the accessibility mode metadata line is enabled.

In the exemplary operation sequence illustrated in FIGS. 11A and 11B, after the video transmission between the source device 410 and the sink device 420 is started, the accessibility mode metadata line is requested from the sink device 420. Further, in FIG. 11A, it is also possible to perform a setting at the time of Capability Negotiation before the video transmission is started as described above with reference to FIG. 10A.

As described above, it is possible to check whether or not the source device and the sink device support the accessibility mode through the Capability Negotiation at the time of connection. Furthermore, in the present embodiment, the accessibility mode type is determined through the Capability Negotiation, but any other process may be used. For example, a Device Discovery or a Service Discovery may be used. As an example of the control method of the Device Discovery or the Service Discovery, a protocol conforming to a standard such as a P2P information element (IE), a WFD IE, an application service platform (ASP), or a universal plug and play (UPnP) may be used.

Furthermore, it is possible to newly establish a channel for transmitting the accessibility mode metadata (the data necessary for implementing the support operation examples in FIG. 8, for example, audios, videos, texts, or vibrations) from the source device to the sink device. Further, the sink device may determine information about whether UIBC transmitted from the sink device to the source device is reproduced even in a non-enabled connection setting by giving a meaning to the accessibility mode metadata or in accordance with the set mode and perform selection.

FIG. 12 illustrates the summary of the operation examples of the sink device in the respective accessibility mode types by enabling the accessibility mode metadata line.

In FIG. 12, a field of "accessibility" (sight support, hearing support, operation difficulty support, and cognition support) indicates a mode type set between the source device and the sink device, and a field of "media/data" indicates a media such as content or data and corresponds to data transmitted in accordance with the RTP in the Miracast standard.

"Accessibility/data" indicates a media (accessibility mode metadata) transmitted using the accessibility metadata line. For example, the transmission is performed using the RTSP or the TCP as the protocol of the accessibility metadata line.

Each field of "support at time of accessibility mode" or "support at time of normal mode" illustrates an example of a difference in a display form between when the accessibility mode is selected in the sink device and when the normal mode is selected in the sink device.

For example, when the accessibility mode type indicates "visual disability" and "operable without sight" (see FIG. 8), an operation based on a voice or a touch is possible, and thus in order to enable the voice operation in FIG. 12, sounds are transmitted as media/data, and operation sounds are transmitted from the source device to the sink device as the accessibility mode metadata.

The sink device that has received the media/data sounds and the operation sound serving as the accessibility mode metadata performs a process of muting the media sound or reducing the sound volume and reproducing the operation sound as a main sound as the support at the time of the accessibility mode (for example, when an accessibility operation button is turned on in a screen of the sink device illustrated in FIG. 17 (described later)). On the other hand, as the support at the time of the normal mode (for example, when a default operation button is turned on in the screen of the sink device illustrated in FIG. 17), a process of outputting the media sound preferentially and not reproducing the operation sound is performed.

Figure 13A:
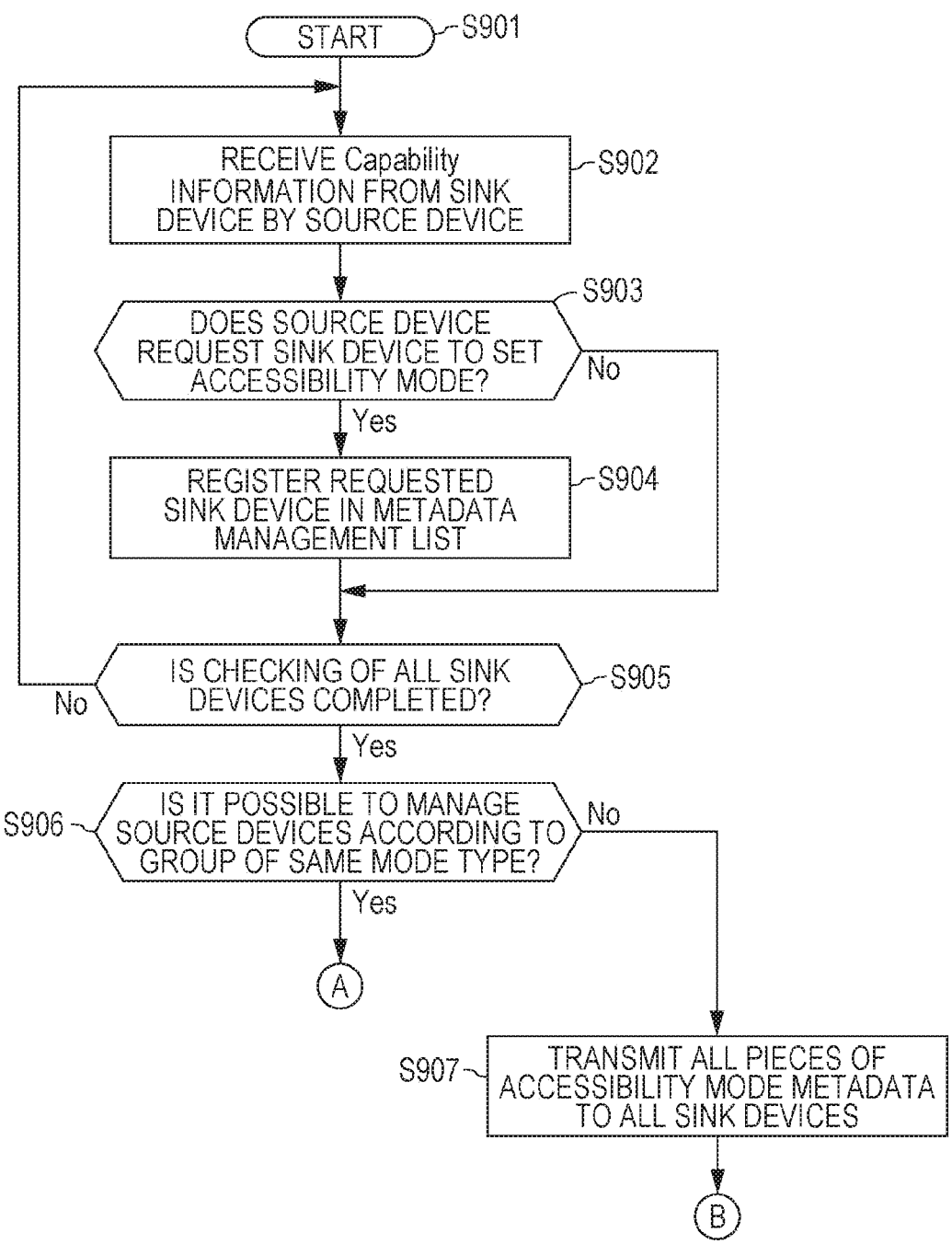
FIG. 13A is a flowchart illustrating a processing procedure in which a source device selects a common accessibility mode among a plurality of accessibility mode types for a sink device.
Figure 13B:
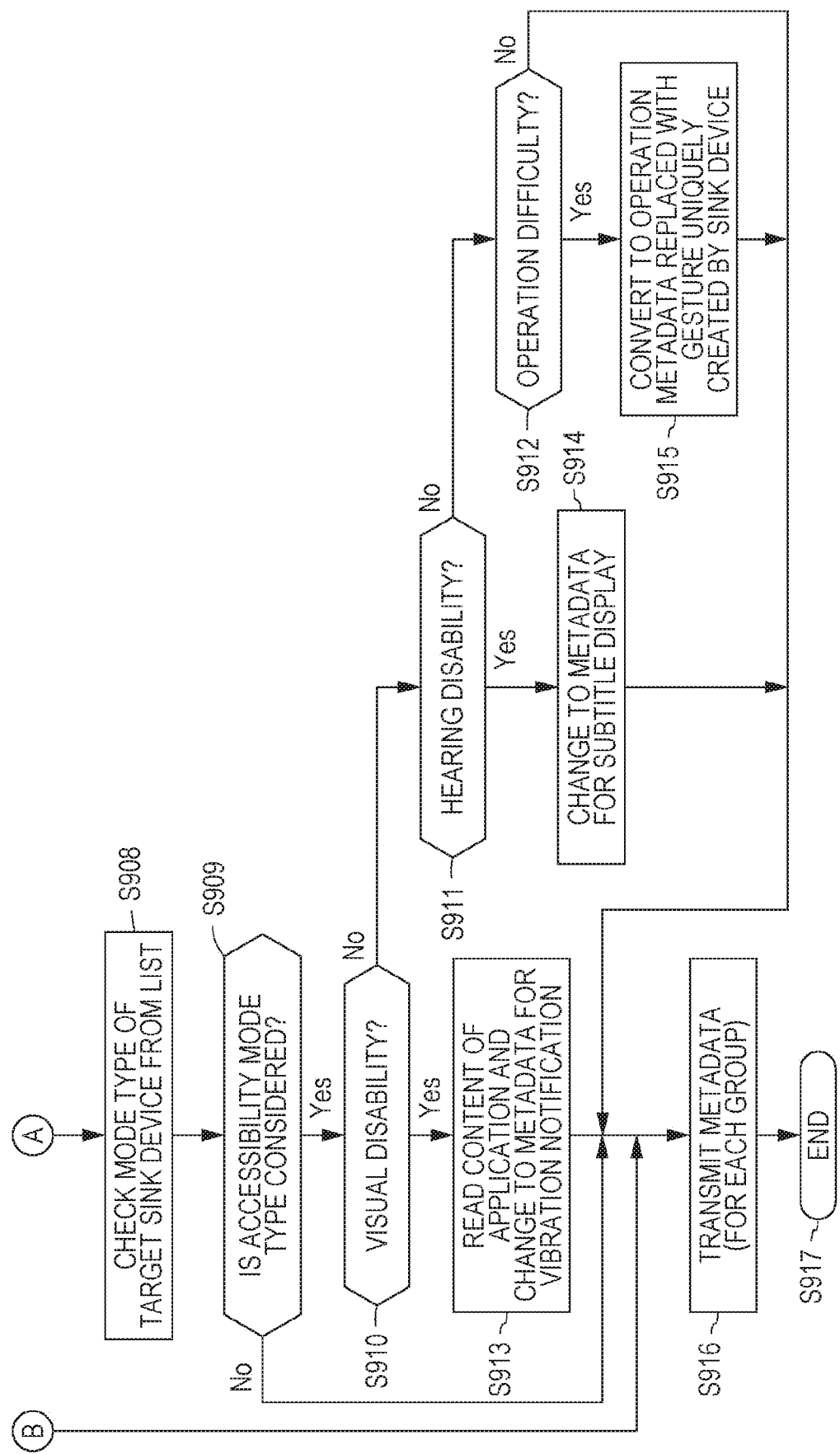
FIG. 13B is a flowchart illustrating a processing procedure in which a source device selects a common accessibility mode among a plurality of accessibility mode types for a sink device.

FIGS. 13A and 13B illustrate a processing procedure in which the source device selects a common accessibility mode among a plurality of accessibility mode types for the sink devices using a flowchart form.

First, the control unit 240 of the source device 200 starts the Capability Negotiation with each of the sink devices which are desired to be connected (located within the information transfer range 101) (step S902).

Then, the control unit 240 checks the accessibility mode connectable with each of the sink devices and then determines whether or not the operation in the accessibility mode is required (step S903). For the sink device that does not require the operation in the accessibility mode (No in step S903), source device 200 starts communication in the normal mode.

Further, when the sink device requires the operation in the accessibility mode (Yes in step S903), the control unit 240 of the source device 200 registers the sink device in a metadata management list and holds it (step S904).

If the checking for all the sink devices which are desired to be connected is not completed (No in step S905), the process returns to step S902 to repeat a similar process to described above. Further, when the checking for all the sink devices which are desired to be connected is completed (Yes in step S905), the control unit 240 causes the process to proceed to next step S906.

The source device 200 checks whether the sink devices having the same accessibility mode type can be grouped (step S906).

If the sink devices are not grouped according to each accessibility mode type (No in step S906), all pieces of accessibility mode metadata are transmitted to all the sink devices which are desired to be connected (step S907), and the present process ends.

On the other hand, when the sink devices are grouped according to each accessibility mode type and managed (Yes in step S906), the source device 200 checks the type of accessibility mode (step S908). When the type of accessibility mode need not be considered or when the type information is not included (No in step S909), a mode with the highest priority among the accessibility modes is selected. FIG. 13B illustrates an example in which the sight support, the hearing disability, and the operation difficulty are high in priority in the described order.

In steps S910, S911, and S912, the source device 200 determines whether the accessibility mode of the group is the sight support, the hearing support, or the body (operation difficulty) support on the basis of the capability information received from the sink device.

When the accessibility mode of the group is the sight support (Yes in step S910), the source device 200 performs provision of a sound synchronized with content/media transmission as the accessibility mode metadata (for example, a process of reading content of an application) or switching to a process of providing a name of an icon selected when the operator taps by voice (step S913), and performs transmission to each of the sink devices allocated to the corresponding group (step S916). Further, as a sound provision method, a method of providing the sound as a part of a sound of content/media for the accessibility mode or a method of inserting the sound as the accessibility mode metadata may be used, but the present invention is not limited thereto.

Further, when the accessibility mode of the group is the hearing support (Yes in step S911), the source device 200 performs provision of subtitles synchronized with content/media transmission as the accessibility mode metadata or conversion of a sound notification set by the operator into LED flash (step S914), and performs transmission to each of the sink devices allocated to the corresponding group (step S916). Further, as a method of providing subtitles or LED flash, a method of providing it as a part of content/media or a method of providing it as the accessibility mode metadata may be used, but the present invention is not limited thereto. Further, a packet type when the content/media or the accessibility mode metadata is wirelessly transmitted may be either a multicast packet or a unicast packet.

Further, when the accessibility mode of the group is the body (operation difficulty) support (Yes in step S912), the source device 200 converts data of a uniquely created gesture motion into a pointing that can be detected by the sink device (step S915), and then transmits it to each of the sink devices allocated to the group (step S916). Further, a packet type when the content/media or the accessibility mode metadata is wirelessly transmitted may be either a multicast packet or a unicast packet.

Step S917 is a process for ending the present operation flow.

Further, when the mode of the terminal or the accessibility type is different in the transmission or reception terminal, an operation means may be converted by transmission or reception, and mode matching may be performed.

As described above, the wireless communication unit 220 of the source device 200 performs real-time image transmission with the sink device in accordance with the Wi-Fi CERTIFIED Miracast specification. Further, the control unit 240 causes an image based on image information transmitted from the source device to be displayed on a display unit (not illustrated in FIG. 2), and performs control in a port used for a plurality of communication schemes (UIBC and WebSocket) for exchanging the accessibility mode metadata related to the image with the sink device. In this case, for example, when a port is set on a TCP session generated with the sink device, the control unit 240 transmits information designating a plurality of communication schemes using the port (for example, see FIGS. 15A, 15B and 15C (described later)) to the sink device.

The control unit 240 can set a plurality of ports for every two or more communication schemes as a port used for a plurality of communication schemes. In this case, the control unit 240 can set a plurality of ports in accordance with a request from the sink device.

Further, the control unit 240 can set one port for a plurality of communication schemes as a port used for a plurality of communication schemes.

Further, for example, the control unit 240 of the information processing device 200 transmits the image information for causing the display unit on the sink device side to display an image to the sink device. Further, the control unit 240 can perform control such that a port used for a plurality of communication schemes for exchanging control information related to the image with the sink device is set.

Example 2

Second Embodiment

[Configuration of Communication System]

Figure 16:
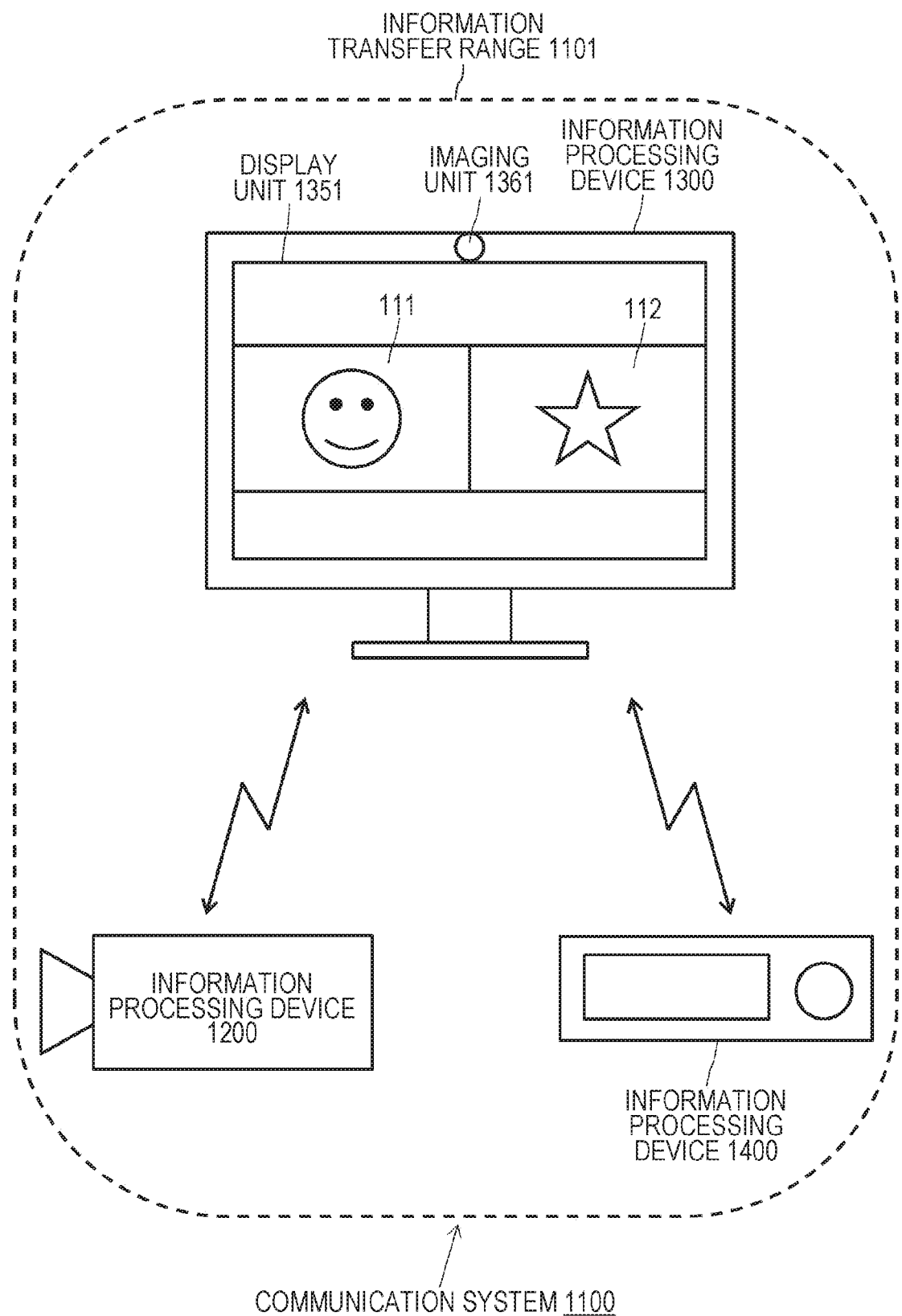
FIG. 16 is a diagram schematically illustrating an exemplary configuration of a communication system 1100 according to a second embodiment of the technology disclosed in this specification.

FIG. 16 schematically illustrates an exemplary configuration of a communication system 1100 according to a second embodiment of the technology disclosed in this specification. FIG. 16 illustrates an example of a communication system capable of performing wireless communication through P2P direct communication.

A communication system 1100 includes a plurality of information processing devices 1200, 1300 and 1400. Further, the communication system. 1100 is configured such that the information processing device 1300 receives data (for example, image data and audio data) transmitted from at least one of the information processing device 1200 and the information processing device 1400. Further, each of the information processing devices 1200, 1300, and 1400 is a transceiver having a wireless communication function.

An operation of the communication system 1100 will be described below using an example in which wireless communication using the wireless LAN is performed between the information processing device 1200 and the information processing device 1300 or between the information processing device 1400 and the information processing device 1300.

In the illustrated communication system 1100, a wireless connection in a multi-source topology environment using P2P direct communication is assumed to be established. For example, the information processing devices 1200 and 1400 operate as the source device, and the information processing device 1300 operates as the sink device. More specifically, image data generated by an imaging operation of the information processing device 1200 is transmitted to the information processing device 1300, and an image 111 based on the image data is displayed on a display unit 1351 of the information processing device 1300. Further, content stored in a storage unit (for example, a hard disk) of the information processing device 1400 is transmitted to the information processing device 1300, and an image 112 based on the content is displayed on the display unit 1351 of the information processing device 1300. The information processing device 1300 may include an imaging unit 1361 for imaging the operator or the like.

Further, in FIG. 16, a range in which the information processing device 1300 can directly perform communication through the P2P direct connection using wireless communication is indicated by an information transfer range 1101. This information transfer range 1101 is an information transfer range (service range) based on the information processing device 1300.

Figure 14A:
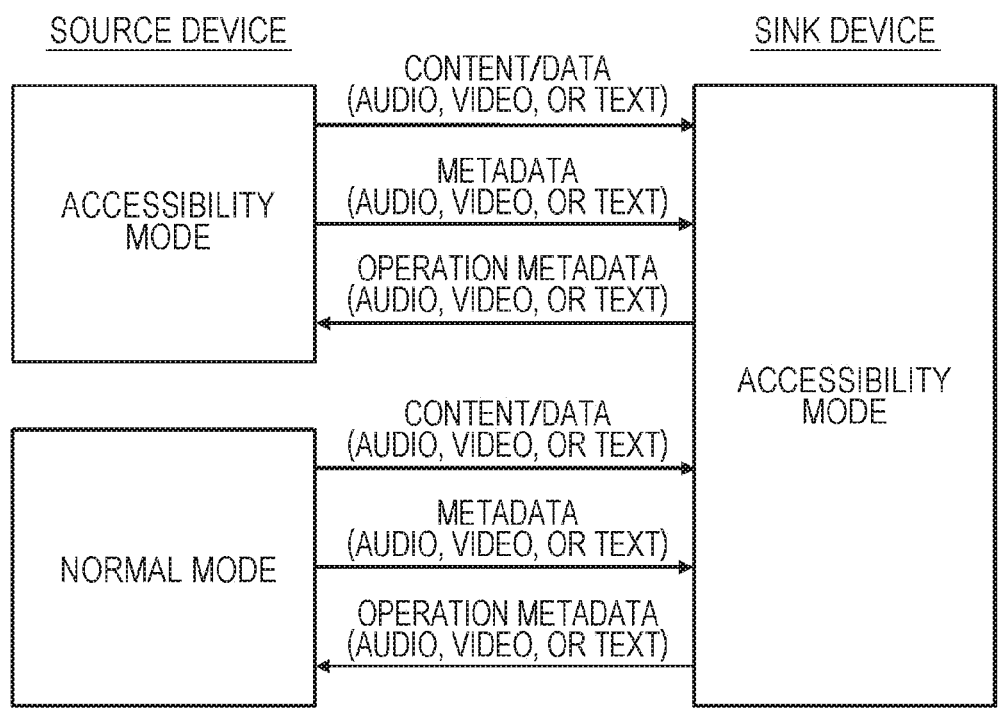
FIG. 14A is a diagram illustrating a connection form in which both a source device in an accessibility mode and a source device in a normal mode perform exchange with one sink device in an accessibility mode.
Figure 14B:
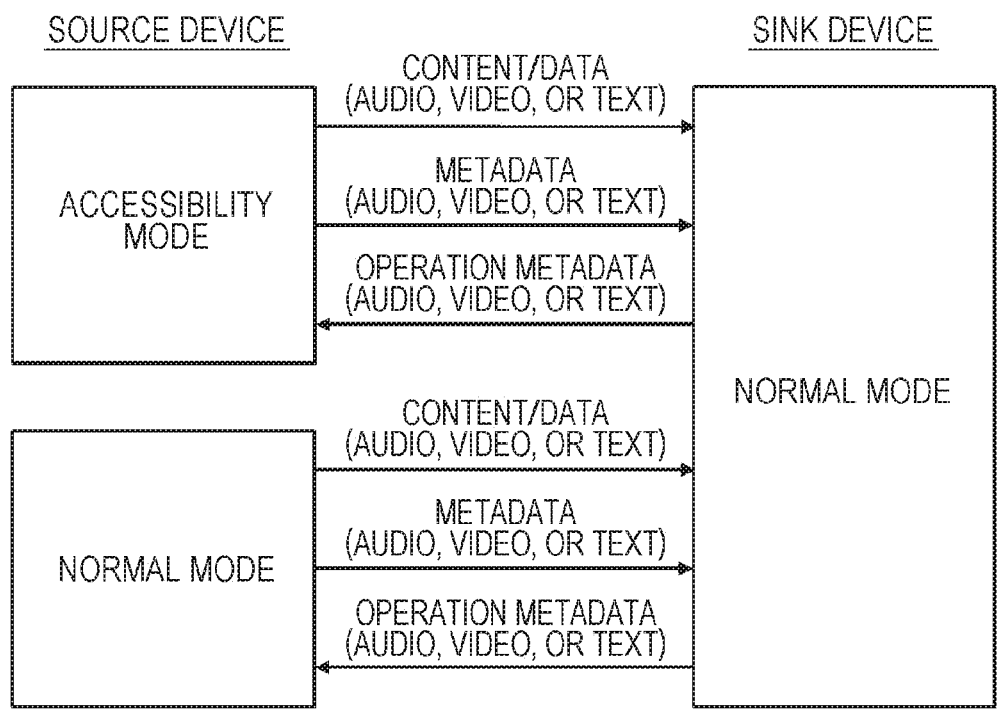
FIG. 14B is a diagram illustrating a connection form in which both a source device in a normal mode and a source device in an accessibility mode perform exchange with one sink device in a normal mode.

In the multi-source topology environment, it is assumed that the terminal in the normal mode and the terminal in the accessibility mode are mixed. FIG. 14A illustrates a connection form in which the source device in the accessibility mode and the source device in the normal mode perform exchange with one sink device in the accessibility mode. Further, FIG. 14B illustrates a connection form in which the source device in the normal mode and the source device in the accessibility mode perform exchange with one sink device in the normal mode.

The multi-source topology environment differs from the multi-sink topology environment described in the first embodiment. Even in the multi-source topology environment, the following approaches (11) and (12) can be applied, similarly to the first embodiment.

(11) In multi-source, the sink device transmits a response to each of the source devices so that modes of a plurality of sources coincide with one another, urges the source devices to cause the modes of the terminals to coincide with one another, and then starts the image transfer.

(12) The sink device does not perform an arbitration for unifying the mode with a plurality of source devices as in the approach (11), and converts it into data which can be handled by its own terminal on the basis of data received from the source device and reproduces it.

On the other hand, a difference with the first embodiment lies in that in the multi-source topology environment, UIBC data is transmitted from the sink device to a plurality of source devices. The following (21) to (23) can be applied as a packet format of UIBC exchanged between the source device and the sink device.

(21) A method in which UIBC data is converted to be suitable for the mode of each source device and then transmitted.

(22) A method in which the sink device transmits UIBC data regardless of the mode of the source device, and each source device converts it into data which can be detected by its own terminal and internally processes it.

(23) A method in which switching to a common mode to which after all devices including the source device and the sink device can be switched is performed, and then transmission and reception are performed.

Further, as a use case in the multi-source topology environment, a case in which a display of a large screen display is shared by the owners of the source devices is considered. In this use case, a case in which the large screen display is operated by a normal person and a case in which the large screen display is operated by a person with disability are likely to occur in a time-division manner or simultaneously. In this regard, when the source device in the accessibility mode is connected, it is assumed that a setting can be performed on the display screen of the sink device such that switching between an operation for the accessibility mode and a default operation of a display device is performed, or both operations are simultaneously performed. Further, before changing the type of accessibility mode, the sink device may cause the source device which is being operated to display a pop-up of causing the operator to check whether or not a change is not a problem.

Figure 17:
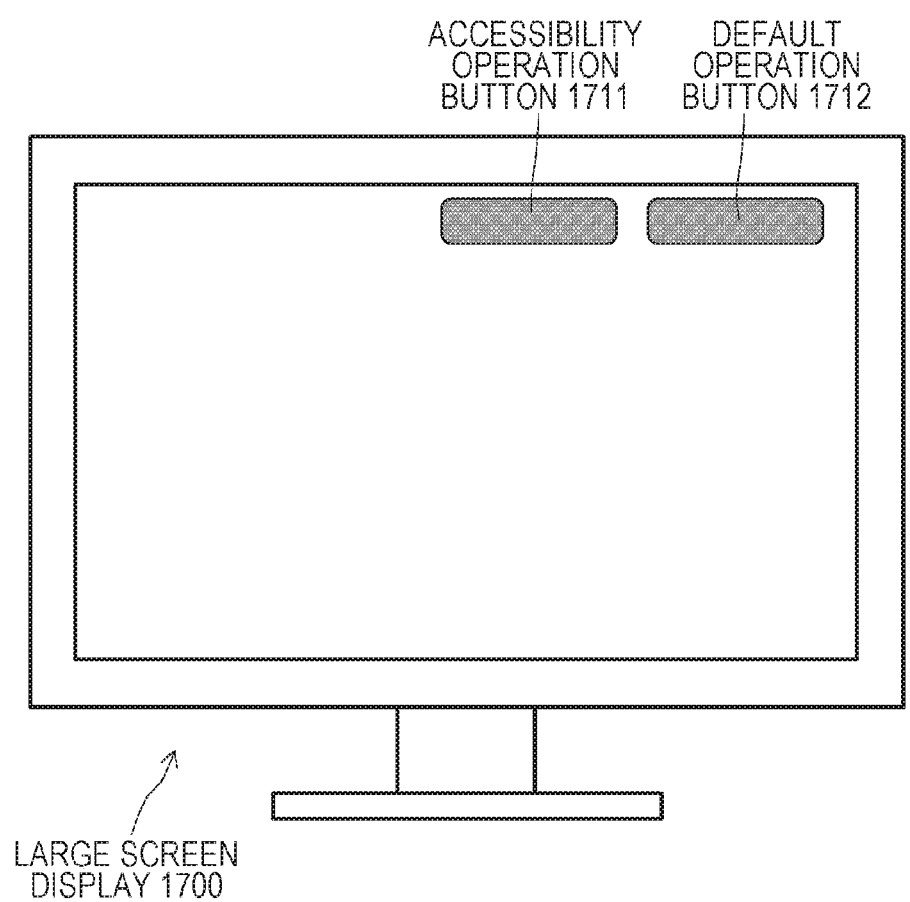
FIG. 17 is a diagram illustrating a large screen display including buttons for designating an accessibility operation and a default operation.

FIG. 17 illustrates a large screen display 1700 including buttons for designating an accessibility operation and a default operation. In the multi-source topology environment, the large screen display 1700 operates as the sink device and includes, for example, an accessibility operation button 1711 and a default operation button 1712 on a touch panel type screen. By selecting one of the accessibility operation button 1711 and the default operation button 1712, the operator can give an instruction about whether the operation for the accessibility mode or the default operation of the display device is performed.

Furthermore, when the operator changes the mode of the sink device during the connection through the switching between or the simultaneous use of the accessibility operation and the default operation, the mode exchange message signal (described above) for performing switching between the normal mode and the accessibility mode in midstream is transmitted or received during transmission, and thus an efficient operation can be performed without returning to an initial operation even in the environment in which the operator is changed.

Further, in order to transmit information related to a display position of the sink device on the basis of the request from the source device, the sink device can switch the control channel of UIBC to the source device that has transmitted the request during the connection. Further, in order to transmit the display position information of the source device in accordance with an operation from the sink device, the source device can switch the control channel of UIBC to the sink device that has transmitted the request during the connection.

[Transmission Example of Accessibility Mode Metadata Transmission Using WebSocket]

It is also possible to perform transmission and reception of image data, audio data, and text/data by using a control line of WebSocket as the accessibility mode metadata line. In this regard, an example of performing transmission and reception of image data or audio data using the control line of WebSocket will be described.

Figures 15A, 15B:
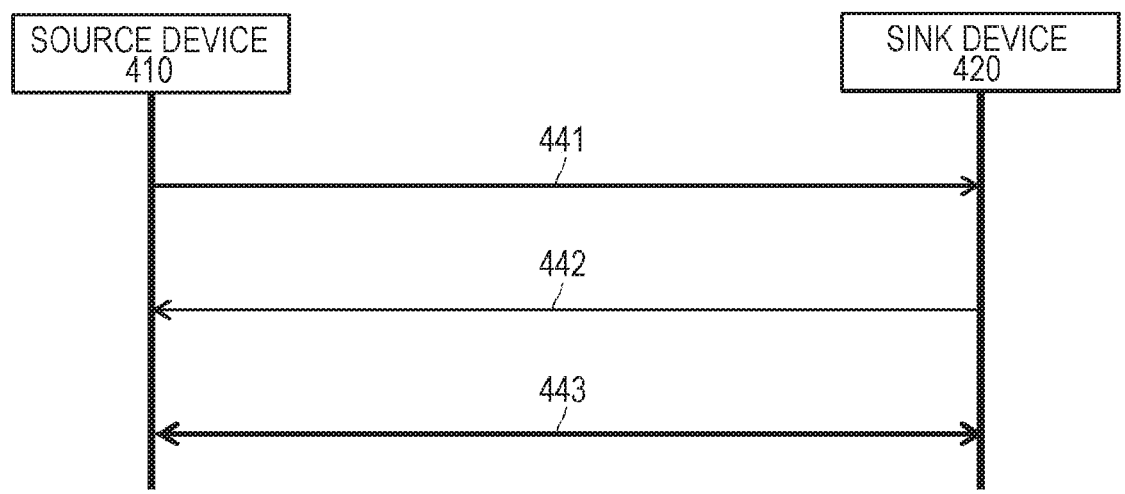
FIG. 15A is a diagram illustrating a communication process example of image data and audio data using WebSocket between a source device 410 and a sink device 420.
FIG. 15B is a diagram illustrating an example of a frame format of WebSocket exchanged between a source device 410 and a sink device 420.

FIGS. 15A, 15B and 15C illustrates an exemplary communication process of image data and audio data using WebSocket between the source device 410 and the sink device 420 according to the first embodiment. FIG. 15A illustrates an exemplary communication process between the source device 410 and the sink device 420. Further, FIGS. 15B and 15C illustrate an exemplary frame format of WebSocket exchanged between the source device 410 and the sink device 420.

Further, in the exemplary communication process illustrated in FIG. 15A, the source device 410 of Wi-Fi CERTIFIED Miracast functions as a client of WebSocket, and the sink device 420 functions as a server of WebSocket. Further, since P2P transmission in which one source device is connected with one sink device is assumed, any of the source device and the sink device can be a server or a client, but in the environment in which a plurality of devices are connected, it is desirable that a group owner (GO) connected with a plurality of terminals operate as a server function of WebSocket.

For example, the source device 410 transmits Host, Sec-WebSocket-Key, and Sec-WebSocket-Version to the sink device 420 as indicated by reference numeral 441. Further, Host designates a connection destination of WebSocket. Further, Sec-WebSocket-Key is used to obtain a handshake response. Further, Sec-WebSocket-Version is used to designate a version of WebSocket.

Further, the sink device 420 creates a value of Sec-WebSocket-Accept on the basis of a value of Sec-WebSocket-Key received from the source device 410. Further, the sink device 420 transmits the created Sec-WebSocket-Accept to the source device 410 as indicated by reference numeral 442. Here, Sec-WebSocket-Accept is used to maintain a connection with the client.

Further, the source device 410 transmits the frame format illustrated in FIG. 15B to the sink device. In this frame format, data to be transmitted can be designated by a WebSocket Type ID. FIG. 15C illustrates an example of the WebSocket Type ID.

Further, as indicated by reference numeral 443 in FIG. 15A, image data or audio data are exchanged between the source device 410 and the sink device 420 as binary data of WebSocket.

For example, when FIN is 0x0, since a payload is continued, the sink device 420 connects it with previous data. Further, when FIN is 0x1, since it is a flag indicating that the payload ends, the sink device 420 processes the payload.

Further, for example, RSV is an extension bit.

Further, for example, when opcode is 0x0, since the payload is continued, the sink device 420 connects it with immediately previous data. Further, when opcode is 0x1, it indicates that the payload is text, and when opcode is 0x2, it indicates that the payload is binary.

Further, for example, MASK is a bit indicating whether or not a message is encoded. Further, the message transmitted from the source device 410 to the sink device 420 is consistently encoded.

As described above, when binary of opcode is used, image data or audio data can be exchanged between source device 410 and sink device 420 as binary data of WebSocket. In other words, image data and audio data can be transmitted using a WebSocket standard format. Therefore, pre-authentication can be done through image data or audio data. Further, various other use cases can be supported.

Further, it is possible to exchange image data and audio data between the source device and the sink device using WebSocket while performing image transmission of the Wi-Fi CERTIFIEDMiracast standard. Further, WebSocket may be used to exchange the operation metadata.

As described above, the control unit 370 of the information processing device 300 serving as the sink device can acquire the image information and the audio information transmitted from the source device using WebSocket. Further, the control unit 370 can cause an image based on the image information to be displayed on the display unit 351 and cause a sound based on the audio information to be output from the audio output unit 352.

As described above, in the second embodiment, the operation for the accessibility mode of the source device can be received by the sink device. In other words, in an environment in which images, audios, texts, and operation auxiliary information from the source device are displayed on the display unit or output from the speaker on the sink device side, it is possible to stably perform an operation, and it is possible to perform a real-time connection control operation.

Further, when a notification of the display position of each image in the source device is given to the sink device in real time, it is possible to control the display position in accordance with the accessibility mode metadata from the source device. Further, it is possible to simultaneously exchange the information related to the display position of the accessibility mode metadata using UIBC and WebSocket.

Example 3

Third Embodiment

[Configuration of Communication System]

Figure 19:
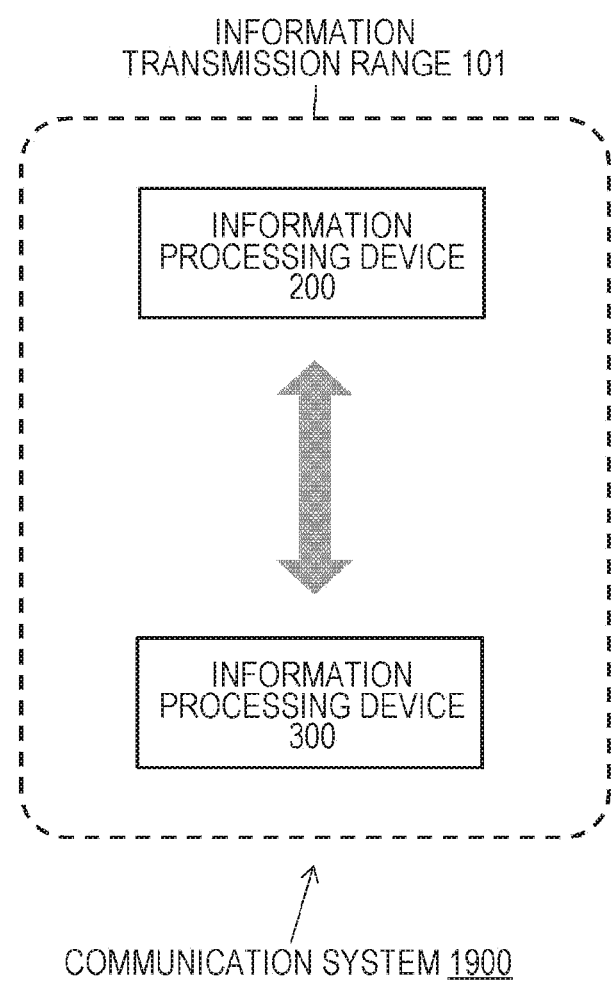
FIG. 19 is a diagram schematically illustrating an exemplary configuration of a communication system according to one embodiment of the technology disclosed in this specification.

FIG. 19 schematically illustrates an exemplary configuration of a communication system according to one embodiment of the technology disclosed in this specification. A communication system 1900 illustrated in FIG. 19 includes two information processing devices 200 and 300 each having a wireless communication function, and the devices are assumed to perform wireless connection through P2P direct communication. Specifically, the information processing device 300 receives data (for example, image data or audio data) transmitted from the information processing device 200.

Each of the information processing devices 200 and 300 constituting the communication system 1900 is, for example, a display device (for example, a personal computer) having a wireless communication function or a mobile information processing device (for example, a smartphone or a tablet terminal). Further, each of the information processing devices 200 and 300 is, for example, a wireless communication device conforming to IEEE 802.11, IEEE 802.15, IEEE 802.16, 3GPP specifications (for example, W-CDMA or GSM (registered trademark), WiMAX, WiMAX 2, LTE, or LTE-A. Further, each of the information processing devices 200 and 300 is able to exchange various kinds of information using the wireless communication function.

Wireless communication using the wireless LAN such as Wi-Fi Direct, TDLS, an ad hoc network, a mesh network, or the like can be performed between the information processing device 200 and the information processing device 300.

Further, for example, Wi-Fi CERTIFIEDMiracast (described above) can be used as the short-range wireless AV transmission communication used for the communication system 100. In Wi-Fi CERTIFIED Miracast, UIBC (described above) is implemented on TCP/IP. Further, other remote desktop software (for example, VNC) may be applied instead of Wi-Fi CERTIFIED Miracast.

In the communication system 100 according to the present embodiment, one information processing device 200 operates as the source device, and the other information processing device 300 operates as the sink device. For example, image data generated by an imaging operation of the information processing device 200 is transmitted to the information processing device 300, and an image based on the image data is displayed on the information processing device 300. An example in which the information processing device 200 sets image data and audio data generated by the imaging operation as a transmission target and an example in which the information processing device 200 sets content (for example, content configured with image data and audio data) stored in a storage device such as a hard disk as a transmission target will be described below.

Further, an electronic device including a camera (for example, a personal computer, a game machine, a smartphone, or a tablet terminal) may be used as the information processing device 200. Further, another electronic device including a display unit (for example, an imaging device, a game machine, a smartphone, or a tablet terminal) may be used as the information processing device 300. Further, when the information processing device 200 has a tethering function, content stored in an ISP may be set as a transmission target.

Further, in the communication system 1900 illustrated in FIG. 19, a range in which the information processing device 300 can perform direct communication through P2P direct connection using wireless communication is indicated by an information transfer range 101. The information transfer range 101 is an information transfer range (service range) based on the information processing device 300.

In the communication system 1900 according to the present embodiment, an exemplary functional configuration of the information processing device 200 operating as the source device is similar to that illustrated in FIG. 2, and a functional configuration of the information processing device 300 operating as the sink device is similar to that illustrated in FIG. 3. Here, detailed description of the functional configuration of each of the information processing devices 200 and 300 is omitted. Further, a connection sequence using the Wi-Fi CERTIFIED Miracast specification command between the source device 410 and the sink device 420 in this embodiment is also similar to that illustrated in FIG. 4, and thus detailed description thereof will be omitted.

[Assumed Connection Form]

Figure 20:
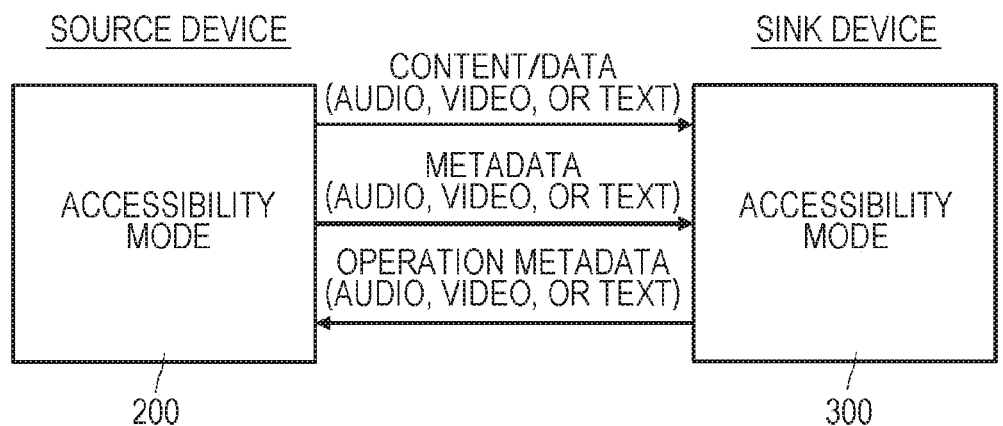
FIG. 20 is a diagram illustrating a connection form in which exchange is performed between a source device in an accessibility mode and a sink device in an accessibility mode.
Figure 21:
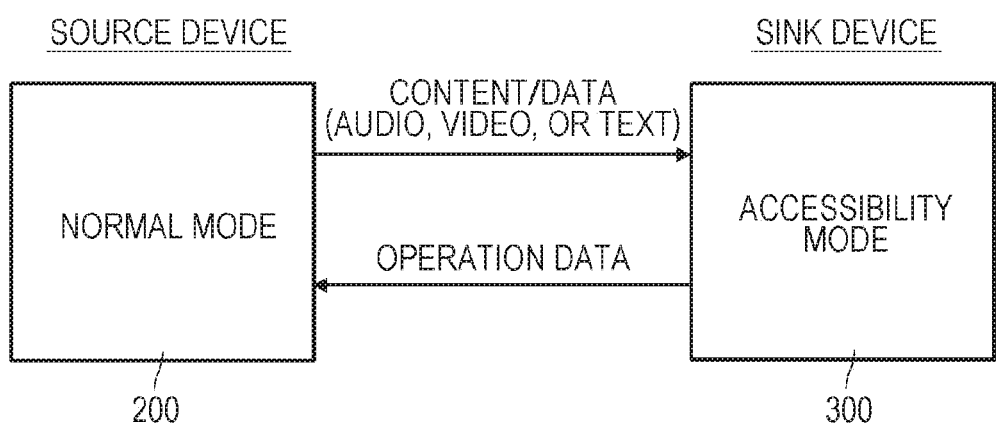
FIG. 21 is a diagram illustrating a connection form in which exchange is performed between a source device in a normal mode and a sink device in an accessibility mode.
Figure 22:
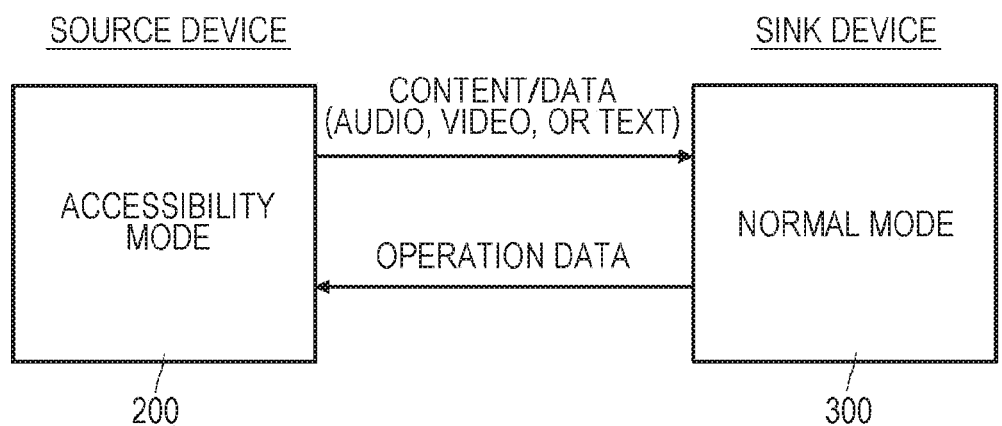
FIG. 22 is a diagram illustrating a connection form in which exchange is performed between a source device in an accessibility mode and a sink device in a normal mode.

FIG. 20 to FIG. 22 illustrate a connection form assumed in the communication system 100 in which the information processing device 200 serving as the source device and the information processing device 300 serving as the sink device perform the wireless connection through the P2P direct communication.

FIG. 20 illustrates a connection form in which exchange is performed between the source device in the accessibility mode and the sink device in the accessibility mode. Further, FIG. 21 illustrates a connection form in which exchange is performed between the source device in the normal mode and the sink device in the accessibility mode. Further, FIG. 22 illustrates the connection form in which exchange is performed between the source device in the accessibility mode and the sink device in the normal mode.

A communication process between the source device and the sink device on the premise that the type of accessibility mode of the source device coincides with the type of accessibility mode of the sink device in the connection form illustrated in FIG. 20 will be described.

When the source device operates a video or an audio to be transmitted from the source device to the sink device, in addition to transmission of normal content or data, information which is currently set from the sight support, the hearing support, or the body function (operation difficulty) is separately transmitted as the accessibility mode metadata.

On the other hand, at the same time as when the content or data is received from the source device, the sink device receives the accessibility mode metadata and appropriately performs an optimal display in accordance with the control inside the sink device.

On the other hand, when the sink device operates a video or an audio to be transmitted from the source device, the sink device transmits the operation information corresponding to the browsing guarantee to the source device without change. A function is equivalent to that of UIBC of the related art, but the audio, the video, or the text information (the operation metadata) is assumed to be included in the data type of UIBC in view of the browsing guarantee.

On the other hand, separately from transmission of the content or data and the accessibility mode metadata to the sink device, the source device receives the operation information of the sink device from the sink device as the accessibility mode operation information of the sink device, and performs an operation indicated by the received operation information.

Further, when the operator is changed during the connection, the mode exchange message signal for performing switching between the normal mode and the accessibility mode in midstream may be included. For example, when a mode exchange message is exchanged between the source device and the sink device, it is possible to perform switching between the normal mode and the accessibility mode or change the type of accessibility mode without interrupting the wireless video transmission which is currently being transmitted or received.

Then, a communication process between the source device and the sink device on the premise that the mode does not coincide between the source device and the sink device as illustrated in FIG. 21 or 22 will be described.

In the connection form illustrated in FIG. 21, when the source device operates a video or an audio to be transmitted from the source device to the sink device, the source device performs conversion into content/media which can be operated by the sink device on the basis of the video, audio, and the text created by the operation and then performs transmission. For example, in the case of the accessibility mode of the hearing support, for movies or video viewing content, the source device transmits text as subtitle data and adjusts a sound volume or performs a process of transmitting control data to the sink device so that an incoming signal can be indicated by LED flash even at the sink device side.

On the other hand, the sink device receives the content or data for the accessibility mode from the source device and appropriately performs the optimal display.

Meanwhile, when the sink device operates a video or an audio to be transmitted from the source device, the sink device transmits the operation information corresponding to the browsing guarantee to the source device without change. A function is equivalent to that of the conventional UIBC, but the audio, the video, or the text information (the operation metadata) is assumed to be included in the data type of UIBC in view of the browsing guarantee.

On the other hand, separately from transmission of the content or data to the sink device, when the operation of the sink device is received from the sink device as the accessibility mode operation information of the sink device, the source device performs a process of converting the received operation information as operation data for the normal mode.

Further, the communication operation that can be performed in the communication system 100 according to the present embodiment is not limited to the above example. For example, in the above description, transmission and reception of data suitable for the accessibility mode are performed on the source device side, but the present invention is not limited thereto, and, for example, conversion to the normal mode may be performed on the sink device side. Particularly, since the operation data differs in tap handling, a tap conversion operation is necessary in transmission in which the mode of the source device is different from the mode of the sink device. Particularly, in the body function (operation difficulty) support, when the operator of the sink device registers his/her own user operation, since it is unable to be interpreted by the source device, it is desirable to perform switching to a tap or a gesture operation so that it can be detected by the sink device even in the normal mode and then perform transmission.

FIG. 22 illustrates the connection form in which exchange is performed between the source device in the accessibility mode and the sink device in the normal mode, but a conversion processing is necessary, similarly to the connection form illustrated in FIG. 21.

In the connection form illustrated in FIG. 22, when the source device operates a video or an audio to be transmitted from the source device to the sink device, the source device performs transmission of normal content or data. On the other hand, when content or data is received from the source device, the sink device appropriately performs an optimal display.

Meanwhile, when the sink device operates a video or an audio to be transmitted from the source device, the sink device transmits the operation information to the source device without change. On the other hand, separately to transmission of the content or data and the accessibility mode metadata to the sink device, the source device converts the operation information of the sink device from the sink device into the operation corresponding to the browsing guarantee, and performs an operation in accordance with the converted operation information.

Alternatively, when the sink device operates a video or an audio to be transmitted from the source device, the sink device converts the operation information into the operation information corresponding to the browsing guarantee, and then transmits the converted operation information to the source device. The operation information corresponding to the browsing guarantee has a function equivalent to that of UIBC of the related art, but the data type of UIBC is assumed to include the audio, the video, or the text information (the operation metadata) in view of the browsing guarantee. On the other hand, separately transmission of the content or data and the accessibility mode metadata to the sink device, the source device receives the operation information of the sink device from the sink device as the accessibility mode operation information of the sink device, and performs an operation indicated by the received operation information.

In the connection form illustrated in FIG. 21 or 22, when the sink device serving as the communication partner is in the accessibility mode, the source device may give a notification indicating that it is necessary to generate the accessibility mode metadata to the operator of the source device through a pop-up display or the like. Further, the media type of the accessibility mode metadata to be transmitted to the sink device may be displayed through the pop-up display or the like so that the operator confirms whether or not conversion of metadata is performed.

Further, when the source device serving as the communication partner is in the accessibility mode, the sink device may give a notification indicating that it is necessary to reproduce the accessibility mode metadata to the operator of the sink device through the pop-up display or the like.

Further, as illustrated in FIGS. 21 and 22, when only one of the source device and the sink device is in the accessibility mode, a medium reproducing function corresponding to the media type of the accessibility mode metadata transmitted from the source device side may be turned off. In this case, the sink device may display the media type of the accessibility mode metadata transmitted from the source device so that the operator confirms whether or not media reproduction is turned on.

In the connection form illustrated in FIGS. 20 to 22, the source device 410 performs exchange for checking whether or not the sink device 420 supports the accessibility mode. Specifically, a method of checking whether the sink device 420 supports the accessibility mode using the process of Miracast will be described with reference to FIG. 7 (described above). Through this method, it is possible to check whether or not the source device 410 can determine the accessibility mode to be selected among the hearing, the sight, and the body function (operation difficulty).

As illustrated in a dotted rectangle 430 in FIG. 7, the sink device 420 transmits an accessibility capability set on the sink device 420 side as a GET_PARAMETER Response in response to a RTSP GET_PARAMETER Request from the source device 410. FIG. 9 illustrates an example of response content of the GET_PARAMETER Response.

The source device 410 selects metadata to be transmitted from the source device 410 to the sink device 420 on the basis of the received accessibility capability (Capability information) and transmits it.

In the message used for the source device 410 to exchanges the accessibility capability with the sink device 420, the message shown in Table 1 is assumed to be used as an example of a message implemented on the Miracast standard.

Further, in the connection form illustrated in FIGS. 20 to 22, when the mode or the type of accessibility mode differs between the source device and the sink device, the type of accessibility mode is converted so that the operation method can be detected between the devices. When the mode or the type of accessibility mode is different between the source device and the sink device, either the source device or the sink device converts the type of accessibility mode so that the operation method is detected between the devices, and the modes coincide.

When the accessibility mode metadata is set, Wfd-accessibility-capability is exchanged between the source device 410 and the sink device 420 through the M3 message (RTSP GET_PARAMETER). It is the purpose of the exchanging for the source device 410 to check whether or not the sink device 420 has the accessibility mode metadata function therein.

The source device 410 determines the mode in which the bit assignment of the accessibility support request of FIG. 9 rises at the same time in each message of the RTSPM3 of the Capability Negotiation in the communication sequence illustrated in FIG. 7 as the accessibility mode which is settable by the sink device 420. Specifically, a bit 0 indicates whether or not the sink device 420 is a device supporting the accessibility mode. A bit [14:1] indicates that each bit is valid when a bit 0 is "1" (accessibility mode on), and a bit [4:1] indicates the type of accessibility mode. Through the present bit region, when an operation that is not included in the support method of a bit [14:5] is necessary, it can be deal with by generation of all pieces of assumed operation data by indicating a type, but all determination may be performed through the bit [14:5], and the bit [4:1] may be omitted.

For example, on the premise that a bit 0 is "1" (accessibility mode on), when Wfd-accessibility-capability Response information [14:5] indicated from the sink device 420 through the message of S601 is 0000000101, a first bit (corresponds to "operable without sight" in the bit assignment illustrated in FIG. 9) and a third bit (corresponding to "operable in amblyopia and hearing loss" in the bit assignment illustrated in FIG. 9) are "1." The support operation examples illustrated in FIG. 8 is illustrated as the accessibility mode metadata. The source device 410 determines, for example, whether or not the following information can be generated as the accessibility mode metadata.

A notification sound, data for the braille display, and an operation sound

A font size, a screen enlargement level, and information related to a contrast change Further, when the source device 410 determines that one of the two pieces of accessibility mode metadata can be generated, the source device 410 sets a corresponding accessibility mode as a Wfd-accessibility-setting.

In the communication system 1900 according to the present embodiment, it is possible to check whether or not the accessibility mode is supported between the source device 410 and the sink device 420 through the Capability Negotiation at the time of connection in accordance with the communication example sequence illustrated in FIGS. 10A, 10B, 11A and 11B (described above) and perform the communication process for setting the accessibility mode. Further, an operation example of the sink device in each accessibility mode type when the accessibility mode metadata line is enabled is similar to that described above with reference to FIG. 12.

Figure 23:
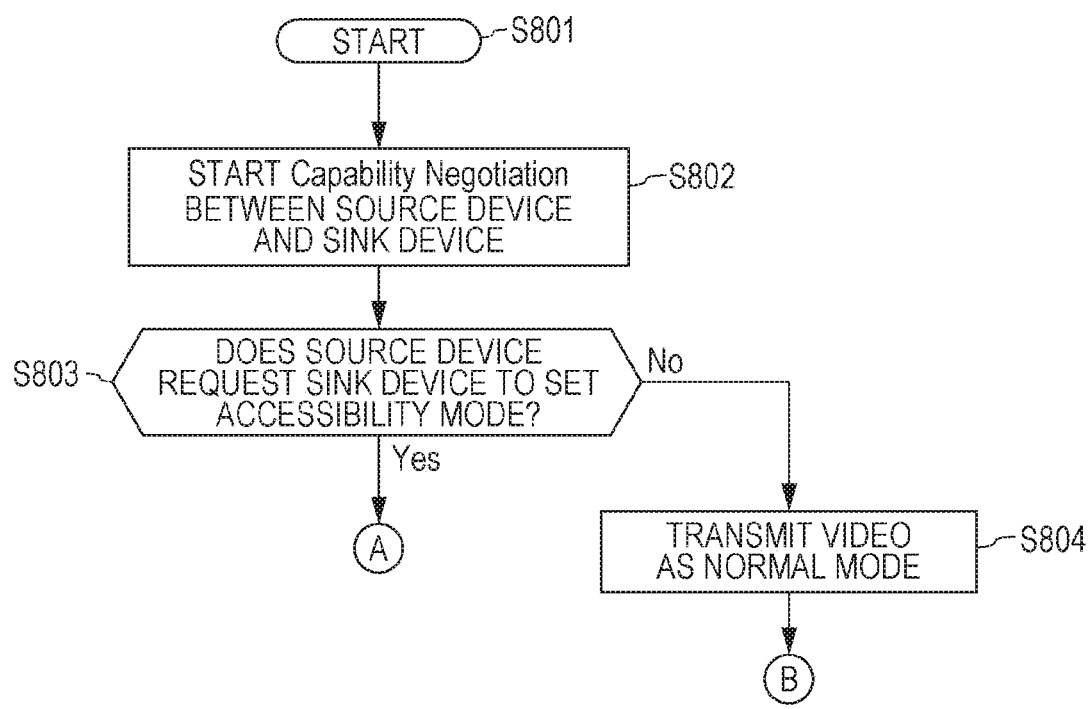
FIG. 23 is a flowchart illustrating an operation procedure until a source device starts video transmission with a sink device after a source device starts a Capability Negotiation of an accessibility mode metadata line.
Figure 24:
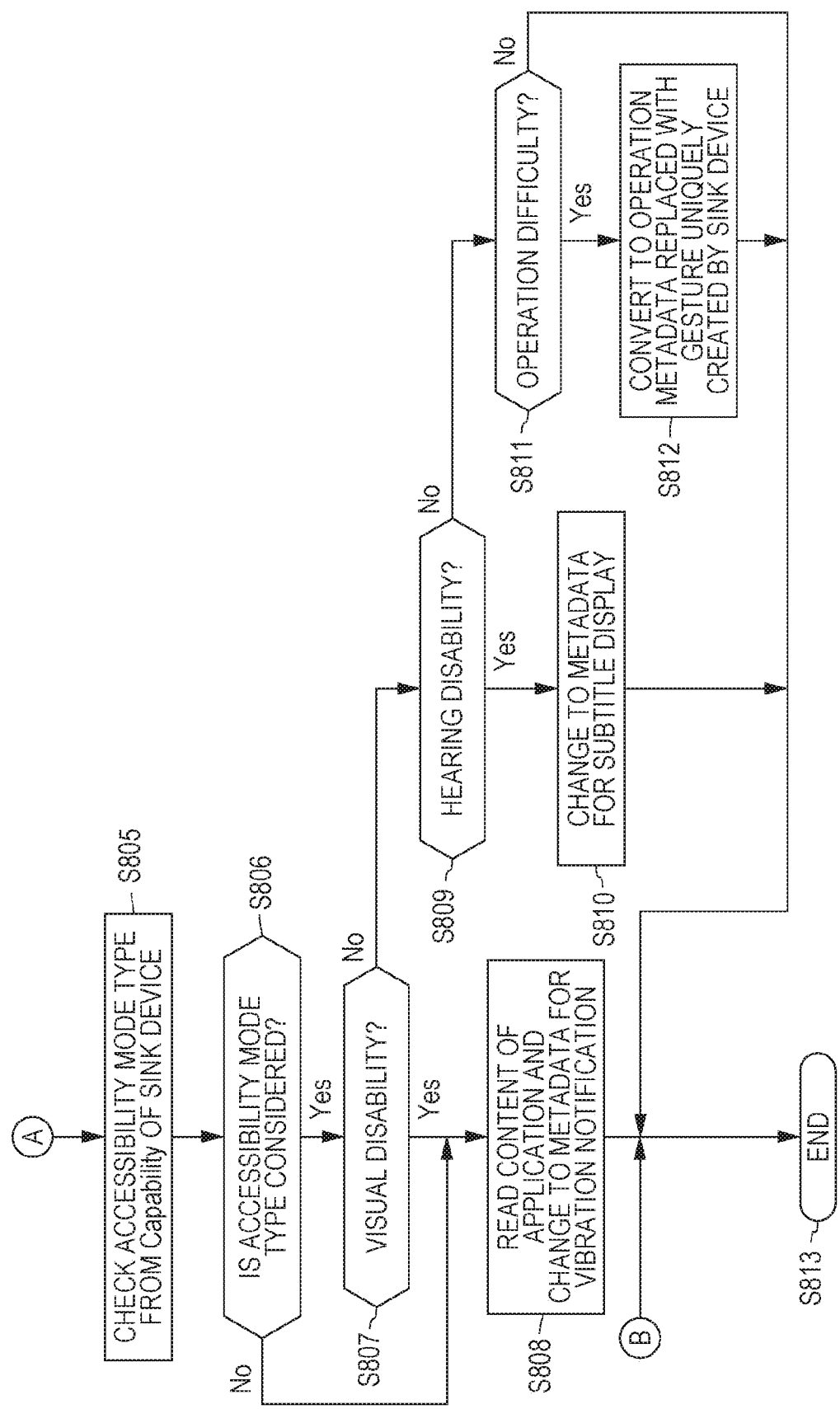
FIG. 24 is a flowchart illustrating an operation procedure until a source device starts video transmission with a sink device after a source device starts a Capability Negotiation of an accessibility mode metadata line.

FIGS. 23 and 24 illustrates an operation procedure until the source device 200 starts the video transmission with the sink device 300 after the source device starts the Capability Negotiation of the accessibility mode metadata line using a flowchart form.

First, the control unit 240 of the source device 200 starts the Capability Negotiation with the sink device 300 (step S802).

Then, after the accessibility mode connectable to the sink device 300 is checked, the control unit 240 determines whether or not the sink device 300 is requested to operate in the accessibility mode (step S803). When the sink device 300 is not requested to operate in the accessibility mode (No in step S803), the source device 200 starts communication with the sink device 300 in the normal mode (step S804).

On the other hand, when the sink device 300 is requested to operate in the accessibility mode (Yes in step S803), the source device 200 further checks the type of accessibility mode that can be handled by the sink device 300 (step S805). When it is not necessary to check the type of accessibility mode or when the type information is not included (No in step S806), the mode with the highest priority among the accessibility modes is selected. FIG. 24 illustrates an example in which the sight support, the hearing disability, and the operation difficulty are high in priority in the described order, and the mode of the sight support is selected.

Further, when the type of accessibility mode is confirmed using the default accessibility mode (Yes in step S806), the source device 200 checks whether the mode has the highest priority among the accessibility modes. When the mode does not have the highest priority, it is further checked whether it is any other mode. FIG. 24 illustrates an example in which the sight support, the hearing disability, and the operation difficulty are high in priority in the described order. The source device 200 determines whether the accessibility mode is the sight support, the hearing support, or the body (operation difficulty) support sequentially on the basis of the capability information received from the sink device 300 (steps S807, S809, and S811).

When the accessibility mode is the sight support (Yes in step S807), the source device 200 performs provision of a sound synchronized with the content/media transmission as the accessibility mode metadata (for example, the process of reading content of an application) or the process of performing providing a name of an icon selected when the operator taps by voice, and performs transmission to the sink device (step S808). Further, as a sound provision method, a method of providing the sound as a part of a sound of content/media for the accessibility mode or a method of inserting the sound as the accessibility mode metadata may be used.

Further, when the accessibility mode is the hearing support (Yes in step S809), the source device 200 performs provision of subtitles synchronized with content/media transmission as the accessibility mode metadata or conversion of a sound notification set by the operator into LED flash, and performs transmission to the sink device (step S810). When movies, videos and podcasts are viewed, switching to the subtitle display is performed. Further, as a method of providing subtitles and LED flash, a method of providing it as part of metadata of content/media for the accessibility mode or a method of providing it as the accessibility mode metadata may be used.

Further, when the accessibility mode is the body (operation difficulty) support (Yes in step S811), the source device 200 converts data of a uniquely created gesture motion into a pointing that can be detected by the sink device 300, and then transmits it to the sink device 300 (step S812).

Step S813 is a step at which the present operation flow ends. Further, in the flowcharts illustrated in FIGS. 23 and 24, the conversion into the accessibility mode metadata for the visual disability, the hearing disability, and the body (operation difficulty) is performed, but the present invention is not limited thereto. For example, the support operations illustrated in FIG. 8 may be changed as the accessibility mode metadata.

Further, when the mode of the terminal or the type of accessibility mode differs between the source device 200 and the sink device 300, the source device 200 or the sink device 300 may convert the type of accessibility mode so that the modes coincide.

In steps S808, S810, S812, and the like, when the sink device 300 serving as the communication partner is in the accessibility mode, the source device 200 may give a notification indicating that it is necessary to generate the accessibility mode metadata to the operator of the source device 200 through the pop-up display or the like. Further, the media type of the accessibility mode metadata to be transmitted to the sink device may be displayed through the pop-up display or the like so that the operator confirms whether or not conversion of metadata is performed.

Further, when the source device 200 serving as the communication partner is in the accessibility mode, the sink device 300 may give a notification indicating that it is necessary to reproduce the accessibility mode metadata to the operator of the sink device 300 through the pop-up display or the like.

Further, when only one of the source device 200 and the sink device 300 is in the accessibility mode, the medium reproducing function corresponding to the media type of the accessibility mode metadata transmitted from the source device 200 side may be turned off. In this case, the sink device 300 may display the media type of the accessibility mode metadata transmitted from the source device 200 so that the operator confirms whether or not media reproduction is turned on.

As described above, the wireless communication unit 220 of the information processing device (source device) 200 performs the real-time image transmission with the sink device 300 in accordance with the Wi-Fi CERTIFIED Miracast specification. Further, the control unit 240 causes an image based on image information transmitted from the source device 200 to be displayed on a display unit (not illustrated in FIG. 2), and performs control in a port used for a plurality of communication schemes (UIBC and WebSocket) for exchanging the accessibility mode metadata related to the image with the sink device 300. In this case, for example, when a port is set on a TCP session generated with the sink device 300, the control unit 240 transmits information designating a plurality of communication schemes using the port (for example, each piece of information described in FIGS. 15A, 15B and 15C (described later)) to the sink device.

Further, the control unit 240 can set a plurality of ports for every two or more communication schemes as a port used for a plurality of communication schemes. In this case, the control unit 240 can set a plurality of ports in accordance with a request from the source device.

Further, the control unit 240 can set one port for a plurality of communication schemes as a port used for a plurality of communication schemes.

Further, for example, the control unit 240 of the information processing device 200 transmits the image information for causing the display unit on the sink device 300 side to display an image to the sink device 300. Further, the control unit 240 can perform control such that a port used for a plurality of communication schemes for exchanging control information related to the image with the sink device 300 is set.

Further, in order to transmit information related to a display position of the sink device 300 on the basis of the request from the source device 200, the sink device 300 can switch the control channel of UIBC to the source device 200 that has transmitted the request during the connection. Further, in order to transmit the display position information of the source device 200 in accordance with an operation from the sink device 300, the source device 200 can switch the control channel of UIBC to the sink device 300 that has transmitted the request during the connection.

Further, in the communication system 1900 according to this embodiment, it is also possible to perform transmission and reception image data, audio data, text/data using the control line of WebSocket as the accessibility mode metadata line. For example, it is possible to perform the communication process of image data and audio data between the source device 410 and the sink device 420 using WebSocket in accordance with the communication sequence (described above) illustrated in FIG. 15A. In this communication sequence, exchange is performed between the source device 410 and the sink device 420 using the frame format of WebSocket (described above) illustrated in FIGS. 15B and 15C.

When binary of opcode is used, image data or audio data can be exchanged between source device 410 and sink device 420 as binary data of WebSocket. In other words, image data and audio data can be transmitted using a WebSocket standard format. Therefore, pre-authentication can be done through image data or audio data. Further, various other use cases can be supported (same as above).

Further, it is possible to exchange image data and audio data between the source device and the sink device using WebSocket while performing image transmission of the Wi-Fi CERTIFIEDMiracast standard. Further, WebSocket may be used to exchange the operation metadata.

As described above, the control unit 370 of the information processing device 300 serving as the sink device can acquire the image information and the audio information transmitted from the source device using WebSocket. Further, the control unit 370 can cause an image based on the image information to be displayed on the display unit 351 and cause a sound based on the audio information to be output from the audio output unit 352.

As described above, in the present embodiment, the operation for the accessibility mode of the source device can be received by the sink device. In other words, in an environment in which images, audios, texts, and operation auxiliary information from the source device are displayed on the display unit or output from the speaker on the sink device side, it is possible to stably perform an operation, and it is possible to perform a real-time connection control operation.

Further, when a notification of the display position of each image in the source device is given to the sink device in real time, it is possible to control the display position in accordance with the accessibility mode metadata from the source device. Further, it is possible to simultaneously exchange the information related to the display position of the accessibility mode metadata using UIBC and WebSocket.

In the above description, the accessibility mode type is determined between the source device and the sink device through the Capability Negotiation, but any other method may be used. For example, a Device Discovery or a Service Discovery may be used. As the control method of the Device Discovery or the Service Discovery, one or more of the following (C1) to (C4) is exchanged:

(C1) the P2P IE;
(C2) the WFD IE;
(C3) the ASP; and
(C4) the protocol of the UPnP standard.

Figure 25:
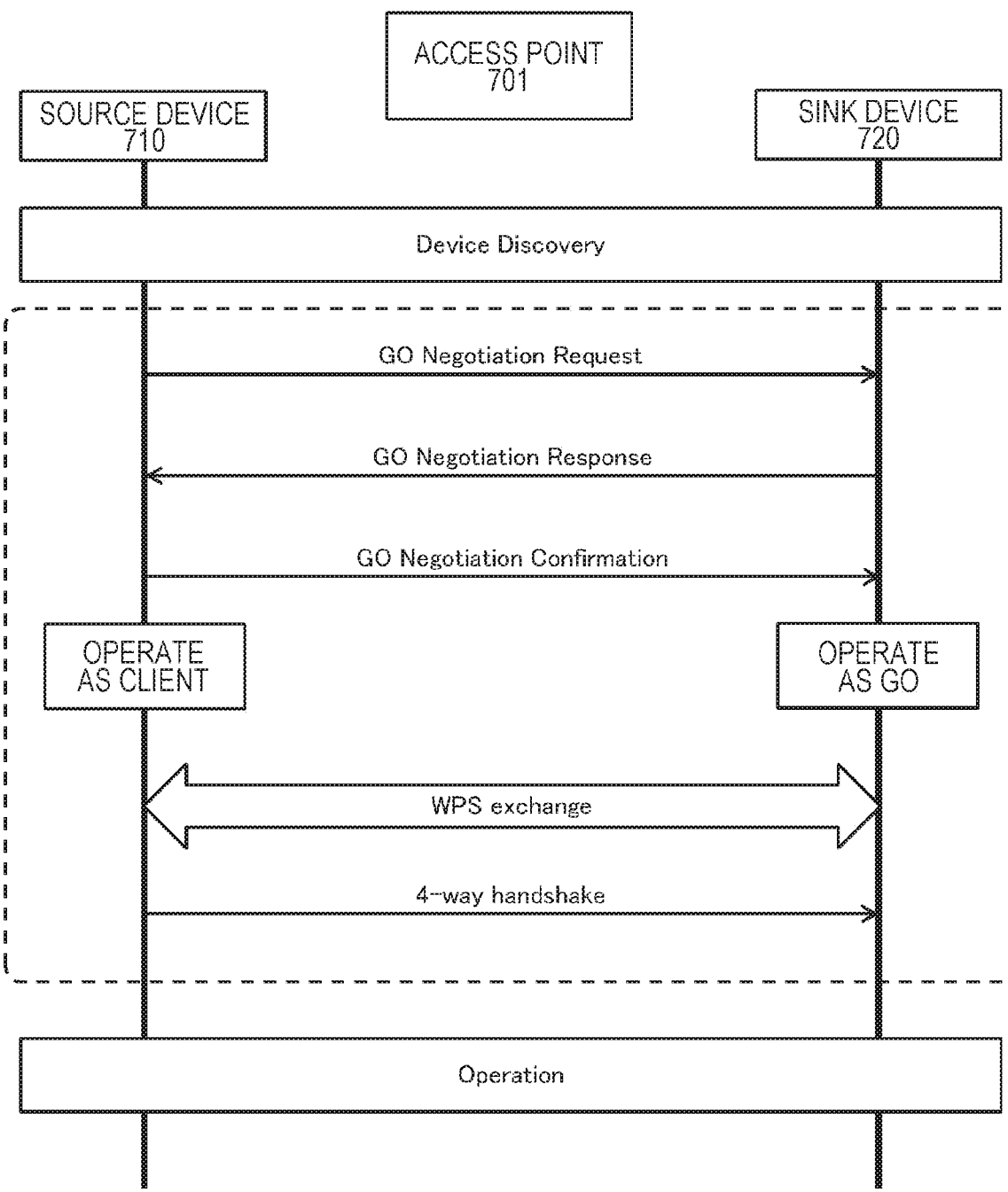
FIG. 25 is a diagram illustrating an example of a control method of a Device Discovery or a Service Discovery.

An example of the control method of the Device Discovery or the Service Discovery will be described with reference to FIG. 25.

An information processing device 710 (the source device) transmits a Probe Request and searches for an information processing device 720 (the sink device) which is connectable through the P2P connection. For example, when the information processing device 720 (sink device) is a device which is connectable through the P2P connection, it is possible to receive a Probe Response and detect a frequency channel used in the P2P connection. Here, the description will proceed on the premise that the information processing device 720 (sink device) is a device which is connectable through the P2P connection and is able to receive the Probe Response.

Through the process described above, in FIG. 25, the information processing device 710 (source device) detects the frequency channel for the P2P connection with the information processing device 720 (sink device) and establishes the P2P connection. Further, after the P2P connection is established, the information processing device 710 (source device) further establishes the link of the TCP connection or the RTSP connection with the information processing device 720 (sink device), and then transmits one or more of the above exchanges (C1) to (C4).

Here, a method of encapsulating the WFD IE in the payload portion of the Probe Request or the Probe Response and exchanging it will be described.

FIGS. 26 to 30 illustrate format examples using the WFD IE of (C2). FIGS. 26 to 28 among FIGS. 26 to 30 are formats already allocated in the Miracast Release 1. However, a new bit is assigned to a Subelement ID (11) illustrated in FIG. 28. Specifically, new fields corresponding to the Subelement ID (11) are illustrated in FIGS. 29 and 30.

In FIG. 28, [5:0] of a New Device Information field indicates information used for the information processing device 720 (sink device) to determine an optimal frequency channel in the P2P connection.

In the process of the sequence using any one of (C1) to (C3), the information processing device 710 (source device) detects each piece of information and thus can determine an optimal frequency channel in the P2P connection with the information processing device 720 (sink device). For example, associated frequency information (a field of [23:14] illustrated in FIG. 30) between an access point 701 (not illustrated) and the information processing device 720 (sink device) can be used. Further, for example, concurrent information (a field of [5:2] illustrated in FIG. 30) of a wireless line of the information processing device 720 (sink device) can be used. The concurrent information is information indicating whether or not a connection form such as a time division connection of the same frequency channel, a time division connection of different frequency channels, a simultaneous connection of the same frequency channel, or a simultaneous connection of different frequency channels is possible (a field of [5:2] illustrated in FIG. 30). Further, for example, a terminal capability of a wireless function (a field of [13:8] illustrated in FIG. 21) can be used.

Further, there is also a possibility that the access point 701 is outside, and the information processing device 710 (source device) communicates with the information processing device 720 (sink device) via the access point 701. In this case, the access point 701 and the information processing device 720 (sink device) may be connected via a wired manner or a connector manner such as an Ethernet (registered trademark) cable or a USB cable/connector. In order to deal with such a topology, the information processing device 720 (sink device) gives a notification indicating that a connection with the access point 701 is a wired connection ([1:0] illustrated in FIG. 30) and whether or not a wireless function for the P2P connection is provided to the information processing device 710 (source device). Accordingly, the information processing device 710 (source device) can determine the optimal frequency channel. For example, when the information processing device 720 (sink device) supports only the wired line, the information processing device 720 (sink device) is connected with the access point 701 without transitioning to the P2P connection without change. On the other hand, when the information processing device 720 (sink device) supports a wireless line as well, it is possible to select one of the supported frequency channels and establish a connection.

In the above example, the WFD IE is encapsulated in the payload portion of the Probe Request or the Probe Response, but the technology disclosed in this specification is not limited thereto.

For example, when the Display Service of Wi-Fi Direct Services is used, it is possible to exchange Service Capability information between devices via a message conforming to ASP. Specifically, transmission and reception of a text string obtained by delimiting information included in the WFD IE into 4 bits and converting them into hexadecimal numbers are performed. Further, the information included in the WFD IE is not limited to the current specification. For example, the Service Capability information illustrated in FIG. 31 may be included in the payload of the ASP message.

Further, the negotiation of the associated frequency information and the concurrent information of the device may be performed as a sort of the process of the Device Discovery or the Service Discovery. Further, the negotiation of the associated frequency information and the concurrent information of the device may be performed again when it is necessary to change the frequency channel during the transmission. Further, when the negotiation starts, a method of exchanging information may be selected by negotiating one of the exchanges (C1) to C4) which is possible between the information processing device 710 (source device) and the information processing device 720 (sink device).

Further, in each of the processes described above, the example in which the information processing device 710 (source device) receives the Probe Response, then further establishes a TCP connection or an RTSP connection of the P2P connection link, and then performs (C1) to (C4). Here, before the P2P connection link is established, the exchange of the Probe Request or the Probe Response including the WFD IE may be performed using the TCP connection or the RTSP connection to which the information processing device 710 (source device) and the information processing device 720 (sink device) are connected via the access point 701. Further, in this example, it is initiated by the information processing device 710 (source device), but it may be initiated by the information processing device 720 (sink device).

Further, the frequency for the P2P connection is described in the Probe Request regardless of the processes, and the frequency channel for transmitting the Probe Response from the information processing device 720 (sink device) may not be the frequency used by the Probe Request. Further, the reception may be performed through the P2P connection.

INDUSTRIAL APPLICABILITY

The technology disclosed in this specification has been described above in detail with reference to the specific embodiments. However, it is obvious that those skilled in the art can make modifications or substitutions of the embodiments without departing from the gist of the technology disclosed in this specification.

According to the technology disclosed in this specification, in the multi-sink topology environment, the source device manages the modes of a plurality of sink devices and makes a request for causing the modes to coincide according to circumstances, and thus it is possible to effectively transmit the accessibility mode metadata.

Further, when the operator checks whether or not the mode is changed in advance at the time of changing the mode, the operator can understand the operation change, and the operator can understand an operation difference associated with the mode change whenever possible.

Further, according to the technology disclosed in this specification, in the multi-sink topology environment, the source device adjusts the modes of a plurality of sink devices, and thus each terminal can perform management of the mode of its own terminal and the exchange minimally.

Further, according to the technology disclosed in this specification, bandwidth control using a multicast packet or a unicast packet can be performed.

Further, according to the technology disclosed in this specification, in the multi-sink topology environment, the source device can suppress the data conversion of the sink device to a minimum.

Further, according to the technology disclosed in this specification, even when the operator who operates the sink device is a person with disability, it is possible to provide a mode selection UI in which the source device can be operated by the sink device and perform a remote operation.

Further, according to the technology disclosed in this specification, in the multi-source topology environment, when a connection with the source devices with a different operation method is performed, it is possible to perform an exchange process of each source device from a common operation from the sink device and perform a remote operation.

Further, according to the technology disclosed in this specification, even when the operator of the source device or the sink device which is connected is changed, an efficient operation can be performed without returning to the initial operation. In the multi-source topology environment, the sink device can manage the Capability Negotiation so that the modes of a plurality of source devices coincide.

Further, the technology disclosed in this specification can be applied to various types of communication systems in which an information processing device operating as the source device and an information processing device operating as the sink device perform wireless connection through P2P direct communication and perform image transmission.

In such a communication system, when the source device detects the current operation mode of the sink device, it is possible to select and transmit appropriate accessibility mode operation metadata without being affected by content/media which undergoes image transmission.

Further, when the source device and the sink device perform detection through exchange before a connection, it is possible to efficiently use a band by turning off the media that need not be transmitted.

Further, a unit of giving a notification to the operator of the counterpart terminal is provided, and thus the operator can change a setting of a next terminal.

Further, even in the environment in which the operator is changed, an efficient operation can be performed without returning to the initial operation.

In short, the technology disclosed in this specification has been described by way of example, and description of this specification should not be interpreted to be limited. To determine the gist of the technology disclosed in this specification, claims set forth below should be taken into consideration.

Further, the technology disclosed in this specification may have the following configurations.

(1) An information processing device, including:
a wireless communication unit that wirelessly communicates with a plurality of sink devices as a source device; and
a control unit that controls a connection with the sink devices and transmission of content or data to the sink devices,
in which each of the plurality of sink devices is operable in one of a normal mode and one or more types of accessibility modes of guaranteeing browsing corresponding to disability or functional degeneration of a body of an operator, and
the control unit manages the types of the accessibility mode of the plurality of sink devices.

(2) The information processing device according to (1), in which the control unit arbitrates the accessibility modes of the plurality of sink devices and then starts the transmission of the content or the data.

In the information processing device according to (1) or (2), in the multi-sink topology environment, the modes of a plurality of sink devices are managed, a request for causing the modes to coincide is made according to circumstances, and thus it is possible to effectively transmit the accessibility mode metadata.

(3) The information processing device according to (2), in which the control unit causes a sink device that is changed to the accessibility mode to display a pop-up of causing the operator to check whether or not the change is not a problem.

According to the information processing device according to (3), when the operator checks whether or not the mode is changed in advance at the time of changing the mode, the operator can understand the operation change, and the user can understand an operation difference associated with the mode change whenever possible.

(4) The information processing device according to (1), in which the control unit detects a connection with the sink device in the accessibility mode and causes transmission of necessary accessibility mode metadata to be transmitted on the basis of a result of obtaining a logical sum of accessibility mode types to be connected therefrom.

According to the information processing device according to (4),
in the multi-sink topology environment, the modes of a plurality of sink devices are arbitrated, and thus each terminal can perform management of the mode of its own terminal and the exchange minimally.

(5) The information processing device according to (4), in which the control unit causes the accessibility mode metadata to be transmitted through one of a multicast packet and a unicast packet.

(6) The information processing device according to (1), in which the control unit groups the plurality of sink devices according to the same accessibility mode type and transmits the accessibility mode metadata corresponding to each group.

According to the information processing device described according to (6), the data conversion of the sink device can be suppressed to a minimum.

(7) The information processing device according to (6), in which the control unit causes the accessibility mode metadata to be transmitted through one of a multicast packet and a unicast packet.

(8) An information processing device, including:
a wireless communication unit that wirelessly communicates with a source device as a sink device; and
a control unit that controls a connection with the source device and transmission of content or data from the source device,
in which the control unit extracts only reproducible metadata among a plurality of pieces of accessibility mode metadata received from the source device and reproduces the extracted metadata.

(9) An information processing device, including:
a wireless communication unit that wirelessly communicates to the same sink device together with another source device as a source device; and
a control unit that controls a connection with the sink device and transmission of content or data to the sink device,
in which the sink device is operable in one of a normal mode and one or more types of accessibility modes of guaranteeing browsing corresponding to disability or functional degeneration of a body of an operator, and the control unit gives a notification indicating a connection in the accessibility mode to the sink device.

According to the information processing device according to (9), even when the operator operating the sink device is a person with disability, it is possible to provide a UI in which the sink device can operate the source device.

(10) An information processing device, including:
a wireless communication unit that wirelessly communicates with a plurality of source devices as a sink device;
a control unit that controls a connection with the source devices and transmission of content or data from the source devices; and
a user interface unit that selects one of an accessibility operation and a normal operation.

According to the information processing device according to (10),
even when the operator operating the sink device is a person with disability, it is possible to provide a UI in which the sink device can operate the source device.

(11) An information processing device, including:
a wireless communication unit that wirelessly communicates with a plurality of source devices as a sink device; and
a control unit that controls a connection with the source devices and transmission of content or data from the source devices,
in which each of the plurality of source devices is operable in one of a normal mode and one or more types of accessibility modes of guaranteeing browsing corresponding to disability or functional degeneration of a body of an operator, and
the control unit causes UIBC data to be transmitted to the plurality of source devices.

(12) The information processing device according to (11),
in which the control unit converts the UIBC data to be suitable for the mode of each of the source devices and then transmits the converted UIBC data.

(13) The information processing device according to (11), in which the control unit causes the UIBC data to be transmitted regardless of the mode of the source device.

(14) The information processing device according to (11), in which the control unit performs switching to a common mode to which all devices are switchable and then causes the UIBC data to be transmitted.

According to the information processing devices according to (11) to (14), when a connection with the source devices with a different operation method is performed, it is possible to perform an exchange process of each source device from a common operation from the sink device and perform a remote operation.

(15) An information processing device, including:
a wireless communication unit that wirelessly communicates with the same sink device together with another source device as a source device; and
a control unit that controls a connection with the sink device and transmission of content or data to the sink device,
in which the sink device is operable in one of a normal mode and one or more types of accessibility modes of guaranteeing browsing corresponding to disability or functional degeneration of a body of an operator, and
in a case where the operator changes the mode of the sink device during the connection, the control unit transmits a mode exchange message signal for performing switching between the normal mode and the accessibility mode in midstream.

According to the information processing device according to (15), even in the environment in which the operator is changed, an efficient operation can be performed without returning to the initial operation.

(16) An information processing device, including:
a wireless communication unit that wirelessly communicates with a plurality of source devices as a sink device;
a control unit that controls a connection with the source devices and transmission of content or data from the source devices; and
in which each of the plurality of source devices is operable in one of a normal mode and one or more types of accessibility modes of guaranteeing browsing corresponding to disability or functional degeneration of a body of an operator, and
the control unit requests the source devices so that the accessibility modes of the plurality of source devices coincide.

According to the information processing device according to (16), in the multi-source, the sink device can perform the Capability Negotiation management so that the modes of a plurality of source devices coincide.

(17) An information processing device, including:
a wireless communication unit that wirelessly communicates with a plurality of source devices as a sink device; and
a control unit that controls a connection with the source devices and transmission of content or data from the source devices,
in which each of the plurality of source devices is operable in one of a normal mode and one or more types of accessibility modes of guaranteeing browsing corresponding to disability or functional degeneration of a body of an operator, and
the control unit detects a connection with the source device in the accessibility mode and performs transmission to the source device on the basis of a result of obtaining a logical sum of accessibility mode types to be connected therefrom.

According to the information processing device according to (17), in the multi-source, the sink device can perform the Capability Negotiation management so that the modes of a plurality of source devices coincide.

(18) A wireless communication method, including:
a wireless communication step of wirelessly communicating with a plurality of sink devices as a source device; and
a control step of controlling a connection with the sink devices and transmission of content or data to the sink devices,
in which each of the plurality of sink devices is operable in one of a normal mode and one or more types of accessibility modes of guaranteeing browsing corresponding to disability or functional degeneration of a body of an operator, and
the control step includes managing the types of the accessibility mode of the plurality of sink devices.

(19) A wireless communication method, including:
a wireless communication step of wirelessly communicating with a plurality of source devices as a sink device; and
a control step of controlling a connection with the source devices and transmission of content or data from the source devices,
in which each of the plurality of source devices is operable in one of a normal mode and one or more types of accessibility modes of guaranteeing browsing corresponding to disability or functional degeneration of a body of an operator, and
the control step includes transmitting UIBC data to the plurality of source devices.

(20) A wireless communication method, including:
a wireless communication step of wirelessly communicating with the same sink device together with another source device as a source device; and
a control step of controlling a connection with the sink device and transmission of content or data to the sink device,
in which the sink device is operable in one of a normal mode and one or more types of accessibility modes of guaranteeing browsing corresponding to disability or functional degeneration of a body of an operator, and
the control step includes, when the operator changes the mode of the sink device during the connection, transmitting a mode exchange message signal for performing switching between the normal mode and the accessibility mode in midstream.

(21) An information processing device, including:
a wireless communication unit that wirelessly communicates with a sink device as a source device, the sink device being operable in one of a normal mode and one or more types of accessibility modes of guaranteeing browsing corresponding to disability or functional degeneration of a body of an operator;
a content transmitting unit that transmits content or data to the sink device through the wireless communication unit; and
a metadata transmitting unit that transmits metadata that is operable by the operator of the sink device to the sink device operating in the accessibility mode through the wireless communication unit.

(22) The information processing device according to (21), in which the metadata transmitting unit transmits metadata using a channel for metadata transmission.

(23) An information processing device, including:

a wireless communication unit that wirelessly communicates with a sink device as a source device, the sink device being operable in one of a normal mode and one or more types of accessibility modes of guaranteeing browsing corresponding to disability or functional degeneration of a body of an operator;

a content transmitting unit that transmits content or data to the sink device through the wireless communication unit;

a mode checking unit that checks an operation mode of the sink device through the wireless communication unit; and a metadata transmitting unit that transmits metadata that is operable by the operator of the sink device to the sink device operating in the accessibility mode through the wireless communication unit.

(24) The information processing device according to (23), in which the mode checking unit checks an accessibility mode type supported by the sink device using at least one process of a Capability Negotiation, a Device Discovery, and a Service Discovery in a Miracast protocol.

(25) The information processing device according to (23) or (24), further including, a metadata converting unit that converts metadata in accordance with an accessibility mode type supported by the sink device.

(26) The information processing device according to any one of (23) to (25), further including, a notifying unit that gives a notification indicating that it is necessary to generate metadata to the operator of the information processing device in a case where the sink device is in the accessibility mode.

(27) The information processing device according to (26), in which the notifying unit displays a media type of the metadata to be transmitted to the sink device and urges the operator to check whether or not the metadata is converted.

(28) The information processing device according to any one of (23) to (27), further including, a mode control unit that causes a mode to coincide with the mode of the sink device in a case where the type of the accessibility mode is different from the type of the accessibility mode of the sink device.

(29) The information processing device according to any one of (23) to (28), further including, a message transmitting unit that transmits, in a case where the operator changes the mode during the connection with the sink device, a mode exchange message signal for performing switching between the normal mode and the accessibility mode in midstream in the middle of transmission of the content by the content transmitting unit.

(30) An information processing device, including:

a wireless communication unit that wirelessly communicates with a source device as a sink device, the source device being operable in one of a normal mode and one or more types of accessibility modes of guaranteeing browsing corresponding to disability or functional degeneration of a body of an operator;

a content receiving unit that receives content or data transmitted from the source device through the wireless communication unit;

a mode checking unit that checks an operation mode with the source device through the wireless communication unit; and a metadata receiving unit that receives metadata operable by an operator from the source device operating in the accessibility mode through the wireless communication unit.

(31) The information processing device according to (30), further including, a metadata converting unit that converts metadata in accordance with an accessibility mode type supported by the information processing device.

(32) The information processing device according to (30) or (31), further including, a notifying unit that gives a notification indicating that it is necessary to reproduce metadata to the operator of the information processing device in a case where the sink device is in the accessibility mode.

(33) The information processing device according to any one of (30) to (32), further including, a mode control unit that causes a mode to coincide with the mode of the source device in a case where the type of the accessibility mode is different from the type of the accessibility mode of the source device.

(34) The information processing device according to any one of (30) to (33), further including, a reproduction checking unit that displays a media type of the metadata received from the source device and causes the operator to check whether media reproduction which is currently turned off is turned on.

(35) The information processing device according to any one of (30) to (34), further including, a message receiving unit which receives, in a case where the operator changes the mode during the connection with the source device, a mode exchange message signal for performing switching between the normal mode and the accessibility mode in midstream in the middle of transmission of the content from the source device.

(36) A wireless communication method, including:

a wireless connection step of wirelessly connecting with a sink device as a source device, the sink device being operable in one of a normal mode and one or more types of accessibility modes of guaranteeing browsing corresponding to disability or functional degeneration of a body of an operator;

a content transmitting step of transmitting content or data to the sink device; and a metadata transmission step of transmitting metadata operable by the operator of the sink device to the sink device operating in the accessibility mode.

(37) A wireless communication method, including:

a wireless connection step of wirelessly connecting with a sink device as a source device, the sink device being operable in one of a normal mode and one or more types of accessibility modes of guaranteeing browsing corresponding to disability or functional degeneration of a body of an operator;

a content transmitting step of transmitting content or data to the sink device;

a mode checking step of checking an operation mode of the sink device; and a metadata transmission step of transmitting metadata operable by the operator of the sink device to the sink device operating in the accessibility mode;

(38) A wireless communication method, including:

a wireless connection step of wirelessly connecting with a source device as a sink device, the source device being operable in one of a normal mode and one or more types of accessibility modes of guaranteeing browsing corresponding to disability or functional degeneration of a body of an operator;

a content reception step of receiving content or data transmitted from the source device;

a mode checking step of confirming an operation mode with the source device; and a metadata reception step of receiving metadata operable by the operator from the source device operating in the accessibility mode.

REFERENCE SIGNS LIST

100 Communication system
101 Information transfer range
200 Information processing device
210 Antenna
220 Wireless communication unit
230 Control signal receiving unit
240 Control unit
250 Image/audio signal generating unit
260 Image/audio compressing unit
270 Stream transmitting unit
300 Information processing device
310 Antenna
320 Wireless communication unit
330 Stream receiving unit
340 Image/audio developing unit
350 Image/audio output unit
351 Display unit
352 Audio output unit
360 User information acquiring unit
370 Control unit
380 Control signal transmitting unit
390 Management information holding unit
1100 Communication system
1200, 1300, 1400 Information processing device
1351 Display unit
1361 Imaging unit

The invention claimed is:

1. An information processing device, comprising:
a wireless communication unit configured to wirelessly communicate to a sink device,
wherein a first communication of the wireless communication unit as a first source device to the sink device is concurrent with a second communication of a second source device to the sink device; and
a control unit configured to:
control a connection with the sink device and transmission of at least one of content or data to the sink device, wherein
the sink device is operable in one of a normal mode or an accessibility mode,
a type of the accessibility mode includes:
a first type of accessibility mode in which an operation to be supported in the sink device is associated with a sight disability of an operator of the sink device,
a second type of accessibility mode in which the operation to be supported in the sink device is associated with a hearing disability of the operator, and
a third type of accessibility mode in which the operation to be supported in the sink device is associated with a body function disability of the operator, wherein the body function disability is different from the sight disability and the hearing disability;
control transmission of metadata to the sink device, wherein
the metadata is transmitted synchronously with at least one of the content or the data, and
the metadata corresponds to one of the first type of accessibility mode, the second type of accessibility mode, and the third type of accessibility mode; and
provide a first notification indicating the connection in one of the type of the accessibility mode to the sink device.

2. An information processing device, comprising:
a wireless communication unit configured to wirelessly communicate with a plurality of source devices, wherein the wireless communication unit is configured to function as a sink device;
a control unit configured to:
control a connection with the plurality of source devices and transmission of at least one of content or data from the plurality of source devices, wherein
each source device of the plurality of source devices is operable in one of a normal mode or an accessibility mode,
a type of the accessibility mode includes:
a first type of accessibility mode in which an operation to be supported in the source device is associated with a sight disability of an operator of the sink device,
a second type of accessibility mode in which the operation to be supported in the source device is associated with a hearing disability of the operator, and
a third type of accessibility mode in which the operation to be supported in the source device is associated with a body function disability of the operator, wherein the body function disability is different from the sight disability and the hearing disability; and
control transmission of metadata from a source device of the plurality of source devices, wherein
the metadata is transmitted synchronously with at least one of the content or the data, and
the metadata corresponds to one of the first type of accessibility mode, the second type of accessibility mode, and the third type of accessibility mode; and
a user interface unit configured to select one of an accessibility operation or a normal operation, wherein
the normal operation is associated with the normal mode, and
the accessibility operation is associated with one of the type of the accessibility mode.

3. The information processing device according to claim 1,
wherein the control unit is further configured to control the sink device to display a pop-up to check whether one of a change between the normal mode and the accessibility mode or a change of the type of the accessibility mode is unproblematic for the operator.

4. The information processing device according to claim 1, wherein
the control unit is further configured to transmit a mode exchange message signal, to switch between the normal mode and the accessibility mode in middle of the transmission of the content, to the sink device, and
the transmission of the mode exchange message signal is based on a change in mode of the sink device by the operator during the connection.

5. The information processing device according to claim 1,
wherein the control unit is further configured to convert user input back channel (UIBC) data received from the sink device into first data detectable by the information processing device.

6. The information processing device according to claim 1,
wherein the control unit is further configured to transmit the metadata via a channel for metadata transmission.

7. The information processing device according to claim 1, wherein
the control unit is further configured to check the type of the accessibility mode supported by the sink device based on at least one process of a Capability Negotiation, a Device Discovery, or a Service Discovery in a Wi-Fi CERTIFIED Miracast protocol 1.0, and
the type of the accessibility mode the first type of accessibility mode, the second type of accessibility mode, and the third type of accessibility mode.

8. The information processing device according to claim 1, wherein
the control unit is further configured to convert the metadata based on the type of the accessibility mode supported by the sink device, and
the type of the accessibility mode the first type of accessibility mode, the second type of accessibility mode, and the third type of accessibility mode.

9. The information processing device according to claim 1, further comprising
a notifying unit configured to give a second notification, indicating that generation of the metadata is necessary, to the operator of the information processing device based on the sink device being in the accessibility mode.

10. The information processing device according to claim 9,
wherein the notifying unit is further configured to:
display a media type of the metadata transmitted to the sink device; and
urge the operator to check whether the metadata is converted.

11. The information processing device according to claim 1, further comprising
a mode control unit configured to control a first mode of the first source device to coincide with a mode of the sink device based on the first type of accessibility mode of the sink device being different from the second type of accessibility mode of the sink device.

12. The information processing device according to claim 1, further comprising
a message transmitting unit configured to transmit a mode exchange message signal, to switch between the normal mode and the accessibility mode in midstream in middle of the transmission of the content, and
the transmission of the mode exchange message signal is based on a change in mode of the sink device by the operator during the connection.

13. The information processing device according to claim 2,
wherein the user interface unit is further configured to cause the operator to check, before a change of the type of the accessibility mode of the information processing device, whether the change is non-problematic.

14. The information processing device according to claim 2, wherein
the control unit is further configured to transmit user input back channel (UIBC) data to the plurality of source devices.

15. The information processing device according to claim 14,
wherein the control unit is further configured to:
convert the UIBC data, wherein the converted UIBC data is suitable for a mode of each source device of the plurality of source devices; and
transmit the converted UIBC data.

16. The information processing device according to claim 14,
wherein the control unit is further configured to transmit the UIBC data regardless of a mode of each source device of the plurality of source devices.

17. The information processing device according to claim 14,
wherein the control unit is further configured to:
switch to a common mode to which the plurality of source devices is switchable; and
transmit the UIBC data.

18. The information processing device according to claim 2, wherein
the control unit is further configured to request the plurality of source devices so that an accessibility mode of each source device of the plurality of source devices coincide.

* * * * *